United States Patent [19]
Comstock et al.

[11] 3,854,124
[45] Dec. 10, 1974

[54] ELECTRONIC CALCULATOR

[75] Inventors: George E. Comstock, Danville; Thomas P. Gilmer, Jr., Castro Valley, both of Calif.

[73] Assignees: Friden, Inc., San Leandro, Calif.; The Singer Company, New York, N.Y.

[22] Filed: Nov. 21, 1966

[21] Appl. No.: 595,694

[52] U.S. Cl. .............................................. 340/172.5
[51] Int. Cl. .............................................. G06f 3/00
[58] Field of Search .......... 235/156, 157, 164, 165, 235/167; 340/172.5; 444/1

[56] References Cited
UNITED STATES PATENTS

| | | | |
|---|---|---|---|
| 3,047,228 | 7/1962 | Bauer et al. | 235/157 |
| 3,200,379 | 8/1965 | King et al. | 340/172.5 |
| 3,234,524 | 2/1966 | Roth | 340/172.5 |
| 3,293,616 | 12/1966 | Mullery et al. | 340/172.5 |
| 3,315,069 | 4/1967 | Bohm | 235/164 |
| 3,328,763 | 6/1967 | Rathbun et al. | 340/172.5 |
| 3,355,714 | 11/1967 | Culler | 340/172.5 |

OTHER PUBLICATIONS

Scriver, A. J. et al., "Logical Circuits And Memory," IBM Technical Disclosure Bulletin, Vol. 4, No. 12, May, 1962, pp. 64–66.

*Primary Examiner*—Raulfe B. Zache
*Attorney, Agent, or Firm*—Charles R. Lewis, Esq.

[57] ABSTRACT

This invention relates to electronic calculators, and more particularly to an electronic calculator having keyboard access to a first-in, first-out numeric data storage which enables many common calculations to be readily performed with less manual data entry and less operator decision making than heretofore possible, thereby reducing operator errors and increasing operator speed.

15 Claims, 11 Drawing Figures

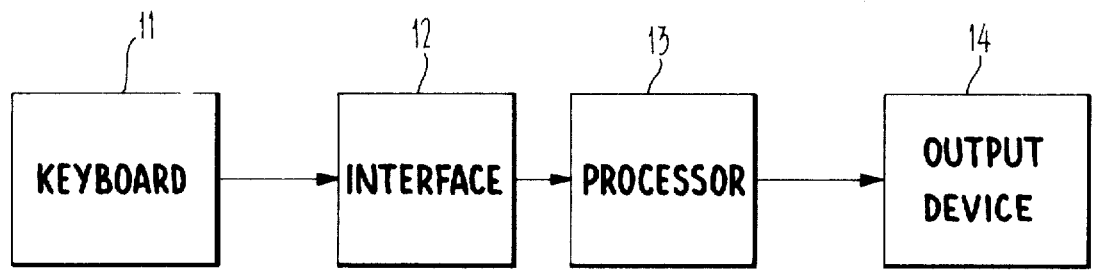
FIG_1
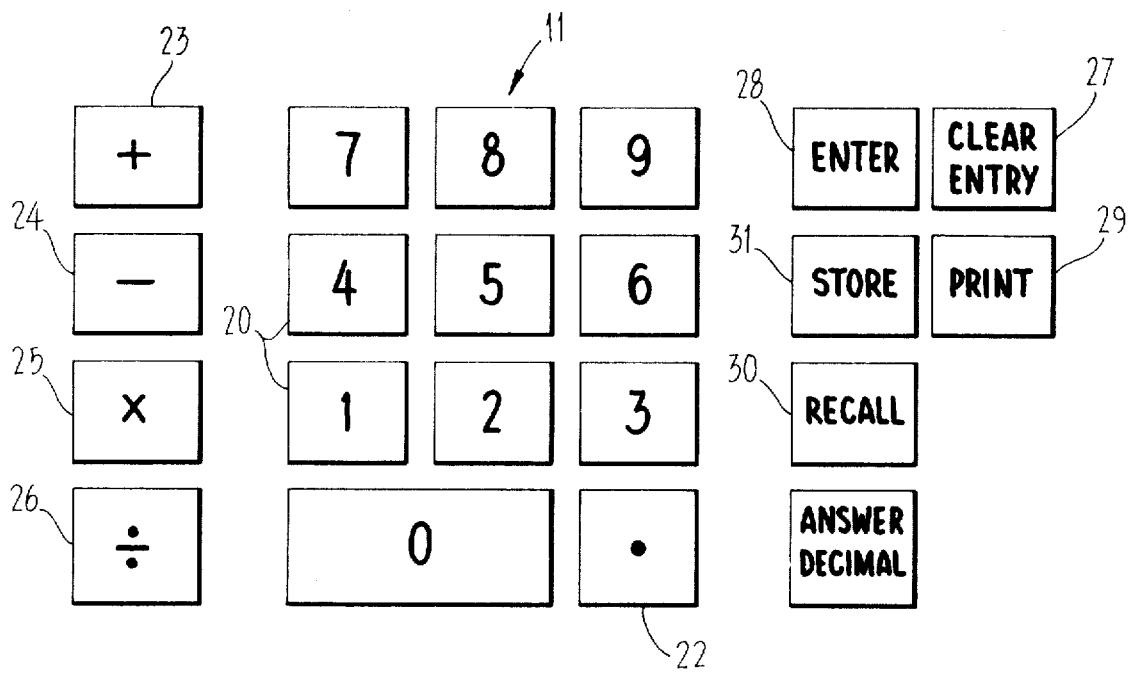
FIG_2
GEORGE E. COMSTOCK
THOMAS P. GILMER, JR.
INVENTOR.
BY
ATTORNEY

|  | 1 | 2 | 4 | 8 | 0 | X | C |
|---|---|---|---|---|---|---|---|
| 1 | • | | | | | | |
| 2 | | • | | | | | |
| 3 | • | • | | | | | • |
| 4 | | | • | | | | |
| 5 | • | | • | | | | • |
| 6 | | • | • | | | | • |
| 7 | • | • | • | | | | |
| 8 | | | | • | | | |
| 9 | • | | | • | | | • |
| 0 | | | | | • | | |
| . | | | | • | • | | • |
| + | | | • | | | • | • |
| − | | • | | | | • | • |
| × | • | | | | | • | • |
| ÷ | | | | | | • | |
| STORE | • | • | | | • | • | • |
| RECALL | | • | | | • | • | |
| ENTER | • | • | | • | | • | • |
| CLEAR ENTRY | | | | | • | • | • |
| PRINT | • | • | | • | | | |
| ANSWER DECIMAL | • | • | • | | • | • | |

FIG_3

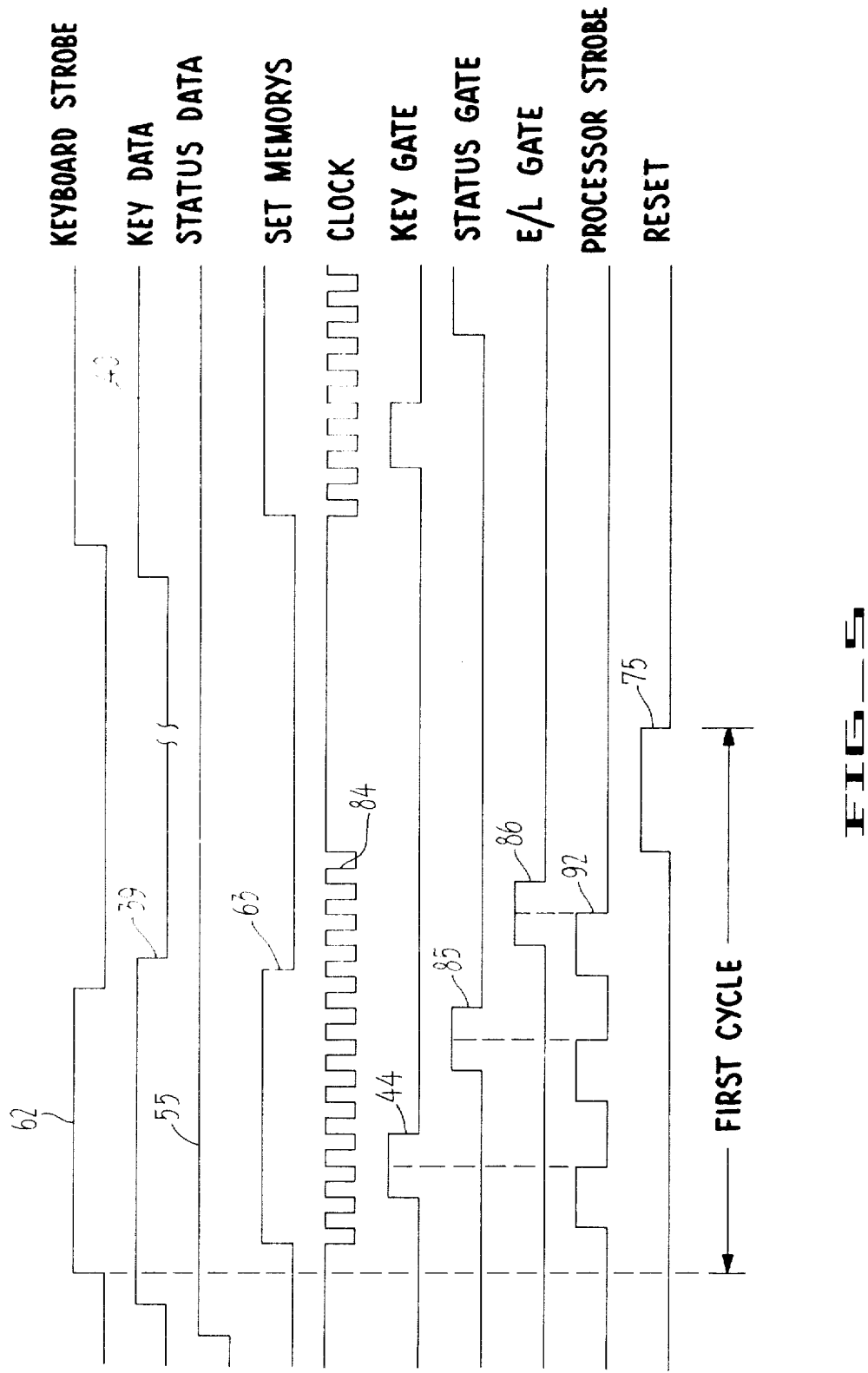
FIG_5

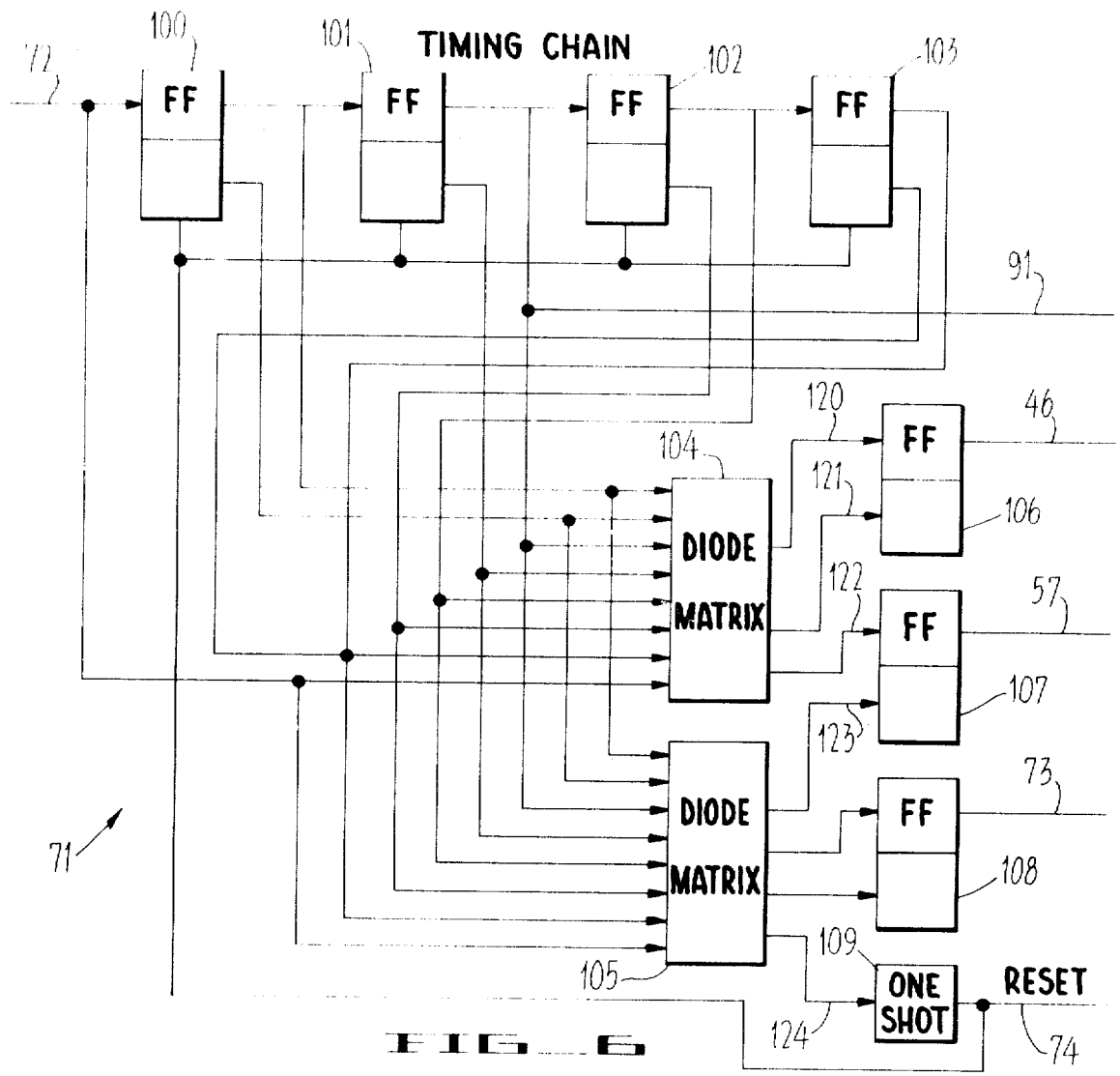
FIG_6
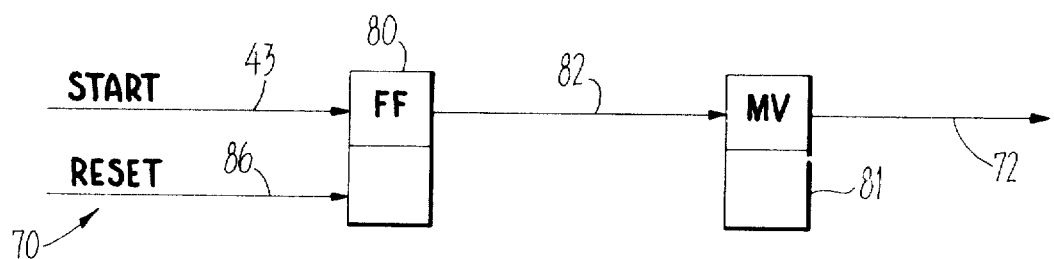
FIG_7
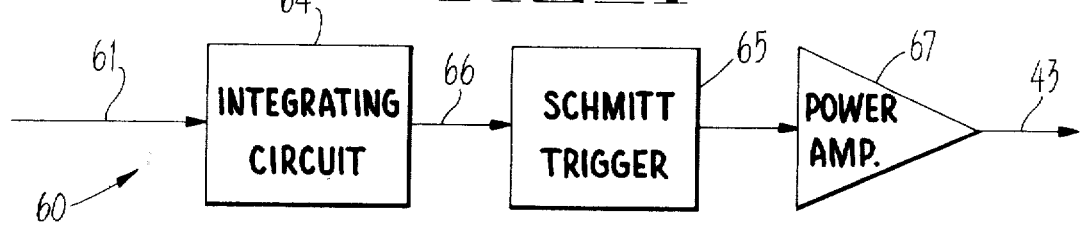
FIG_8

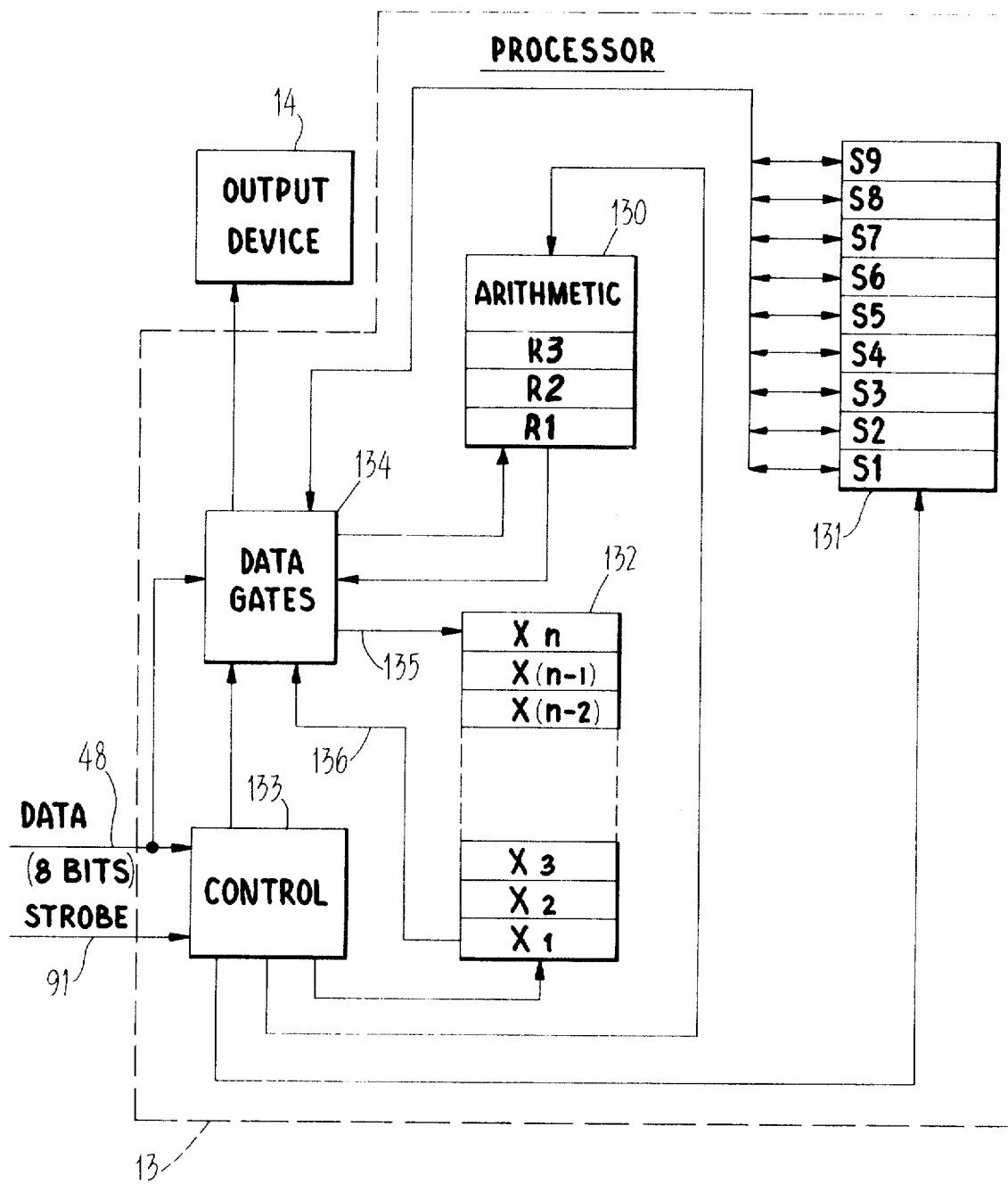
FIG_9

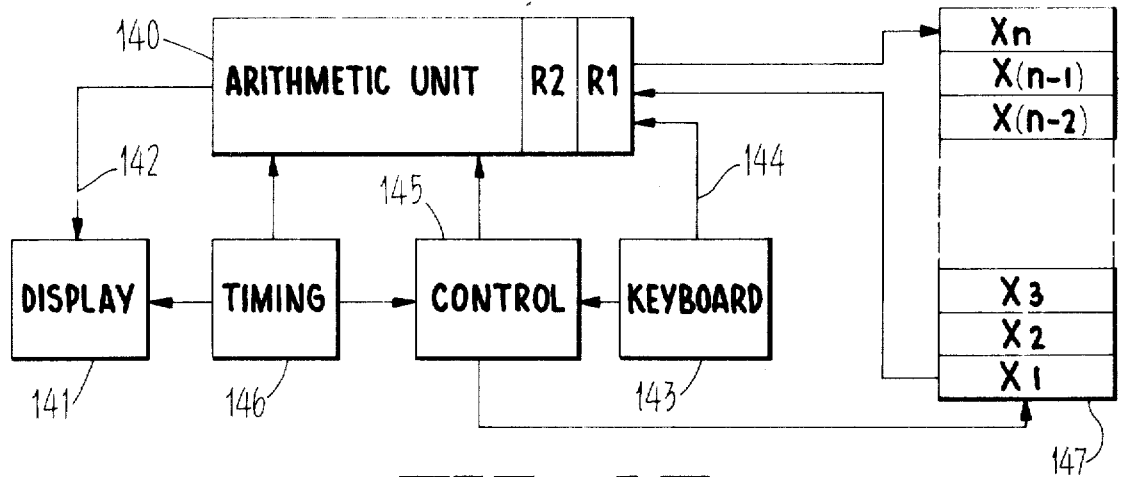
FIG_10
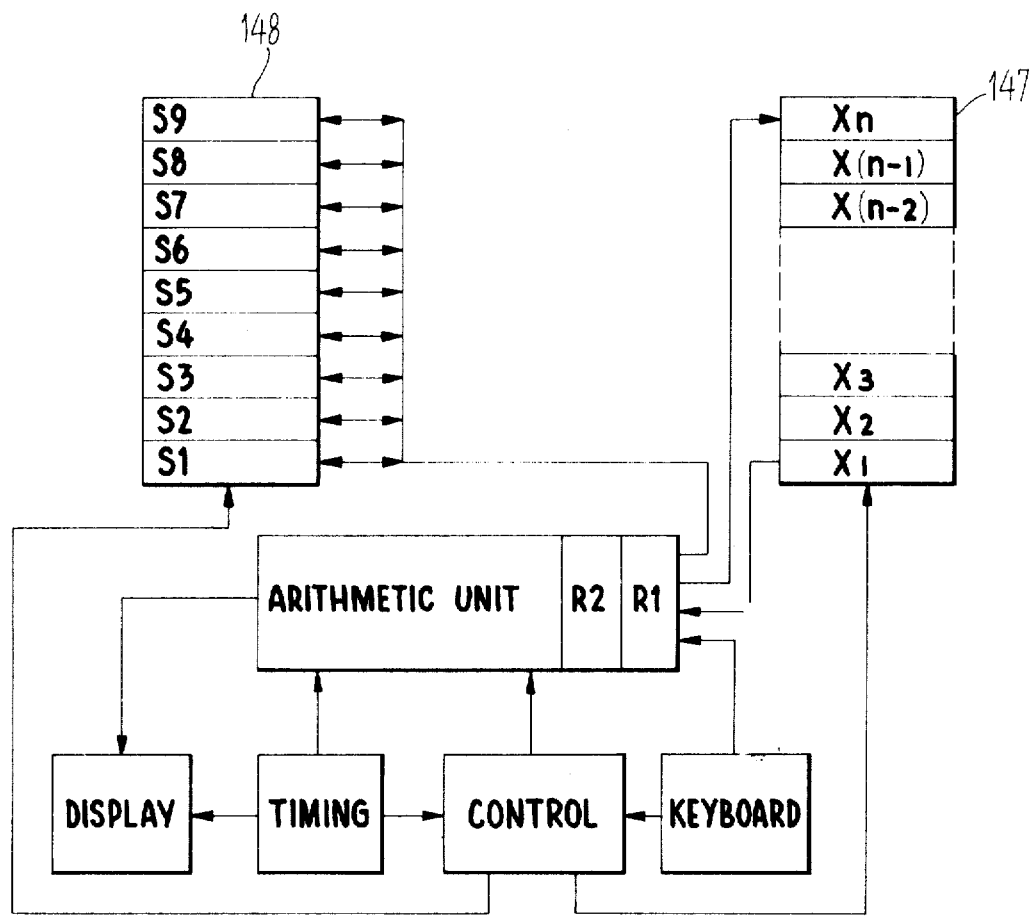
FIG_11

ELECTRONIC CALCULATOR

DISCUSSION OF PRIOR ART

Electronic calculators presently available enable arithmetic operations, such as addition, subtraction, multiplication, division, etc., to be performed rapidly by the manipulation of a manually operated keyboard. However, most calculations for which it is desirable to utilize such electronic calculators require repetitive arithmetic operations from a source of data in the form of one or more lists of numbers. In many cases, such a list of numbers must be referred to, or used, more than once during a complete calculation, thereby requiring the manual entry into the calculator of these numbers one or more times. Intermediate and final results of these calculations are also in the form of a list, or sequence, and ordinarily must be manually recorded and re-entered in the calculator. The individual numbers (or items) on these lists are normally processed sequentially, starting from the beginning and progressing in an orderly manner, to the end.

While one commercially available electronic calculator provides a storage associated with the arithmetic portion, whereby data stored therein is available therefrom on a last-in, first-out basis, such a storage does not lend itself to the type of calculations described above. Therefore, with this feature it is still necessary for the operator to keep a scratch pad of intermediate results and to manually enter and/or re-enter data and intermediate results into the calculator in a repetitive manner, in order to perform such a sequence of arithmetic operations. Operation of the calculator in this manner is not only time-consuming, but also increases the changes of operator error.

A series of individually addressable storage locations may be used to store a list, or sequence, of numeric data and/or intermediate results. However, this type of storage requires the operator to manipulate a plurality of keyboard keys and to keep a scratch pad for recording the locations of various data in the addressable storage. For example, each time a number is entered into an addressable storage, the operator generally must press oe key to enable storage in the addressable storage, and a second key which determines the specific location in which the number is to be stored. While retrieving a number, the operator must refer to the scratch sheet, operate one key that enables data retrieval from the addressable storage and then operate a second key which determines the specific location from which the desired number is to be retrieved. Accordingly, the use of an addressable memory, in solving calculations requiring repetitive arithmetic operations from a source of data in the former one or more lists of numbers, is also time-consuming and increases the probability of operator errors due to the large number of key strokes required and the necessity of keeping a scratch pad for recording the location of various numbers.

Accordingly, one object of this invention is to overcome or materially reduce these and other disadvantages of the prior art.

Another object of this invention is to provide an electronic calculator that requires materially less keyboard entries than presently known calculators to solve the same problem.

Another object of this invention is to provide an electronic calculator that substantially reduces the need to manually enter data in a repetitive manner.

Another object of this invention is to provide an electronic calculator that enables an operator to manipulate a list of stored data in a manner that enables calculations comprising a sequence of arithmetic operations to be readily performed.

Another object of this invention is to provide an electronic calculator that materially reduces the number of manual operator steps necessary to perform calculations comprising a sequence of arithmetic operations on a list or sequence of numbers.

Another object of this invention is to provide an electronic calculator that reduces the probability of operator error when performing calculations which include repetitive arithmetic operations, such as addition, subtraction, division, and/or multiplication on a list or sequence of numbers.

Briefly described, these and other objects of the present invention are accomplished by an electronic calculator which comprises an arithmetic and control portion having keyboard means coupled thereto for manually entering data into the arithmetic and control portion. A storage having a plurality of registers is associated with the arithmetic and control portion and is adapted to have numeric data entered therein and retrieved therefrom in a first-in, first-out arrangement. The keyboard includes means for providing access to this storage to store numeric data therein and to recall such data therefrom. Once a list or sequence of numbers has been entered into the storage, the list may be used as often as desired, thereby reducing the need for repetitively entering data into the calculator. Further, since the numeric data in the storage is retrieved therefrom on a first-in, first-out arrangement, an operator may perform calculations requiring repetitive arithmetic operations from a list or sequence of data in an orderly manner and with a minimum number of key strokes, thereby reducing the probability of operator error and the need to keep notes on suitable means, such as a scratch pad.

In accordance with another feature of the present invention, the keyboard means enables numeric data to be entered into the storage from the keyboard and/or from the arithmetic portion.

In accordance with another feature of the present invention, the keyboard means enables numeric data retrieved from the storage to be entered into the arithmetic portion.

In accordance with another feature of the present invention, the keyboard means includes at least a first key to provide access to the storage to store data therein and at least a second key to provide access to said storage to retrieve data therefrom.

These and other objects, features and advantages of the present invention will be readily apparent from the consideration of the following detailed description relating to the annexed drawings in which:

FIG. 1 illustrates a simplified block diagram of an electronic calculator system which may include the novel means of this invention;

FIG. 2 illustrates the keys of a typical keyboard which may be utilized with this invention;

FIG. 3 illustrates a keyboard key code that may be utilized with this invention, which is provided by a plurality of contacts associated with each keyboard key element shown in FIG. 2;

FIG. 5 illustrates idealized wave shapes that appear at various locations in the logic diagram of FIG. 4;

FIG. 6 illustrates, in more detail, the timing chain of FIG. 4;

FIG. 7 illustrates, in more detail, the clock circuit of FIG. 4;

FIG. 8 illustrates, in more detail, the integrator and shaper of FIG. 4;

FIG. 9 illustrates, in more detail, the processor associated with FIG. 4 and includes storage means accessible from the keyboard in accordance with the present invention;

FIG. 10 illustrates another embodiment of the present invention, having first-in, first-out storage means accessible from the keyboard in accordance with the present invention; and FIG. 11 illustrates a modification of the embodiment shown in FIG. 10.

Figure 4:
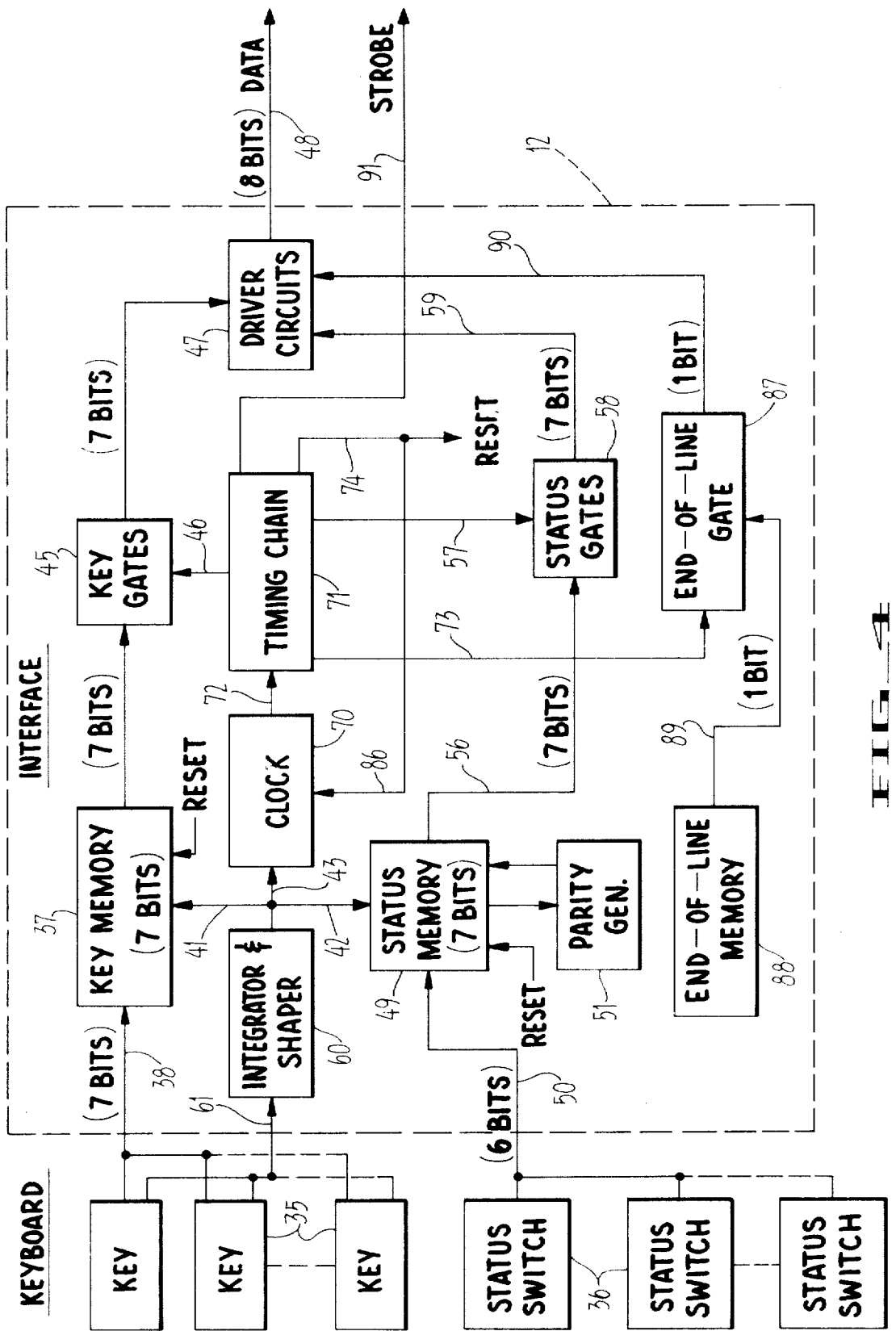
FIG. 4 illustrates a logic diagram which may be utilized as the interface of FIG. 1.

For ease and clarity of explanation, the following terminology, when used hereinafter, is defined as follows:

DIGIT — a single representation of an arithmetic value;

NUMBER — an ordered group of one or more digits that represent a composite arithmetic value;

REGISTER — a device capable of storing a number that is accessible directly or indirectly;

LIFO STORE — a plurality of associated registers from which numeric data are stored and recalled on a last-in, first-out basis;

FIFO STORE — a plurality of associated registers from which numeric data are stored and recalled on a first-in, first-out basis; and OPERATING REGISTER — a register that is utilized for performing an arithmetic function or modification in conjunction with another register or suitable arithmetic device.

Referring now to the drawings, wherein like reference characters designate like or corresponding parts throughout the several views, FIG. 1 illustrates a typical electronic calculator organization as comprising a keyboard 11 having a plurality of manually operated keys thereon for providing coded data to an interface 12. The interface 12 couples the coded data from the keyboard 11 to a processor 13 in a form suitable for use by the processor and in synchronization with the operation of the processor. The processor 13 contains an arithmetic portion for performing the various arithmetic operations on numeric data entered from the keyboard 11 and also includes one or more means for storing numeric data. An output device 14, such as a printer or cathode ray tube, is coupled to the processor 13 for visually displaying at least intermediate and final results of arithmetic operations performed within the processor. In accordance with the present invention, the processor 13 includes a storage which is accessible from the keyboard 11 that enables calculations comprising a series or sequence of arithmetic operations to be performed on one or more lists of numbers in a manner not heretofore possible in the prior art, as is described hereinbelow in detail.

Referring now to FIG. 2, there are illustrated typical manually-operated keyboard key elements which may be utilized with the present invention. The keyboard includes a plurality of digit keys 20, one for each of the digits, 0 through 9, and a decimal point key 22 for entering the location of the decimal point in a number. Also provided are arithmetic keys for performing various arithmetic operations, such as an add key 23, a subtract key 24, a multiply key 25 and a divide key 26. The remaining keys are functional keys which cause certain desired functions to occur, such as an ENTER key 28, a STORE key 31, a CLEAR ENTRY key 27, etc. Each key has associated therewith a plurality of switch contacts and, when depressed, selected ones of the contacts are activated to provide a code that identifies the depressed key in a manner well-known in the art.

Referring now to FIG. 3, there is illustrated a chart which shows the key codes for each of the keys illustrated in FIG. 2. Each key element shown in FIG. 2 is identified in the left-hand column and the code used to identify that key is illustrated in the remaining seven columns. Accordingly, each key shown in FIG. 2 preferably contains at least seven code contacts from which the code illustrated in FIG. 3 may be derived. The seven code contacts of each keyboard switch are identified in the chart of FIG. 3 by the numerals 1, 2, 4 and 8, and the letters O, X and C. The dots within the various blocks denote which of the seven code contacts of each key are activated when the associated key, located in the left-hand column, is depressed. A perusal of the code chart shows that the depression of any one of the keyboard keys causes an odd number of the seven contacts to be activated, which results in an odd parity code. In addition to the seven code contacts, each keyboard key switch preferably includes at least one additional contact, hereinafter called the "strobe contact," which, when a key is depressed, is activated a short time after the coded contacts are activated. A keyboard key switch suitable for these purposes is the Model KB—7A1AA made by the Microswitch Division of Honeywell, Inc., Minneapolis, Minn.

Although not illustrated in FIG. 2, the keyboard preferably also includes status switches by which various preset conditions may be entered into the calculator, such as decimal point alignment, accumulation mode, and the like.

Referring now to FIGS. 4 and 5, a suitable interface circuit is shown in FIG. 4 within the dotted outline 12, and the various idealized wave shapes appearing throughout the logic diagram of FIG. 4 are illustrated in FIG. 5. Single interconnecting means between the various logic and function blocks of FIG. 4 are illustrated. However, as will be apparent from the detailed description which follows, a plurality of interconnections may exist between various logic and functional blocks to permit a plurality of data or data bits to be transferred therebetween in parallel. Accordingly, for ease and clarity of description, the term "lead," as used hereinafter, is defined as means for coupling one signal at a time to one or more elements or locations, and the term "line," as used hereinafter, is defined as means for coupling more than one signal at the same time to one or more elements or locations. For example, a wire used to transmit a signal, or a succession of signals, to one or more locations would be described as a lead, whereas a plurality of wires used for the parallel transmission of data bits or signals would be described as a line.

The keyboard key elements of FIG. 2 are illustrated in FIG. 4 by the blocks 35. Each code contact of each keyboard key switch is connected in parallel to the corresponding code contact of each of the remaining keyboard key switches and are coupled to a key memory 37 by way of the line 38 which contains seven leads to provide seven parallel channels of bit information. Each channel or bit position in the line 38 corresponds to one of the seven code contacts associated with each of the keyboard keys 35. Each time a keyboard key is depressed, its activated code contacts, which identify the depressed key as described above, generate a pulse or signal voltage on the corresponding bit channels in the line 38 in a well-known manner. The wave shapes 39 and 40 in FIG. 5 illustrate the idealized signals produced by the contacts of an activated keyboard key code switch.

The key memory 37 functions as means for temporarily storing the code associated with a depressed keyboard and may comprise seven binary elements, such as flip-flops, each of which are coupled to one of the seven channels of bit information carried by the line 38. The input to each flip-flop of the key memory 37 is gated in such a manner that an activated channel on the lead 38 does not set its corresponding flip-flop in the memory 37 until the occurrence of a gating signal on the lead 41. This can be accomplished in a well-known manner by having an AND gate at the input of each flip-flop, with the AND gate having one input provided by its associated channel in the line 38 and its other input being a gating signal which is provided on the lead 41. The wave shape 44 of FIG. 5 illustrates such a gating signal. This arrangement enables the flip-flops in the key memory 37 to be set in a manner corresponding to the code of a depressed keyboard key only when the coded key information appearing on the line 38 occurs simultaneously with the occurrence of the gate signal on the lead 41.

Each key memory flip-flop is coupled to a plurality of key gates 45, there being a gate for each flip-flop in the key memory. The occurrence of a gating signal on the lead 46 will enable, in a well-known manner, the information appearing in the key memory 37 to be passed, in parallel, through the key gates 45 to a plurality of driver circuits 47. In accordance with a preferred embodiment of the present invention, eight driver circuits are provided, with seven drivers being associated with the seven channels of information passed through the key gates 45 and the eighth driver being utilized to generate an "end-of-line" signal, as described hereinbelow. The driver circuits 47 function to amplify the coded information and to provide the necessary voltage levels required by the processor 13 of FIG. 1. The output of the driver circuits 47 appears on the line 48 which includes eight leads or channels of information.

The blocks 36 of FIG. 4 illustrate various status switches which may be utilized with the keyboard of FIG. 1. As described hereinabove, these status switches are preset to the desired condition prior to the entry of information on the keyboard. The status switches 36 each contain a plurality of contacts, corresponding ones of which are connected in parallel and coupled to a status memory 49 by way of the line 50. Wave shape 55 of FIG. 5 illustrates an idealized signal produced by a single activated contact of one of the status switches 36. In accordance with one embodiment of this invention which was constructed, each status switch 36 contained six contacts having a prearranged code which identified the selected status switch. Unlike the keyboard key switches, no parity code was utilized with the status switches. In order to provide an odd parity code, as required by the processor 13, a parity generator 51 was coupled to the status memory 49 to provide an odd parity code in a well-known manner. Accordingly, the status memory 49 comprises seven temporary storage devices, such as flip-flops, six of which are coupled to predetermined ones of the six channels of information appearing on the line 50 and the remaining flip-flop being coupled to the parity generator 51, so that the coded information in the status memory 49, and appearing on the line 56, has an odd parity. Status switch information is gated into the status memory 49 flip-flops by the occurrence of a gating signal appearing on the lead 42, as described hereinabove in conjunction with the key memory flip-flops. The coded status information appearing in the status memory 49 is coupled to the same drivers of the driver circuits 47, to which the key coded information is coupled, whenever a gating signal appears on the line 57 which opens a plurality of status gates 58, there being one status gate for each of the seven memory flip-flops in the status memory 49. Accordingly, the seven bit channels on the output line 48 which couple coded key information to the processor 13, also couple coded status switch information to the processor. As described below in detail, the status gates are opened subsequent to the opening of the key gates.

As discussed above, each keyboard key element includes a strobe contact which is activated each time its associated keyboard key is depressed. The strobe contacts of the keyboard keys 35 are connected in parallel and coupled to an integrator and shaper 60 by way of the lead 61. The signal or voltage pulse produces by an activated strobe contact is illustrated by the wave shape 62 of FIG. 5. As shown in FIG. 5, the leading edge of the keyboard strobe pulse occurs subsequent to the leading edge of a keyboard key code contact signal 39. The function of the integrator and shaper 60 is to provide a signal on the leads 41, 42 and 43 which is delayed, that is, has a leading edge which occurs subsequent to the leading edge of the strobe signal 62. This delayed signal is illustrated in FIG. 5 by the wave shape 63. Circuits suitable for use in the integrator and shaper 60 are illustrated by FIG. 8 which shows the strobe signal being applied to an integrating circuit 64, the output of which is coupled to a Schmitt trigger circuit 65 by way of the lead 66 with the output of the Schmitt trigger circuit being coupled to a power amplifier 67. The leading edge of the strobe signal 62 applied to the integrating circuit 64 causes a gradually increasing voltage to be applied to the Schmitt trigger 65. The Schmitt trigger is designed to be activated by a voltage level which only occurs at the output of the integrating circuit at a time subsequent to the occurrence of the leading edge of the strobe signal. The Schmitt trigger remains activated until after the trailing edge of the strobe signal occurs, which causes a decreasing voltage to appear at the output of the integrating circuit 64. Once this decreasing voltage reaches a sufficiently low level, the Schmitt trigger will be deactivated. It is clear, then, that the output of the Schmitt trigger comprises a voltage pulse 63 which is delayed in time relative to the strobe signal 62. The output of the Schmitt trigger is amplified by the power amplifier 67 to provide the necessary power and voltage levels. The occurrence of the output 63 of the integrator and shaper on the leads 41 and 42 enables the keyboard key code information to be placed into the key memory 37 flip-flops and the coded status switch information to be placed into the status memory 49 flip-flops, respectively. The delay of the output signal 63 of the integrator and shaper 60 with respect to the signals produced by the keyboard key 35 code contacts is slightly greater than the length of time during which the keyboard key contacts are bouncing or settling down, and thus erroneous information is prevented from entering into the key memory 37 flip-flops.

The delayed output signal 63 of the integrator and shaper also activates a clock 70 which will then apply a series of regularly occurring pulses to a timing chain 71 by way of the lead 72. After a predetermined number of such pulses are applied to the timing chain, a reset signal 75 (FIG. 5) is generated on the lead 74 to disable the clock 70. FIG. 7 illustrates a circuit which may be utilized as the clock 70 of FIG. 4, and comprises a flip-flop 80, one side of which is coupled to a free-running multivibrator 81 by way of the lead 82. The appearance of the output signal of the integrator and shaper 60 on the lead 43 to the flip-flop 80, sets the flip-flop which enables the free-running multivibrator 81, causing a series of pulses to appear on its output lead 72, as illustrated by the wave shape 84 of FIG. 5.

The reset pulse 75, generated by the timing chain, is applied to the reset lead 86 to reset the flip-flop 80 which will then disable the free-running multivibrator 81.

Referring again to FIG. 4, the timing chain, in response to the series of pulses 84 applied thereto from the clock 70, generates a key gate signal, illustrated by the wave shape 44 of FIG. 5, that is applied to the key gates 45 by way of the lead 46 to enable information in the key memory to be applied to the driver circuits 47. Subsequent to the key gate signal, the timing chain also applies a status gating signal, illustrated by the wave shape 85 of FIG. 5, to the status gates 58 by way of the line 57 to enable information in the status memory 49 to be applied to the driver circuits 47. Subsequent to the gating signal 85 applied to the status gates, the timing chain generates another gating signal 86 (FIG. 5) on the lead 73 which is applied to an end-of-line gate 87. The end-of-line gate 87 is also coupled to an end-of-line memory 88 by way of the lead 89. The end-of-line memory 88 may comprise a ground connection, or some other appropriate potential, such that the gating signal 86 appearing on the lead 73 causes an output on the lead 90 emanating from the end-of-line gate. The end-of-line output appearing on the lead 90 is applied to the eighth channel position of the driver circuits 47 and will appear in the eighth channel position in the output line 48 from the driver circuits 47. As described above, this eighth channel of information emanating from the driver circuits 47 is not utilized to transfer key or status switch data to the processor but, rather, activation of this eighth channel signifies to the electronic processor that read-in of data due to the depressed keyboard key has been completed. The timing chain also produces three processor strobe signals on the lead 91 which is coupled to the processor. These three processor strobe pulses are illustrated in FIG. 5 by the wave shape 92. The first such strobe signal has a trailing edge that occurs during the duration of the key gate signal 44, the second such signal has a trailing edge that occurs during the duration of the status gate signal 85, and the third such signal has a trailing edge that occurs during the duration of the end-of-line gate signal 86.

Accordingly, the trailing edge of the processor strobe signals 92 corresond to the time periods when key data, status data and end-of-line data, respectively, appear on the output of the driver circuits. The processor 13 utilizes the trailing edge of the processor strobe signals 92 to read in the data appearing on the output line 48 of the driver circuits.

Subsequent to the occurrence of the key gate signal, the status gate signal, the end-of-line gate signal and the processor strobe signals, the timing chain 71 generates a reset pulse, illustrated by the wave shape 75 of FIG. 5, on the lead 74 which stops the clock 70 which, in turn, stops the timing chain 71. This reset signal is also applied to the key memory 37 to reset the flip-flops therein and to the status memory 49 to reset the flip-flops therein, thereby conditioning the interface circuit of FIG. 4 for the entry of new data, due to the depression of another keyboard key 35.

In summary, the operation of the interface circuit of FIG. 4 is such that depression of a keyboard key 35 causes coded information identifying the depressed key to be set into the key memory 37 upon the occurrence of an output pulse from the integrator and shaper 60. This output, or gating pulse, also enables status information to be applied into the status memory 49. The integrator and shaper 60 output also starts the clock 70 which enables the timing chain 71 which provides a first gating signal on the lead 46 which causes the information in the key memory 37 to be applied to the output line 48 to the processor. Subsequently, a second gating signal on the line 57 causes the information in the status memory 49 to appear on the output line 48, after which the timing chain provides a third gating signal on the lead 73 which activates the eighth channel position on the output line 48 that denotes that read-in of data to the processor is complete. After this has been accomplished, the timing chain 71 provides a reset signal on the lead 74 which conditions the interface circuit for the depression of another keyboard key 35.

FIG. 6 illustrates in logic form a circuit which may be utilized as the timing chain 71 of FIG. 4 and comprises a binary counter, including four interconnected flip-flops 100, 101, 102 and 103. Each flip-flop produces a single output for each pair of inputs applied thereto, and the input of each flip-flop is the output of the preceding flip-flop. The series of pulses shown by the wave shape 84 produced by the clock 70 of FIG. 4 are applied to the flip-flop 100 by way of the lead 72, and the circuit of FIG. 6 is designed such that the 13th pulse applied to the flip-flop 100 results in the reset signal 75 that disables the clock and which also resets the four flip-flops 100, 101, 102 and 103. Since each flip-flop reduces its input by a factor of two, the flip-flop 100 will provide six output pulses for each of the thirteen input pulses, whereas the flip-flop 101 will produce three output pulses, the flip-flop 102 two output pulses (one complete pulses and another shorter pulse), and the flip-flop 103 one output pulse. The 13 input pulses, as well as the output from each side of the four flip-flops 100, 101, 102 and 103, are coupled to the two diode matrices 104 and 105 in a manner as illustrated in FIG. 6. In accordance with one embodiment of the present invention, each of the diode matrices comprised a dioded decoder, such as a Model OD-20 decoder manufactured by Computer Control Company of Framingham, Mass. The diode matrix 104 provides signals on leads 120 and 121 which set and reset, respectively, a flip-flop 106 to provide the key gate signal illustrated by wave shape 44 on the lead 46. The decoder 104 also provides a signal on lead 122 to set a flip-flop 107 which is subsequently reset by a signal from the diode matrix, or decoder, 105 on lead 123 to produce the status gate signal 85 on the lead 57. The diode matrix 105 will also set and reset the flip-flop 108 to provide the end-of-line gate signal 86 on the lead 73. Further, the diode matrix 105 will activate a one-shot multivibrator 109 by way of lead 124 to provide the reset signal 75, which not only normalizes the interface circuit of FIG. 4, but which will also reset the four flip-flops 100, 101, 102 and 103 to condition the circuit of FIG. 6 for a second burst or series of thirteen input pulses. The output of the flip-flop 101 on the lead 91 provides the three processor strobe signals shown by the wave shape 92 illustrated in FIG. 5.

Referring now to FIG. 9 there is illustrated within the dotted outline 13 arithmetic means 130, storage means 131 and 132, and control means 133 and 134 which may be utilized as the processor 13 of FIG. 1. The processor arithmetic portion 130 includes at leas three arithmetic registers R1, R2 and R3. In accordance with a preferred embodiment of the present invention, the registers R1, R2 and R3 may comprise a LIFO storage such that information retrieved therefrom is on a last-in, first-out arrangement. For example, information entered into the register R1 may be shifted up into the register R2 and then shifted down into the register R1. This shifting of data up and down a plurality of registers causes the first data to be retrieved therefrom to be the last data entered therein. Although FIG. 9 only shows three registers, R1, R2 and R3, associated with the arithmetic portion 130, a larger or smaller number of such registers may be readily utilized to provide a LIFO storage in conjunction with the arithmetic portion 130. Although not necessary for practising the present invention, there is illustrated a randomly accessible, addressable storage, or memory, 131 having nine storage registers S1 through S9 which may be utilized in conjunction with the arithmetic unit 130 for storage of numeric data. In accordance with the present invention, a FIFO storage 132 is also provided and comprises a plurality of storage registers $X_1$ through $X_n$. These registers, while variable in number, are interconnected in a well-known manner such that numeric data applied to one end thereof, by way of the line 135 and the register $X_n$, is always withdrawn at the other end from the last or bottom register $X_1$ by way of the line 136. In this manner, numeric data retrieved from the FIFO storage 132 is always withdrawn therefrom in a first-in, first-out arrangement. The number of registers X utilized in the FIFO storage 132 is determined by the maximum number of items it is necessary or desirable to have stored in the FIFO storage 132 at any given time. Specifically, the number of items in the FIFO storage X is equal to the sum total of the FIFO entries made by the operator minus, if recall is destructive, the sum total of FIFO retrieval operations made by the operator as described below.

The arithmetic portion 130, the LIFO storage associated therewith, the randomly accessible storage 131, and the FIFO storage 132 are interconnected by a plurality of data gates 134 and control circuitry 133. The keyboard key coded data and status switch coded data provided by the interface 12 are coupled to the control unit 133 and to the data gates 134 by way of the line 48 which, as discussed above, has eight channels. The three successive processor strobe signals 92, associated with each key depression, are coupled to the control unit by way of the lead 91.

The registers R1 and R2, in accordance with a preferred embodiment of the present invention, comprise arithmetic registers such that any arithmetic operation, such as addition, subtraction, multiplication, division, etc., is always performed on the numbers appearing in the registers R1 and R2, with the results of the arithmetic operation always appearing in the register R1, which may be called an operating register. The register R1 also functions as an entry register, that is, all data entering the electronic processor from the keyboard 11, and leaving the electronic processor to a suitable output device 14, is always routed via the register R1. For example, data entered into the FIFO storage 132, or into the random accessible storage 131, is always first entered into the R1 register and transferred therefrom to the appropriate storage by way of the data gates 134. Also, any numeric data applied to the output device 14 from either the storage means 131 or 132, is first transferred from the storage means, the register R1, and then is routed to the output device 14 by way of the data gates 134. As will be apparent to those skilled in the art, the use of the register R1 as an entry register is a matter of design and is not essential to the present invention.

The logic functions illustrated within the dotted outline 13 of FIG. 9 were provided in one embodiment of the invention by an IBM Model 1620 computer having modification 831,128 which provides 63-character READ/PUNCH; including IBM accessory equipment as follows: 1625-1 core storage; 1625-2 core storage; 1311-3 disc storage drives; and 1622-1card READ/PUNCH with modifications RPQM 03473. More specifically, the IBM 1620 Computer was programmed to provide the logical function illustrated in FIG. 9. This program is set forth in detail in the appendix and utilized the IBM Symbolic Programming System (SPS), more specifically SPSII-D, Monitor I System, set forth in the IBM 1620 Monitor I System in Reference Manual, File No. 1620-36, Form C26-5739-3, Page 46, et seq. It is to be understood that various program languages or codes other than those illustrated in the appendix may be employed with this or other computers to achieve the logic set forth in FIG. 9. The Selectric Typewriter and the high-speed printer associated with the IBM 1620 Computer were utilized as the output device 14 shown in FIGS. 1 and 9.

The strobe and data outputs of the interface circuit of FIG. 4 were applied to selected shoe connectors in the IBM 1620 Computer. Selected logic circuits in the computer which were coupled to the shoe connectors were energized by the driver circuits 47 of the interface and operated in accordance with instructions in the program set forth in the appendix.

The following table indicates the correspondence of the outputs from the interface 12 to the IBM shoe connectors and also presents information pertinent for operating the IBM computer in conjunction with the interface of FIG. 4.

TABLE I

| Data Bit | IBM 1620 Shoe Connector | +S Tape Level | IBM 1620 Card Type | Current Required | Signal Level On | Off |
|---|---|---|---|---|---|---|
| 1 | SCA11 | 1 | MX,CD | 2.1 ma | +S | −S |
| 2 | SCA12 | 2 | MX,CD | 2.1 ma | +S | −S |
| 4 | SCA13 | 3 | MX,CD | 2.1 ma | +S | −S |
| 8 | SCA14 | 4 | MX,CD | 2.1 ma | +S | −S |
| C | SCA15 | 5 | MX,CD | 2.1 ma | +S | −S |
| O | SCA16 | 6 | MX,CD | 2.1 ma | +S | −S |
| X | SCA17 | 7 | 2MX | 2.1 ma | +S | −S |
| End of Line | SCA18 | 8 | MX | 1.05 ma | +S | −S |
| Strobe | SCA19 | Sync Exit | CD | 1.05 ma | +S | −S |

The operation of the processor of FIG. 9 is such that the coded data coupled to the control unit 133 initiates the selected arithmetic operations, selected functions and places the selected numeric data in the desired locations. For example, the selection of the numeric keys shown in FIG. 2 correspnding to a desired input number, including the proper decimal point location, followed by a depression of the ENTER key 28, causes that number to appear in the R1 register. Entry of another number in the same manner will cause the number first entered to appear in the R2 register and the second number entered to appear in the R1 register. The depression of any of the arithmetic operation keys, such as the DIVIDE key 26, MULTIPLY key 25, SUBTRACT key 24, or ADD key 23, will cause the selected arithmetic function to be performed on the numbers appearing in the registers R1 and R2 with the result of the arithmetic operation appeaaring in the register R1. Depression of the PRINT key 29 causes the number appearing in the register R1 to be coupled to the output device 14.

A second depression of the ENTER key 28 without any intervening depression of any of the numeric keys 20, causes the number already appearing in register R1 to appear in register R2. Therefore, this number will appear simultaneously in registers R1 and R2. In like manner, the number that is already in register R2 will be shifted upward into register R3 when a new number is shifted from register R1 into register R2. In this embodiment a number already in register R3 will be lost or destroyed when a new number is shifted upwards into register R3 from register R2.

A number is entered into the random access storage 131 by depressing the appropriate numeric keys of the keyboard and subsequently depressing the STORE key 31 followed by one of the numeric keys 1 through 9 that identifies the desired storage S1 through S9. Entry of a number into the FIFO store 132, on the other hand, is accomplished by depressing the appropriate numeric keys followed by a depression of the STORE key 31 and the 0 key. Depression of the 0 key, after depression the STORE key, addresses the FIFO storage 132 and depression of one of the numeric keys, 1 through 9, after depressing the STORE key 31 addresses the proper location in the randomly accessible storage 131. The FIFO storage 132 may, alternatively, be addressed by a single key which can be readily provided on the keyboard of FIG. 2, depression of which causes a selected number to be placed in the FIFO storage 132.

Due to the plurality of registers X in the FIFO storage 132, one or more lists of numbers, in a given sequence, can be entered into the FIFO store and withdrawn therefrom in the same manner as they were entered. Intermediate results of arithmetic operations appearing in the register R1 may be entered into the randomly accessible storage 131 by merely depressing the STORE key and a numeric key which identifies the desired storage location. Likewise, intermediate results may be stored into the FIFO storage 132 by depressing the STORE key followed by depression of the 0 key. As described above, entry of intermediate results into the FIFO store may alternatively be accomplished by provision of a single key (not shown) on the keyboard. Recall of numeric data in the random storage 131 to the register Rl is accomplished by depression of the RECALL key and one of the numeral keys 1 through 9 that identifies the desired storage location. Likewise, recall of a number from the FIFO storage 132 to the register R1 is accomplished by depression of the RECALL key followed by depression of the 0 key. Again, RECALL from the FIFO store to the register R1 may alternatively be accomplished by provision of a single key on the keyboard (not shown). Information retrieved from the FIFO store 132 is on a first-in, first-out basis, so that a plurality of numbers entered into the FIFO store will be withdrawn therefrom in the same sequence or arrangement in which they were entered. Further, the information retrieved from the FIFO storage 132 may be destruct or nondestruct basis. When retrieval from the storage is nondestructive, the same number withdrawn therefrom is also entered into the uppermost register $X_n$. Numeric information recalled from the storages 131 and 132 is applied to the register R1 and may be utilized to perform arithmetic operations with a number in the register R2, or may be applied to the output device 14 by depression of the PRINT key 29 on the keyboard. Also, as will now become apparent, information may be withdrawn from the FIFO store 132 and placed into the random storage 131 and vice versa.

The advantages of the above-described calculator organization will be readily apparent by consideration of the performance of calculations requiring a plurality of arithmetic operations, such as division, multiplication, addition, subtraction, etc., wherein the arithmetic operations are repetitive in nature and the numeric data operated upon is obtained from a source of data in the form of one or more lists of numbers. As described above, each number in each list of numbers may be entered into the FIFO storage 132 in the required sequence and each number entered is retrievable from the FIFO storage in the same sequence in which it was entered, under the control of the operator by way of the keyboard. Where such a list of numbers must be referred to or used more than once during a calculation, the list may be retrieved in a nondestructive manner from the FIFO storage with the numbers retrieved being entered at the top of the storage so that they are again available on a first-in, first-out basis.

As will be apparent to those skilled in the art, a key (not shown) may be utilized on a keyboard to control whether the data being retrieved from the FIFO store 132 is done so on a destructive or nondestructive basis. Further, as the calculation progresses, intermediate results that need to be utilized later on in the calculation in a given sequence may be stored in the FIFO storage in the desired sequence, and retrieved in the same sequence entered. By having a sufficiently large capacity in the FIFO storage 132, a list of numbers may be entered therein, after which intermediate results may also be entered therein, thereby giving the operator access to a plurality of groups of numbers having a desired sequence, it being apparent that the first group of numbers entered will be the first group of numbers which can be retrieved. The operator may also interweave intermediate results with a list of numbers being utilized from the FIFO store. For example, assume that each number being retrieved from the FIFO store on a nondestructive basis is entered into the register R1 and an arithmetic operation performed between that number and another number appearing in the register R2 with the arithmetic result then appearing in the register R1. The number retrieved from the FIFO store (register $X_1$) to perform this arithmetic calculation is also placed into the register $X_n$ at the same time it is entered into the register R1. As described above, the arithmetic result appearing in the register R1 may be transferred to the FIFO store 132 and is placed into the register $X_n$ with the number previously entered into the FIFO store now appearing in the register $X_{(n-1)}$, it being understood that the total number of registers utilized for storage in the FIFO store has just been increased by one.

Since the calculations performed on one or more lists of numbers are normally processed sequentially, starting from the beginning and progressing in an orderly manner to the end, it is apparent that the capabilities described above enable such calculations to be readily performed with a substantial reduction of keyboard entries and a substantial reduction of the need to keep notes or data on a scratch pad. Since the number of manual keyboard operations that need to be performed by the operator is materially reduced, and since the number of mental decisions which the operator must make has also been substantially reduced, not only are calculations more rapidly performed, but the probability of operator error is also substantially reduced.

When performing calculations from one or more lists of numbers, it is sometimes desirable to have the capability of storing one or more numbers on other than a first-in, first-out basis. In the event that the FIFO store associated with the arithmetic unit 130 of FIG. 9 is unsuitable for this purpose, the randomly accessible addressable storage 131 may be used. As will be apparent to those skilled in the art, the use of such an addressable storage is not necessary to achieve the advantages of using the FIFO store 132 in conjunction with the arithmetic unit 130, with the FIFO store being accessible from the keyboard.

An example of the use of the present invention is set forth hereinbelow in the form of a proration problem wherein the numeric 0 key addresses the FIFO storage 132 and the numeric 1 key addresses the register S1 in the randomly accessible storage 131. The numbers employed for this sample problem are: $a_1 = 40.241912$; $a_2 = 10.258746$; $a_3 = 24.132886$; and $a_4 = 74.633544$. The left-hand column of the chart set forth below denotes the keyboard keys which must be depressed in solving this calculation, whereas the right-hand column illustrates the numeric data which may appear on the output device 14 and the middle column describes the function performed by the depression of the associated keyboard key. In this example, FIFO retrieval is on a destructive basis.

TABLE II

| PRORATION PROBLEM | | |
|---|---|---|

This example uses 4 numbers:
$a_1 = 40.241912$
$a_2 = 10.258746$
$a_3 = 24.132886$
$a_4 = 74.633544$
and calculates the ratios $r_1$, $r_2$, $r_3$, $r_4$, where
$r_n = (a_n/a_1+a_2+a_3+a_4)$
These ratios are then multiplied by a factor D to determine quantities $d_1$, $d_2$, $d_3$, $d_4$, where
$d_n = r_n(D)$

| KEY | FUNCTION | PRINT-OUT |
|---|---|---|
| ANS. DEC. | Sets 6 decimal places for answer print | |
| 6 | | |
| 4 | | |
| 0 | | |
| . | | |
| 2 | | |
| 4 | | |
| 1 | enters $a_1$ into R1 | |
| 9 | | |
| 1 | | |
| 2 | | |
| ENTER | | 40.241912 |
| ENTER | $a_1$ into R1; $a_1$ from R1 into R2 | |
| STORE | | |
| 0 | $a_1$ from R1 into FIFO; $a_1$ from R2 into R1 | |
| 1 | | |
| 0 | | |
| . | | |
| 2 | | |
| 5 | enters $a_2$ into R1; $a_1$ from R1 into R2 | |
| 8 | | |
| 7 | | |
| 4 | | |
| 6 | | |
| ENTER | | 10.258746 |

TABLE II — Continued

PRORATION PROBLEM

| | | | |
|---|---|---|---|
| ENTER | | $a_2$ into R1; $a_2$ from R1 into R2; $a_1$ from R2 into R3 | |
| | STORE | | |
| | 0 | $a_2$ from R1 into FIFO; $a_2$ from R2 into R1; $a_1$ from R3 into R2 | |
| + | | sum of $a_1 + a_2$ into R1; R2 cleared by zeros from R3 into R2 | |
| | 2 | | |
| | 4 | | |
| | . | | |
| | 1 | | |
| | 3 | | |
| | 2 | enters $a_3$ into R1; sum of $a_1 + a_2$ from R1 into R2 | |
| | 8 | | |
| | 8 | | |
| | 6 | | |
| ENTER | | | 24.132886 |
| | ENTER | $a_3$ into R1, $a_3$ from R1 into R2; sum of $a_1$ and $a_2$ from R2 into R3 | |
| | STORE | | |
| | 0 | stores $a_3$ from R1 into FIFO; $a_3$ from R2 into R1; sum of $a_1 + a_2$ from R3 into R2 | |
| | + | sum of $a_1 + a_2 + a_3$ into R1; R2 cleared by zeros from R3 into R2 | |
| | 7 | | |
| | 4 | | |
| | . | | |
| | 6 | | |
| | 3 | enters $a_4$ into R1; sum of $a_1 + a_2 + a_3$ from R1 into R2 | |
| | 3 | | |
| | 5 | | |
| | 4 | | |
| | 4 | | |
| ENTER | | | 74.633544 |
| | ENTER | $a_4$ into R1; $a_4$ from R1 into R2; sum of $a_1 + a_2 + a_3$ from R2 into R3 | |
| | STORE | | |
| | 0 | stores $a_4$ from R1 into FIFO; $a_4$ from R2 into R1; sum of $a_1 + a_2 + a_3$ from R3 into R2; | |
| | + | sum of $a_1 + a_2 + a_3 + a_4$ into R1; R2 cleared by zeros from R3 into R2 | |
| | STORE | | |
| | 1 | sum of $a_1 + a_2 + a_3 + a_4$ from R1 into S1; R1 cleared by zeros from R2 into R1 | |
| | RECALL | | |
| 0 | | $a_1$ from FIFO into R1; $a_1$ cleared from FIFO | |
| | RECALL | | |
| | 1 | $a_1 + a_2 + a_3 + a_4$ from S1 into R1; $a_1$ from R1 into R2 | |
| ÷ | | quotient $r_1$ into R1; R2 cleared by zeros from R3 into R2 | .269597 |
| ENTER | | $r_1$ into R1; $r_1$ from R1 into R2 | |
| | STORE | | |
| | 0 | $r_1$ from R1 into FIFO; $r_1$ from R2 into R1; R2 cleared by zeros from R3 into R2 | |
| | RECALL | | |
| 0 | | $a_2$ from FIFO into R1; $r_1$ from R1 into R2 | |
| | RECALL | | |
| | 1 | sum of $a_1 + a_2 + a_3 + a_4$ from S1 into R1; $a_2$ from R1 into R2; $r_1$ from R2 into R3 | |
| ÷ | | quotient $r_2$ into R1; $r_1$ from R3 into R2 | .068727 |
| ENTER | | $r_2$ into R1; $r_2$ from R1 into R2; $r_1$ from R2 into R3 | |
| | STORE | | |
| | 0 | $r_2$ from R1 into FIFO; $r_2$ from R2 into R1; $r_1$ from R3 into R2 | |
| + | | sum of $r_1 + r_2$ into R1; R2 cleared by zeros from R3 into R2 | |
| | RECALL | | |
| | 0 | $a_3$ from FIFO into R1; sum of $r_1 + r_2$ from R1 into R2; $a_3$ deleted from FIFO | |
| | RECALL | | |
| | 1 | sum of $a_1 + a_2 + a_3 + a_4$ from S1 into R1; $a_3$ from R1 into R2; sum of $r_1 + r_2$ from R2 into R3 | |
| | ÷ | quotient $r_3$ into R1; sum of $r_1 + r_2$ from R3 into R2 | .161676 |
| ENTER | | $r_3$ into R1; $r_3$ from R1 into R2; sum of $r_1 + r_2$ from R2 into R3 | |
| | STORE | | |
| | 0 | $r_3$ from R1 into FIFO; $r_3$ from R2 into R1; sum of $r_1 + r_2$ from R3 into R2 | |
| + | | sum of $r_1 + r_2 + r_3$ into R1; R2 cleared by zeros from R3 into R2 | |
| | RECALL | | |
| | 0 | $a_4$ from FIFO into R1; sum of $r_1 + r_2 + r_3$ from R1 into R2; $a_4$ cleared from FIFO | |
| | RECALL | | |
| | 1 | sum of $a_1 + a_2 + a_3 + a_4$ from S1 into R1; $a_4$ from R1 into R2; sum of $r_1 + r_2 + r_3$ from R2 into R3 | |
| ÷ | | quotient $r_4$ into R1; sum of $r_1 + r_2 + r_3$ from R3 into R2 | .500000 |
| | ENTER | $r_4$ into R1; $r_4$ from R1 into R2; sum of $r_1 + r_2 + r_3$ from R2 into R3 | |
| | STORE | | |
| | 0 | $r_4$ from R1 into FIFO; $r_4$ from R2 into R1; sum of $r_1 + r_2 + r_3$ from R3 into R2 | |
| | + | sum of $r_1 + r_2 + r_3 + r_4$ into R1; R2 cleared by zeros from R3 into R2 | |
| | PRINT | prints the sum of $r_1 + r_2 + r_3 + r_4$ from R1; contents of R1 are retained | 1.000000 |

TABLE II—Continued

PRORATION PROBLEM

| | | | |
|---|---|---|---|
| 1 | | | |
| 5 | | | |
| 6 | | enters D into R1; sum of $r_1 + r_2 + r_3 + r_4$ from R1 into R2 | |
| 2 | | | |
| 5 | | | |
| ENTER | | | 156.25 |
| | ENTER | D into R1; D from R1 into R2; sum of $r_1 + r_2 + r_3 + r_4$ from R2 into R3 | |
| | ANS. DEC. | sets 2 decimal places | |
| 2 | | for answer print | |
| | RECALL | | |
| | 0 | $r_1$ from FIFO into R1; D from R1 into R2; D from R2 into R3; sum of $r_1 + r_2 + r_3 + r_4$ from R3 destroyed | |
| × | | product $d_1$ into R1; D from R3 into R2 | 42.12 |
| | CLEAR | $d_1$ from R1 destroyed; D from R2 into R1; R2 cleared by zeros from R3 into R2 | |
| | ENTER | D into R1; D from R1 into R2 | |
| | RECALL | | |
| | 0 | $r_2$ from FIFO into R1; D from R1 into R2; D from R2 into R3; $r_2$ deleted from FIFO | |
| × | | product $d_2$ into R1; D from R3 into R2 | 10.74 |
| | CLEAR | $d_2$ deleted from R1; D from R2 into R1; R2 cleared by zeros from R3 into R1 | |
| | ENTER | D into R1; D from R1 into R2 | |
| | RECALL | | |
| | 0 | $r_3$ from FIFO into R1; D from R1 into R2; D from R2 into R3; $r_3$ deleted from FIFO | |
| × | | product $d_3$ into R1; D from R3 into R2 | 25.26 |
| | CLEAR | $d_3$ deleted from R1; D from R2 into R1; R2 cleared by zeros from R3 into R2 | |
| | RECALL | | |
| | 0 | $r_4$ from FIFO into R1; D from R1 into R2; $r_4$ deleted from FIFO | |
| × | | product $d_4$ into R1; R2 cleared by zeros from R3 into R2 | 78.13 |

The solution of the proration problem set forth above is accomplished with fewer key strokes than heretofore possible in prior art calculators and, as will be apparent from a perusal of the chart, only one addressable storage is utilized. Also, once the numbers $a_1$, $a_2$, $a_3$ and $a_4$ were entered into the calculator, no re-entry of these numbers was necessary, even though these numbers weree repetitively used throughout the calculation. By utilizing a separate key for providing access into, and from, the FIFO store 132 in a manner as described above, the necessity of using a second key stroke for addressing the FIFO store can be eliminated.

In the example given, once the ratios $r_n$ have been calculated, a quantity D is entered; this could be the total cost of some item or service such as the supply of electricity for a building having four occupants. If each entry $a_1$, $a_2$, $a_3$, $a_4$ represents, say, the amount of floor space used by each occupant, then the individual cost contributor $d_n$ of each user (in proportion to floor space used) is given by $d_n = r_n \cdot D$. The program goes on to calculate the costs $d_n$. It can be seen that to do this the ratios $r_n$ were re-stored in the FIFO as intermediate results as they were calculated and then recalled therefrom in the same sequence to calculate the costs $d_n$.

By re-storing the ratios $r_n$ in the FIFO each time they are recalled, this process could be repeated indefinitely, i.e., by entering new values of D, new lists of the contributions D could easily be produced.

Another embodiment of the present invention is illustrated in FIG. 10 which shows an arithmetic unit 140 having at least two arithmetic registers R1 and R2 associated therewith which function in a manner as described hereinabove in conjunction with FIG. 9. A display unit, which may comprise a printer, or cathode-ray tube, is coupled to the arithmetic unit by way of the line 142. Keyboard entries are entered into the arithmetic unit from a keyboard 143 by way of the line 144. Keyboard data is also applied to a control unit 145, which controls a timing unit 146 which causes the desired operations to be performed in a predetermined manner. The arithmetic portion 140, the display 141, the timing 146, the control 145 and the keyboard 143 preferably constitute a Friden Model 130 Electronic Calculator, which is described in detail in in the U.S. patent application entitled "Calculator," filed Oct. 29, 1963, Ser. No. 319,704 now U.S. Pat. No. 3,546,676, or a Friden Model 132, Electronic Calculator which is described in the U.S. Pat. application entitled "Square Root Calculator and Method" filed Apr. 1, 1966, Ser. No. 539,569 now U.S. Pat. No. 3,526,760. The advantages of the present invention may be achieved with this calculator by adding thereto a FIFO storage 147 in a manner as described above, which storage would be accessible from the keyboard 143. This modification would require additions to, or rearrangement of the circuits in the control portion 145. However, these may be readily accomplished, as is well-known by those skilled in the art, by constructing the circuitry which would satisfy the logic equations that define the incorporation and operation of the FIFO storage 147 with the arithmetic unit 140 and the keyboard 143. Since the operation of the FIFO register would be identical to that described above and would also be accessible from the keyboard, these logic equations necessary to accomplish the incorporation of the FIFO storage to the calculator can readily be derived.

FIG. 11 illustrates the calculator arrangement shown in FIG. 10 but further including an addressable storage 148 which may be incorporated into the calculator arrangement in a manner as described above in conjunction with FIG. 10. Since the functional operation of the keyboard accessible FIFO memory shown in FIGS. 10 and 11 is substantially identical to that described hereinabove, a detailed discussion of the operation of the calculator arrangements illustrated in FIGS. 10 and 11 is unnecessary.

What has been described is an electronic calculator organization which incorporates a keyboard accessible FIFO storage to enable calculations requiring a sequence of arithmetic operations to be performed with a minimum number of manual keyboard entries, thereby reducing the probability of operator error.

It is to be understood, of course, that the foregoing disclosure relates only to specific embodiments of the present invention and that numerous modifications and alterations may be made therein without departing from the spirit and scope of this invention as set forth in the appended claims.

APPENDIX

The following is a listing of an SPS-II D program for the IBM 1620 computer which will enable a calculator of the type described to be achieved. In this example the computer was fitted with a keyboard and interface circuitry as hereinbefore described. The program is written in SPS II-D assembly language and is intended to be used with the IBM disc "Monitor for Printer," No. 1620-PR-033, Version 2, Mod. level 2, Option A, dated Nov. 3, 1965. With the leader card quoted below, the disc should be used on "drive 0."

This program does, in fact, provide a calculator with more features and functions than those mentioned in the description, but these do not inhibit in any way the performance of the calculator in the manner described.

The main program "SP 1154" is preceded in the listing by eight "house" routines, eg., "CNV", "INDTST," which are in general use for computer programs. Some of the Monitor System Control Cards have been omitted from the listing and in order to assemble the program the following cards must be included:

1. Preceding each routine:
⧫⧫JOB 5
⧫⧫SPS

2. Preceding the first routine, "CNV," the loader card:
3400032007013600032007024902402511963611300102

3. Terminating each routine, the end-of-job card:
⧫ ⧫ ⧫ ⧫

Following assembly and storage on the disc, the program may be loaded into core and executed with the card sequence:
Loader card as in (2)
⧫ ⧫JOB 5
⧫ ⧫XEQ SP1154

APPENDIX

| LINE | LABEL | OP | OPERANDS AND REMARKS | PROGRAM SHEET 1 |
|---|---|---|---|---|
| | | * STORE RELOADABLE | | |
| | | **0307 STANDARD SUBROUTINE FOR OUTPUT CONVERSION | | |
| | | *LIST PRINTER | | |
| | | * SYSTEM SYMBOL TABLE | | |
| | | * ASSEMBLE RELOCATABLE | | |
| | | *ID NUMBER 0307 | | |
| | | * NAME CNV | | |
| | * | | NUMERIC TO ALFA OUTPUT CONVERTER | |
| | | DS | 5 | |
| | CNV | AM | CNT,1,10 | |
| | | BNF | RECODE,TEMPR+9,11 | |
| | C | 30 | SIGN−1,SIGNC−1 | |
| | | SF | TEMPR+10 | |
| | | TF | TEMPR,TEMPR+4,11 | |
| | | BNF | ER2,TEMPR+10 | |
| | | MF | SIGN,TEMPF | |
| | | TFM | CNV1+11,TEMPR | |
| | | SM | CNV1+11,1,10 | |
| | CNV1 | BNF | *−12,,,FLAG POSITION | |

| LINE | LABEL | OP | OPERANDS AND REMARKS | PROGRAM SHEET 1 — Continued |
|---|---|---|---|---|
| | | CF | CNV1+11,,6 | |
| | | TF | CNV2+11,CNV1+11 | |
| | CNV2 | BD | *+48,,,DIGIT POSITION | |
| | | AM | CNV2+11,1,10 | |
| | | BNR | CNV2,CNV2+11,11 | |
| | | TDM | SIGN | |
| | | TF | FMT,TEMPR+9,11 | |
| | | CF | FMT | |
| | | BNR | *+48,FMT | |
| | | TF | FMT,FMT−1 | |
| | | TF | CMV2+11,CNV1+11 | |
| | | TDM | SUPR,1,11 | |
| | | CM | CNV2+11,TEMPF−19 | |
| | | BL | ER3 | |
| | CNV3 | SM | CNV2+11,1,10 | |
| | | TDM | CNV2+11,,611 | |
| | | DD | 30 | MKR,MKRC | |
| | | BD | RS,FMT | |
| | E | BNR | CNV8,LCC,11 | |

| LINE | LABEL | OP | OPERANDS AND REMARKS | PROGRAM SHEET 2 |
|---|---|---|---|---|
| | | TDM | MKX,1,11 | |
| | H | BNF | CNV7,NUM,11 | |
| | | BNF | CNV4,SUPR | |
| | | BD | CNV4,FMT | |
| | I | SM | LOC,1,10 | |
| | | BNG | I,LOC,11 | |
| | J | BNF | CNV12,LOC,11 | |
| | | BNF | CNV13,NUM,11 | |
| | K | TFM | TEMPF,99,9 | |
| | | S | TEMPF,ALFA | |
| | | BNF | Q | |
| | | AM | ALFA,1,10 | |
| | | SF | ALFA,,6 | |
| | | B7 | CNV−1,,6, | EXIT |
| | CNV4 | TFM | ALFA,70,69 | |
| | CNV5 | SM | ALFA,2,10 | |
| | | BN | K | |
| | M | SM | LOC,1,10. | |
| | | BNG | E,LOC,11 | |
| | | BNF | J,MKR | |
| | CNV6 | BNF | H1,MKX | |
| | | TF | LOC,LOCSV | |
| | | B7 | M | |
| | H1 | AM | LOC,1,10 | |
| | | B7 | H | |
| | CNV7 | TD | SN,NUM,11 | |
| | | TF | ALFA,SN,6 | |
| | | SM | NUM,1,10 | |
| | | B7 | CNV5 | |
| | CNV8 | TD | CMP,LOC,11 | |
| | | CM | CMP,8,10 | |
| | | BE | CNV10 | |
| | | BH | CNV11 | |
| | | BNF | CNV9,NUM,11 | |
| | | BNF | CNV9,SUPR | |
| | | BD | CNV9,FMT | |
| | | B7 | I | |
| | CNV9 | TD | SA−1,LOC,11 | |

| LINE | LABEL | OP | OPERANDS AND REMARKS | PROGRAM SHEET 3 |
|---|---|---|---|---|
| | | SM | LOC,1,10 | |
| | | TD | SA,LOC,11 | |
| | | TF | ALFA,SA,6 | |
| | | B7 | CNV5 | |
| | CNV10 | TDM | SUPR,1,11 | |
| | | B7 | M | |
| | CNV11 | SM | LOC,1,10 | |
| | | BNR | *+56,LOC,11 | |
| | | BD | M,FMT | |
| | | TFM | MKX,10,10 | |
| | | TF | LOCSV,LOC | |
| | | B7 | M | |
| | | 30 | ALFA,SB,6 | |
| | | B7 | M | |
| | CNV12 | TF | FMT+1,LOC,11 | |
| | | B7 | DD | |
| | CNV13 | SF | FA | |
| | | TF | FMT,FB | |
| | | B7 | DD | |
| | * | | RECODING ROUTINE | |
| | RECODE | BNR | NEWCDS,TEMPR+10 | |
| | | SF | TEMPF−75 | |
| | | TF | TEMPF,TEMPR+9,11 | |
| | | BNF | ER1,TEMPF−75 | |
| | | TD | 99,RMF | |
| | | 30 | MKX,MKXC | |
| | | BT | SET,SET−1 | |
| | B | SM | LOC,1,10 | |
| | | 30 | ALFA−4,LOC,4 | |

| LINE | LABEL | OP | OPERANDS AND REMARKS | PROGRAM SHEET 3 —Continued |
|---|---|---|---|---|
| | | SM | LOC,1,10 | |
| T | | BNR | U,TEMPF | |
| V | | TD | LOC,TEMPF-1,6 | |
| | | CF | LOC,,6 | |
| | | SM | LOC,1,10 | |
| | | TD | LOC,TEMPR,6 | |
| | | B7 | W | |
| U | | TFM | TESTC,X | |
| | | BTM | TEST,RE3 | |

| LINE | LABEL | OP | OPERANDS AND REMARKS | PROGRAM SHEET 4 |
|---|---|---|---|---|
| | | BTM | TEST,RE4 | |
| | | BTM | TEST,RE5 | |
| | | BTM | TEST,RE6 | |
| | | B7 | V | |
| | RE3 | TD | LOc,RMF,6 | |
| | | TDM | MKX,1,11 | |
| | | B7 | SER | |
| | RE4 | TDM | LOC,8,6 | |
| | | TDM | 99 | |
| | | B7 | W | |
| | RE5 | TFM | LOC,9,69 | |
| | | DC | 1,,*-1 | |
| | | B7 | RE7 | |
| | RE6 | BNF | L,MKX | |
| | | TFM | LOC,19,69 | |
| | RE7 | SM | LOC,1,10 | |
| | W | TDM | MKX | |
| | SER | SM | LOC,1,10 | |
| | L | BTM | NEXT,*+24 | |
| | | BTM | SCTION,T | |
| | RERE | TD | LOC,GM,6 | |
| | | TD | ALFA,TYPE,6 | |
| | | BTM | NEXT,RE10 | |
| | | BTM | SCTION,B | |
| | RE10 | SF | LOC,,6 | |
| | | BD | *+24,99 | |
| | | TF | 99,98 | |
| | | SF | 99 | |
| | | TF | TEMPR+9,99,6 | |
| | | B7 | C | |
| * | | | SETUP NEW CODE CODES | |
| | NEWCDS | TF | CODES,TEMPR+14,11 | |
| | | BNF | ER4,F-1 | |
| | | TFM | NW+6,F-1 | |
| | NW | SF | NW+6,1,10 | |
| | | AM | NW+6,1,10 | |
| | | TF | 99,NW+6,11 | |
| | | BD | *+36,99 | |

| LINE | LABEL | OP | OPERANDS AND REMARKS | PROGRAM SHEET 5 |
|---|---|---|---|---|
| | | BD | *+24,98 | |
| | | TD | NW+6,RMF,6 | |
| | | AM | NW+6,1,10 | |
| | | BNR | *-84,NW+6,11 | |
| | | B7 | RECODE+12 | |
| * | | | SIGN TEST ROUTINE | |
| | RS | TFM | *+59,RS1+6 | |
| | | A | *+47,SIGN | |
| | | TD | CMP,FMT | |
| | | A | *+23,CMP | |
| | | BD | E | |
| | | B7 | I | |
| | RS1 | DSC | 21,000111101100111010101 | |
| * | | | NEXT ITEM ROUTINE | |
| | | DS | 5 | |
| | NEXT | BNF | *+20,CNV | |
| | | B7 | NEXT-1,,6 | |
| | | BNF | *+20,TEMPF-2 | |
| | | B7 | NEXT-1,,6 | |
| | | TF | TEMPF,TEMPF-2,10 | |
| | SET | MF | CNV,TEMPF-1 | |
| | | SF | TEMPF-1 | |
| | | BB2 | | |
| * | | | CODE TEST ROUTINE | |
| | TESTC | DS | 5 | |
| | | DS | 5 | |
| | TEST | BNR | *+26,TESTC,11 | |
| | | AM | TESTC,2,10 | |
| | | BB2 | | |
| | | C | TESTC,TEMPF,6 | |
| | | BNE | *-26 | |
| | | B7 | TEST-1,,6 | |
| * | | | SECTION TYPE CODE ANALYZER | |
| | | DS | 5 | |
| | SCTION | BNR | *+20,TEMPF | |
| | | B7 | *-13,,6 | |
| | | TFM | TESTC,F | |
| | | BTM | TEST,SC4 | |

| LINR | LABEL | OP | OPERANDS AND REMARKS | PROGRAM SHEET 6 |
|---|---|---|---|---|
| | | BTM | TEST,SC1 | |
| | | BTM | TEST,SC2 | |
| | | BTM | TEST,SC3 | |
| | | B7 | SCTION-1,,6 | |
| | SC3 | AM | TYPE,2,10 | |
| | SC2 | AM | TYPE,1,10 | |
| | SC1 | AM | TYPE,1,10 | |
| | SC4 | B7 | RERE | |
| * | | | ERROR ROUTINES | |
| | ER1 | BTM | ER,1,10 | |
| | | TF | TEMPR+9,59,610 | |
| | Q | TFM | 99,,10 | |
| | | TFM | TEMPR,2,9 | |
| | | B7 | CNV-1,,6 | |
| | ER2 | BTM | ER,2,10 | |
| | | B7 | Q | |
| | ER3 | BTM | ER,3,10 | |
| | | TFM | CNV2+11,TEMPF-19 | |
| | | B7 | CNV3 | |
| | ER4 | BTM | ER,4,10 | |
| | | SF | F-1 | |
| | | B7 | NEWCDS+24 | |
| | | DS | 2 | |
| | ER | TNF | ERM1,*-1 | |
| | | TNF | ERM2,CNV-1 | |
| | | TNF | ERM4,CNT | |
| | | WATY | ERM | |
| | | RCTY | | |
| | | CM | CNT,,10 | |
| | | BNZ | *+24 | |
| | | H | | |
| | | BB2 | | |
| | ERM | DAC | 08,CNV ER99 | |
| | ERM1 | DS | 0,* | |
| | ERM2 | DC | 12,0 | |
| | ERM4 | DC | 8,0 | |
| | | DC | 2, | |
| * | | | MARKS AND ADDRESSES | |

| LINE | LABEL | OP | OPERANDS AND REMARKS | PROGRAM SHEET 7 |
|---|---|---|---|---|
| | MKR | DS | 1 | |
| | MKX | DS | 1 | |
| | LOC | DS | 5 | |
| | | DC | 3, | |
| | SIGNC | DC | 2,7 | |
| | | DSA | TEMPF | |
| | MKXC | DSC | 1,0 | |
| | | DC | 3,0 | |
| | | DC | 3,99 | |
| | SIGN | DS | 2 | |
| | NUM | DS | 5 | |
| | SUPR | DS | 1 | |
| | ALFA | DS | 5 | |
| | TYPE | DS | 2 | |
| | MKRC | DSC | 2,0 | |
| | | DSA | FMT-1 | |
| | | DC | 1, | |
| | LOCSV | DS | 5 | |
| | SN | DC | 3,70 | |
| | SA | DC | 3,0 | |
| | SB | DSC | 3,5 | |
| | FA | | | |
| | GM | | | |
| | | DC | 1, | |
| | | DC | 1, | |
| | | DSC | 1,9 | |
| | FB | DSC | 1,0 | |
| | CNT | DC | 3,0 | |
| | CMP | DC | 2,0 | |
| * | | | ABSOLUTE ADDRESSED | |
| | RMF | DS | 0,RM | |
| | FMT | DS | 0,TEMPF-22 | |
| * | | | CODE CODES | |
| | F | DC | 2,46 | |
| | P | DC | 2,57 | |
| | Z | DC | 2,69 | |
| | N | DC | 2,55 | |
| | X | DC | 2,67 | |
| | S | DC | 2,62 | |

| LINE | LABEL | OP | OPERANDS AND REMARKS | PROGRAM SHEET 8 |
|---|---|---|---|---|
| | D | DC | 2,44 | |
| | G | DC | 2,47 | |
| | CODES | DS | 0,* | |
| | | DC | 1, | |
| | | DEND | CNV | |

*LIST PRINTER
* ASSEMBLE RELOCATABLE

| LINE | LABEL | OP | OPERANDS AND REMARKS | PROGRAM SHEET 8 — Continued |
|------|-------|-----|------|------|
| | | * STORE RELOADABLE | | |
| | | * ID NUMBER 0304 | | |
| | | * NAME INDTST | | |
| | | * | SET | FLAG AT ZERO OR SW1 ON |
| | | | DS | TO GET TYPEOUTS 5 |
| | INDTSTAM | | *+9,000,810,E/Z ON | |
| | | BNI | *−13,1900,6 | |
| | | BNI | *+24,0600 | |
| | | BTM | MSG,C0600 | |
| | | BNI | *+24,0700 | |
| | | BTM | MSG,C0700 | |
| | | BNI | *+24,1600 | |
| | | BTM | MSG,C1600 | |
| | | BNI | *+24,1700 | |
| | | BTM | MSG,C1700 | |
| | | BNI | *+24,2500 | |
| | | BTM | MSG,C2500 | |
| | | BNI | *+24,3600 | |
| | | BTM | MSG,C3600 | |
| | | BNI | *+24,3700 | |
| | | BTM | MSG,C3700 | |
| | | BNI | *+24,3800 | |
| | | BTM | MSG,C3800 | |
| | | BCI | *+24 | |
| | | BNF | *+36 | |
| | | BZ | *+24 | |
| | | RCTY | | |
| | | B7 | INDTST−1,,6 | |
| | | DS | 5 | |

| LINE | LABEL | OP | OPERANDS AND REMARKS | PROGRAM SHEET 9 |
|------|-------|-----|------|------|
| | MSG | BCI | *+24 | |
| | | BNF | *+36 | |
| | | WATY | MSG−1,,6 | |
| | | SPTY | | |
| | | AM | *+9,100,810,H/P ON | |
| | | BB2 | | |
| | C0600 | DAC | 11,READ CHECK | |
| | C0700 | DAC | 12,WRITE CHECK | |
| | C1600 | DAC | 11,MBRE CHECK | |
| | C1700 | DAC | 11,MBRO CHECK | |
| | C2500 | DAC | 14,PRINTER CHECK | |
| | C3600 | DAC | 14,ADDRESS CHECK | |
| | C3700 | DAC | 17,WLR OR RBC CHECK | |
| | C3800 | DAC | 19,CYL OVERFLOW CHECK | |
| | | DEND | INDTST | |

*LIST PRINTER
* ASSEMBLED RELOCATABLE
* STORE RELOADABLE
* ID NUMBER 0303
* NAME INDOFF

| | | DS | 5 | |
|---|---|---|---|---|
| | INDOFFBNI | | *−1,1900,6 | |
| | | BNI | *+12,0600,, | READ CHECK |
| | | BNI | *+12,0700,, | WRITE CHECK |
| | | BNI | *+12,1600,, | MBRE CHECK |
| | | BNI | *+12,1700,, | MBRO CHECK |
| | | BNI | IND1,2500,, | PRINTER PARITY CHECK |
| | | BNI | IND1,2500,, | PRINTER SYNCH CHECK |
| | | RCTY | | |
| | | WATY | MS1 | |
| | | H | | |
| | | B7 | INDOFF | |
| | IND1 | BNI | INDOFF−1,3900,6, | ANY DISK CHECK |
| | | BI | *+12,3600,, | ADDRESS CHECK |
| | | BI | *+12,3700,, | WLR,RBC CHECK |
| | | BI | *+12,3800,, | CYL O-FLOW CHECK |

| LINE | LABEL | OP | OPERANDS AND REMARKS | PROGRAM SHEET 10 |
|------|-------|-----|------|------|
| | | B7 | INDOFF−1,,6 | |
| | MS1 | DAC | 50,PRINTER SYNCH CHECK INDICATOR IS ON, PUSH 1443 RES | |
| | | DAC | 03,ET | |
| | | DEND | INDOFF | |

* ID NUMBER 0338
* STORE RELOADABLE
* ASSEMBLE RELOCATABLE
* SYSTEM SYMBOL TABLE
* LIST PRINTER
* NAME CGENIN
** NAME CGENIN    CHARACTER GENERATOR INPUT ROUTINE
   *       FEED   CODE IN STATUS INPUT TRANSLATES TO CODE 07
           DS     5
   CGENINBNF      C1,*+14
           CF     *+2,,2
   A       CALL   LOAD,INDTST
           TF     INDTST,ENTRY
           CALL   LOAD,INDOFF

| LINE | LABEL | OP | OPERANDS AND REMARKS | PROGRAM SHEET 10 — Continued |
|------|-------|-----|------|------|
| | | TF | INDOFF,ENTRY | |
| | | B7 | CGENIN−1,,6 | |
| | C1 | TF | EOL,ZEROES+4 | |
| | | BTM | INDOFF,*+12,67 | |
| | | RAPT | READIN | |
| | | BTM | INDTST,*+12,67 | |
| | | BP | C1 | |
| | | BNR | *+20,EOL | |
| | | B7 | C9 | |
| | | BNR | C1,STATE | |
| | * | CORRECT THE FEED CODE INPUT | | |
| | | TFM | EOL,700,8 | |
| | | DC | 1,,* | |
| | C9 | BTM | RMT,READIN | |
| | | BTM | RMT,STATE | |
| | | TR | TEMPR,READIN−1 | |

| LINE | LABEL | OP | OPERANDS AND REMARKS | PROGRAM SHEET 11 |
|------|-------|-----|------|------|
| | | SF | TEMPR+2 | |
| | | B7 | CGENIN−1,,6 | |
| | | DS | 5 | |
| | RMT | BNR | BB2,*−1,11 | |
| | | BNG | RMT1,RMT−1,11 | |
| | | TFM | RMT−1,27,610 | |
| | | BB2 | | |
| | RMT1 | TFM | RMT−1,22,610 | |
| | | BB2 | | |
| | INDTST | DS | 5 | |
| | INDOFF | DS | 5 | |
| | | DORG | A | |
| | READIN | DAS | 1 | |
| | STATE | DAS | 1 | |
| | EOL | DAS | 1 | |
| | | DEND | CGENIN | |

*LIST PRINTER
* SYSTEM SYMBOL TABLE
* ASSEMBLE RELOCATABLE
* STORE RELOADABLE
* ID NUMBER 0342
* NAME OP1154
** NAME OP      1154         OUTPUT ROUTINE
   *            SW 2         ON FOR PRINTER OUPPUT
   AUX          DS    0,TEMPF−50
                DC    50,0
                DSC   50,0
   FORM         DS    0,*
                DS    5
   OP1154       NOP
                BNF   PR1,*+2,2
                CF    *−10
   *            CALCULATE WIDTH OF PRINTOUT
                TF    99,OP1154−1
                S     PR4+6,99
                S     PR5+11,99

PROGRAM SHEET 12

| LINE LABEL | OP | OPERANDS AND REMARKS | |
|---|---|---|---|
| | AM | 99,11,10 | |
| | A | 99,99 | |
| | A | CY1+6,99 | |
| | A | CY1+11,99 | |
| | TF | CY2+6,CY1+6 | |
| | TF | PR2+11,CY1+11 | |
| | TF | PR3+6,CY1+6 | |
| | A | PR6+6,CY1+6 | |
| | TF | *+30,CY1+6 | |
| | AM | *+18,2,10 | |
| | TF | ,RM | |
| | CALL | LOAD,CNV | |
| | TF | CNV,ENTRY | |
| | TFM | TEMPF,CYTAPE | |
| | TFM | TEMPF−5,BLTAPE | |
| | BB2 | | |
| PR1 | TF | AUX1,AUX | |
| PR2 | TF | ,,,,TEMPF | CLEAR PRINTOUT AREA |
| PR3 | TF | ,TEMPF,,,, | PLACE PRONTER CODES |
| PR4 | SF | AUX1−1,,2 | |
| PR5 | BD | *+24,AUX1−2 | |
| | SF | AUX1−2 | |
| | CM | AUX1−2,,10 | |
| | BNZ | *+32 | |
| | TF | 99,FORMZ | |
| | B7 | PR22 | |
| | TF | FORM,FORMS | |
| | SF | AUX1−1 | |
| | TFM | PR7+6,FORM−10 | |
| PR9 | NOP | | |
| | SM | DEC,1,10 | |
| | BN | PR8 | |
| PR7 | TFM | ,67,9,,,, | PLACE DECIMAL X |
| | SM | PR7+6,2,10 | |
| | B7 | PR9 | |
| PR8 | NOP | | |
| | TF | PR7+6,FORMX,6 | |
| | TR | TEMPR,CNVR | |

PROGRAM SHEET 13

| LINE | LABEL | OP | OPERANDS AND REMARKS | |
|---|---|---|---|---|
| | | BTM | CNV,*+12,67 | |
| | PR22 | NOP | | |
| | PR6 | TF | −10,99,2,,,, | PLACE CNV OUTPUT |
| | | BT | COMP,OP1154−1 | |
| | PL | DAC | 1, ,,,, | |
| | | DSC | 50,0 | |
| | | DSC | 50,0 | |
| | CNV | DC | 5,99999 | |
| | AUX1 | DC | 50,0 | |
| | DEC | DS | 0,* | |
| | CNVR | DS | 0,*+1 | |
| | | DSA | AUX1−2 | |
| | | DSA | FORM | |
| | | DC | 1, | |
| | FORMX | DSAC | 08,F XXXDS, | |
| | FORMS | DSAC | 06, PZ N− | |
| | FORMZ | DSAC | 03,0, ,,,, | FORMAT FOR ZERO |
| | | DS | 5 | |
| | CYTAPE | NOP | | |
| | CY1 | TF | PL−2,ZEROES−2,2 | |
| | CY2 | TF | ,TEMPF | |
| | | BT | COMP,CYTAPE−1 | |
| | | DS | 5 | |
| | COMP | NOP | | |
| | | BNC2 | *+32 | |
| | | PRA | PL | |
| | | B7 | COMP−1,,6 | |
| | WATY | PL | | |
| | | RCTY | | |
| | | B7 | COMP−1,,6 | |
| | | DS | 5 | |
| | BLTAPE | NOP | | |
| | | BNC2 | *+32 | |
| | | SPIM | ,1 | |
| | | B7 | BLTAPE−1,,6 | |
| | | RCTY | | |
| | | B7 | BLTAPE−1,,6 | |
| | | DEND | OP1154 | |

PROGRAM SHEET 14

| LINE | LABEL | OP | OPERANDS AND REMARKS | |
|---|---|---|---|---|

*LIST PRINTER
* SYSTEM SYMBOL TABLE
* ASSEMBLE RELOCATABLE
* STORE RELOADABLE
* ID NUMBER 0341
* NAME FL1154
** NAME FL1154    CONVERT FIXED TO FLOAT FOR 1154 SIMULATOR

| | AUX | DS | 0,TEMPF−50 | |
|---|---|---|---|---|
| | | DS | 5 | |
| | FL1154 | BNF | CFFTA,*+14 | |
| | | CF | *+2,,2 | |
| | | TF | A5+11,TEMPF,,,, | DEC |

PROGRAM SHEET 14 — Continued

| LINE | LABEL | OP | OPERANDS AND REMARKS | |
|---|---|---|---|---|
| | | TF | A7+11,TEMPF,,,, | DEC |
| | | TF | A8+11,TEMPF,,,, | DEC |
| | | TF | A1+11,TEMPF−5,,,, | N1 |
| | | TF | A3+6 ,TEMPF−5,,,, | N1 |
| | | A | A4+11,TEMPF−5,,,, | N1 |
| | | A | A6+11,TEMPF−5,,,, | N1 |
| | | S | CFFTA+6,TEMPF−10,,,, | L |
| | | S | A2+6,TEMPF−10,,,, | L |
| | | S | A9+6,TEMPF−10,,,, | L |
| | | S | A4+11,TEMPF−15,,,, | N |
| | | S | A6+11,FL1154−1,,,, | P |
| | | BB2 | | |
| | CFFTA | TDM | AUX+1,1,211,,,, | SUBTRACT L FROM P ADDRESS |
| | A1 | BNF | *+24,,,, | Q ADDRESS IS N1 |
| | A2 | TDM | AUX+1,0,211,,,, | SUBTRACT L FROM P ADDRESS |
| | A3 | CF | ,,,, | P ADDRESS IS N1 |
| | A4 | TFM | *+30,2,,,,,, | ADD N1-N TO Q ADDRESS |
| | A5 | A | *+18,,,, | Q ADDRESS IS DEC |
| | CFFL1 | SF | | |
| | A6 | TFM | *+35,−1,,,, | ADD N1-P TO Q ADDRESS |
| | A7 | A | *+23,,,, | Q ADDRESS IS DEC |
| | CFFL2 | TF | AUX−2 | |
| | | TDM | CFFL1+6,,6 | |
| | | CM | CFFL1+6,,610 | |

PROGRAM SHEET 15

| LINE | LABEL | OP | OPERANDS AND REMARKS | |
|---|---|---|---|---|
| | A8 | TF | AUX,,,, | Q ADDRESS ID DEC |
| | | CF | AUX−1 | |
| | A9 | CF | AUX+2,,2,,,, | SUBTRACT L FROM P ADDRESS |
| | A10 | B7 | FL1154−1,,6 | |
| | | DEND | FL1154 | |

*LIST PRINTER
* STORE CORE IMAGE
* ID NUMBER 0335
* NAME KONSTS
** NAME KONSTS    0335

| | ENTRY | DS | 0,420 |
|---|---|---|---|
| | FILL | DS | 0,434 |
| | MDRIVE | DS | 0,99999 |
| | SYSORG | DSS | 18 |
| | TEMPR | DS | 0,*+1 |
| | | DC | 50,0 |
| | | DSC | 50,0 |
| | TEMPF | DS | 0,* |
| | GM | DGM | |
| | NB | DNB | 1, |
| | ZEROES | DAC | 7, ......SEVEN BLANKS |
| | | DSC | 50,0 |
| | | DSC | 50,0 |
| | | DSC | 50,0 |
| | | DSC | 50,0 |
| | | DSC | 50,0 |
| | RM | DAC | 1, |
| | MARKR1 | DSC | 1,0 |
| | | DC | 5,99999 |
| | MSG | WATY | *−1,,6 |
| | RH | RCTY | |
| | | BNC1 | *+24 |
| | | H | |
| | BB2 | BB2 | |
| | MARKR2 | DSC | 1,0 |
| | | DC | 5,99999 |

PROGRAM SHEET 16

| LINE | LABEL | OP | OPERANDS AND REMARKS |
|---|---|---|---|
| | RDN | RDN | *−1,,6 |
| | | BNI | BB2,1900 |
| | | SK | RDN−1,,6 |
| | | B7 | RDN |
| | | DC | 5,99999 |
| | WDN | WDN | *−1,,6 |
| | | BNI | BB2,1900 |
| | | SK | WDN−1,,6 |
| | | B7 | WDN |
| | | DSC | 50,0 |
| | | DSC | 29,0 |
| | NEWORG | DS | 0,*+1 |
| | CORE | DS | 0,20000 |
| | | DEND | SYSORG |

*LIST PRINTER
* SYSTEM SYMBOL TABLE
* ASSEMBLE RELOCATABLE
* STORE RELOADABLE
* ID NUMBER 0306

27

| LINE | LABEL | OP | OPERANDS AND REMARKS | PROGRAM SHEET 16 — Continued |
|---|---|---|---|---|
| | * NAME CLEARC | | | |
| | ** CLEARC | | | |
| | * | | CALL AS FOLLOWS | |
| | * | CALL | LOAD,CLEARC | |
| | * | TF | TEMPR+4,FILL | |
| | * | TFM | TEMPR+9,CORE−1 | |
| | * | BTM | ENTRY,*+12,67 | |
| | | DS | 5 | |
| | C120 | DS | 0,ZEROES+2*120−2 | |
| | CLEARC | TF | 99,TEMPR+9 | |
| | | S | 99,TEMPR+4 | |
| | | BNP | CC2 | |
| | | CM | 99,239,9 | |
| | | BL | CC1 | |
| | | TF | TEMPR+9,C120,6 | |
| | | SM | TEMPR+9,239,9 | |
| | | B7 | *−84 | |

| LINE | LABEL | OP | OPERANDS AND REMARKS | PROGRAM SHEET 17 |
|---|---|---|---|---|
| | CC1 | TFM | *+35,ZEROES−1 | |
| | | A | *+23,99 | |
| | | TF | TEMPR+9,,6 | |
| | CC2 | BN | *+24 | |
| | | TDM | TEMPR+4,,6 | |
| | | B7 | CLEARC−1,,6 | |
| | | DEND | CLEARC | |

```
* SYSTEM SYMBOL TABLE
* STORE RELOADABLE
*LIST PRINTER
* NAME SP1154
** NAME---FRIDEN 1154 COMPUTER MOD V---R H WATERS---
00000* FRIDEN 1154 COMPUTER MOD V---R H WATERS---
00010*      SW 1    ON FOR DEBUGGING
00020*      SW 2    ON FOR PRINTER OUTPUT
00030*      SW 3    ON FOR AUDIT-TRAIL
00040*      SW 4    ON FOR MANUAL INTERRUPT
00050*      LIGHT 1 = LOAD/EDIT INDICATOR (ON=A OFF=B)
00060*      LIGHT 2 = AUTOMATIC MODE INDICATOR (ON=C OFF=D)
00070*      LIGHT 3 = MANUAL MODE INDICATOR (ON=E OFF=F)
00080*      LIGHT 4 = ERROR/OVERFLOW INDICATOR (ON=G OFF=H)
00090*              DEFINITIONS OF CONSTANTS FOR ASSEMBLY
00100NRS    DS      0,5,,,,         NUMBER OF REGISTERS IN THE STACK
00110P      DS      0,12,,,,        STACK REGISTER LENGTH
00120L      DS      0,P+3,,,,       SIMULATED REGISTER LENGTH
00130LMP    DS      0,L−P
00140N      DS      0,2*P+2,,,,     FIXED POINT NUMBER LENGTH
00150*      NUMBER OF CHARACTERS OF PROGRAM, LIST, AND ADDRESSABLE STORAGE
00160TLGN   DS      0,1000          ,,,,TOTAL DELAY LINE LENGTH
00170*      INPUT KEYSTROKE CODE STORAGE AREA
00180START  B7      BEGIN
00190       DORG    TEMPR
00200IN     DAS     1               ,,,,FIRST DIGIT KEY CODE
00210KEY    DS      0,*,,,,         ,,,,SECOND DIGIT KEY CODE
```

| LINE | LABEL | OP | OPERANDS AND REMARKS | PROGRAM SHEET 18 |
|---|---|---|---|---|
| 00220 | STATE | DAS | 1 | |
| 00230 | EOL | DAS | 1 | |
| 00240 | AUX | DS | 0,TEMPF−50 | |
| 00250 | ZERO | DS | 0,ZEROES+2*53−2 | |
| 00260* | | | | |
| 00270* | | | | |
| 00280 | | DORG | NEWORG | |
| 00290* | | | | |
| 00300 | MATR | DSB | 10,100 | |
| 00310* | STACK | | | |
| 00320 | ZC | DC | L,0,,,, | FORMAT FOR ZERO |
| 00330 | S0 | DS | L | |
| 00340 | S1 | DS | L | |
| 00350 | S2 | DS | L | |
| 00360 | S3 | DS | L | |
| 00370 | S4 | DS | L | |
| 00380 | S5 | DS | L | |
| 00390 | S6 | DS | L | |
| 00400 | S7 | DS | L | |
| 00410 | S8 | DS | L | |
| 00420 | S9 | DS | L | |
| 00430 | STACK | DS | 0,*+1 | |
| 00440 | R1 | DS | L | |
| 00450 | R2 | DS | 0,R1+L | |
| 00460 | RN | DS | NRS*L−L,,,, | ADDRESS OF TOP STACK REGISTER |
| 00470 | | DC | 1, | |
| 00480 | LS | DS | 0,RN−STACK+1 | |
| 00490 | SCC | DSS | LS−1,,,, | STACK CLEARING CONSTANT |
| 00500 | SCX | DSS | 2 | |
| 00510 | NR | DS | 2,,,, | NUMBER OF REGISTERS IN STACK |
| 00520* | | | | |
| 00530* | FIXED POINT DATA REGISTERS | | | |
| 00540 | ZER | DC | N,0 | |
| 00550 | | DSC | N+P+1,0 | |

28

| LINE | LABEL | OP | OPERANDS AND REMARKS | PROGRAM SHEET 18 — Continued |
|---|---|---|---|---|
| 00560 | Z1 | DS | 0,* | |
| 00570 | N1 | DS | N | |
| 00580 | | DSC | 2, | |
| 00590 | N2 | DS | N | |

| LINE | LABEL | OP | OPERANDS AND REMARKS | PROGRAM SHEET 19 |
|---|---|---|---|---|
| 00600 | | DSC | 2, | |
| 00610* | | | | |
| 02000* | ROTATE THE STACK UPWARDS | | | |
| 02010 | | DS | 5 | |
| 02020 | ROTATE | NOP | | |
| 02030 | | SF | RN−L+1 | |
| 02040 | | TF | AUX,RN | |
| 02050 | | BT | UPSHFT,UPSHFT−1 | |
| 02060 | | TF | R1,AUX | |
| 02070 | | B7 | ROTATE−1,,6 | |
| 02080* | | | | |
| 02090* | STACK OVERFLOW ERROR RETURN | | | |
| 02100 | STKOVF | NOP | | |
| 02110 | | TDM | MK6,1,11 | ,,,,SET ERROR RETURN |
| 02120* | | TDM | ER1,1,11 | ,,,,PRINT STACK OVER FLOW MESSAGE |
| 02130 | | BB2 | | |
| 02140* | | | | |
| 02150* | UPSHIFT THE STACK | | | |
| 02160 | UPSHFT | NOP | | |
| 02170 | | TF | RN,RN−L | |
| 02180 | | CF | R1+1 | |
| 02190 | | C | SOC,NR | |
| 02200 | | BE | STKOVF | ,,,,TEST FOR STACK OVERFLOW |
| 02210 | | AM | SOC,1,10 | |
| 02220 | | BB2 | ,,0 | |
| 02230* | | | | |
| 02240 | SOC | DC | 2,,,, | STACK OCCUPANCY COUNTER |
| 02250* | DOWNSHIFT THE STACK | | | |
| 02260 | DNSHFT | TRNM | STACK,STACK+L | |
| 02270 | | SF | STACK | |
| 02280 | | TF | RN,ZC | |
| 02290 | | CF | RN−L+1 | |
| 02300 | | CM | SOC,,10 | |
| 02310 | | BE | *+24 | |
| 02320 | | SM | SOC,1,10 | |
| 02330 | | BB2 | | |
| 02340* | | | | |
| 02350* | TEST FOR R1 OVERFLOW | | | |

| LINE | LABEL | OP | OPERANDS AND REMARKS | PROGRAM SHEET 20 |
|---|---|---|---|---|
| 02360 | | DS | 5 | |
| 02370 | OVTST | NOP | | |
| 02380 | | BD | *+20,R1−1 | |
| 02390 | | B7 | OVTST−1,,6 | |
| 02400 | | TDM | ER3,1,11 | ,,,,R1 OVERFLOW |
| 02410 | | BTM | OVRFLO,*+12 | |
| 02420 | | B7 | OVTST−1,,6 | |
| 02430* | DOWNSHIFT STACK AND SET ERROR INDICATOR | | | |
| 02440 | | DS | 5 | |
| 02450 | OVRFLO | NOP | | |
| 02460 | | BT | DNSHFT,DNSHFT−1 | |
| 02470 | | TDM | MK1 | ,,,,LAST KEY WAS NOT 0-9 |
| 02480 | | TDM | MK2,1,11 | ,,,,R1 HAS BEEN PRINTED |
| 02490 | | TDM | MK6,1,11 | ,,,,SET ERROR FLAG |
| 02500 | | B7 | OVRFLO−1,,6 | |
| 02510* | | | | |
| 03000* | GET ADDRESS OF DATA REGESTER | | | |
| 03010 | | DS | 5 | |
| 03020 | GAOSN | NOP | | |
| 03030 | | TD | *+21,KEYS | |
| 03040 | | MM | *+9,L,710 | |
| 03050 | | AM | 99,S0 | |
| 03060 | | B7 | GAOSN−1,,6 | |

| LINE | LABEL | OP | OPERANDS AND REMARKS | PROGRAM SHEET 20 — Continued |
|---|---|---|---|---|
| 03070* | | | | |
| 03080 | KEYS | DC | 2,0 | |
| 03090* | | | | |
| 03100* | | | PREPARE N DIGIT NUMBER AT TRANSMITTED ADDRESS, FROM AUX | |
| 03110 | | DS | 5 | |
| 03120 | PNNTA | TF | *−1,ZER,6 | |
| 03130 | | SF | AUX−L+2 | |
| 03140 | | TF | PNNT1+6,PNNTA−1 | |
| 03150 | | SF | AUX−1 | |
| 03160 | | SM | PNNTA−1,P+1 | |
| 03170 | | A | PNNTA−1,AUX | |
| 03180 | | A | PNNTA−1,AUX−2,6 | |
| 03190 | | BD | *+24,AUX−L+1 | |
| 03200 | PNNT1 | SF | | |
| 03210 | | CF | PNNTA−1,,6 | |

| LINE | LABEL | OP | OPERANDS AND REMARKS | PROGRAM SHEET 21 |
|---|---|---|---|---|
| 03220 | | BB2 | | |
| 03230* | | | | |
| 03240* | | | DECIMAL ALIGN NUMBER IN AUX | |
| 03250 | | DS | 5 | |
| 03260 | DANA | C | DEC,AUX | |
| 03270 | | BV | *+12 | |
| 03280 | | BE | DANA−1,,6 | |
| 03290 | | BTM | PNNTA,N1 | |
| 03300 | | NOP | | |
| 03310 | | BTM | FL1154,*+12,67 | |
| 03320 | | B7 | DANA−1,,6 | |
| 03330* | | | | |
| 03340* | | | ROUND N1 | |
| 03350 | | DS | 5 | |
| 03360 | RN1 | NOP | | |
| 03370 | | TFM | *+30,N1−P | |
| 03380 | | A | *+18,DEC | |
| 03390 | | AM | ,5,10 | |
| 03400 | | B7 | RN1−1,,6 | |
| 03410* | | | | |
| 03420* | | | CONVERT 2 OPERANDS TO FIXED POINT | |
| 03430 | | DS | 5 | |
| 03440 | N1N2 | NOP | | |
| 03450 | | TF | AUX,R1 | |
| 03460 | | BTM | PNNTA,N1 | |
| 03470 | | BT | DNSHFT,DNSHFT−1 | |
| 03480 | | TF | AUX,R1 | |
| 03490 | | BTM | PNNTA,N2 | |
| 03500 | | B7 | N1N2−1,,6 | |
| 03510* | | | | |
| 03520* | | | | |
| 05000* | | | ADD AND SUBTRACT ROUTINE | |
| 05010 | | DS | 5 | |
| 05020 | ADD | NOP | | |
| 05030 | | TF | SUB−1,ADD−1 | |
| 05040 | | B7 | COMM | |
| 05050 | | DS | 5 | |
| 05060 | SUB | NOP | | |

| LINE | LABEL | OP | OPERANDS AND REMARKS | PROGRAM SHEET 22 |
|---|---|---|---|---|
| 05070 | | BD | *+32,R1−L+1 | |
| 05080 | | TDM | R1−L+1,1,11 | |
| 05090 | | B7 | COMM | |
| 05100 | | TDM | R1−L+1,,11 | |
| 05110 | COMM | NOP | | |
| 05120 | | BTM | N1N2,*+12 | |
| 05130 | | A | N1,N2 | |
| 05140 | | BTM | RN1,*+12 | |
| 05150 | | BTM | FL1154,*+12,67 | |
| 05160 | | BNZ | *+44 | |
| 05170 | | TF | R1,AUX | |
| 05180 | | B7 | SUB−1,,6 | |
| 05190 | | BT | OVRFLO,SUB−1 | |
| 05200* | | | | |
| 10000* | | | PROGRAM, ADDRESSABLE, AND DATA LIST STORAGE | |
| 10010 | FFMIN | DAS | TLGN | |
| 10020 | FFMAX | DS | 0,* | |
| 10030 | | DC | 1, | |
| 10040* | | | | |
| 10050* | | | FIFO REGISTER POINTERS | |
| 10060 | FSOAD | DSA | FFMIN | |
| 10070 | FP1AD | DSA | FFMIN | |
| 10080 | FP2AD | DSA | FFMIN | |
| 10090 | FP3AD | DSA | FFMIN | |
| 10100 | FP4AD | DSA | FFMIN | |
| 10110 | FP5AD | DSA | FFMIN | |
| 10120 | FP6AD | DSA | FFMIN | |
| 10130 | FP7AD | DSA | FFMIN | |
| 10140 | FP8AD | DSA | FFMIN | |
| 10150 | FP9AD | DSA | FFMIN | |
| 10160 | FP0AD | DSA | FFMIN | |

| LINE | LABEL | OP | OPERANDS AND REMARKS | PROGRAM SHEET 22 — Continued |
|---|---|---|---|---|
| 10170* | | | | |
| 10180* | | | FIFO LIST REGISTER POINTER (RGPNT) | |
| 10190 | RGPNT | DSA | FSOAD | |
| 10200* | | | N+1 REGISTER POINTER | |
| 10210 | RNPNT | DS | 5,0 | |
| 10220* | | | FIFO LIST CHARACTER POINTER (FFPNT) | |
| 10230 | FFPNT | DSA | FFMIN | |

| LINE | LABEL | OP | OPERANDS AND REMARKS | PROGRAM SHEET 23 |
|---|---|---|---|---|
| 10240* | | | END OF LIST POINTER | |
| 10250 | FFEND | DSA | FFMIN | |
| 10260* | | | GENERAL LIST AND STEP POINTERS | |
| 10270 | ALIST | DC | 5,0 | |
| 10280 | ASTEP | DC | 5,0 | |
| 10290* | | | | |
| 10300* | | | EXECUTION INDEX POINTER | |
| 10310 | XNDEX | DC | 5,0 | |
| 10320* | | | EXECUTION LIST POINTER (ELIST) | |
| 10330 | ELIST | DC | 5,1 | ,,,ELIST=1 |
| 10340* | | | EXECUTION INSTRUCTION STEP POINTER | |
| 10350 | ESTEP | DC | 5,0 | |
| 10360* | | | INSTRUCTION CODE BUFFER | |
| 10370 | FCODE | DC | 2,70 | |
| 10380* | | | | |
| 10390* | | | DATA LIST POINTER (DLIST) | |
| 10400 | DLIST | DC | 5,0 | |
| 10410* | | | FIFO DATA COUNTER | |
| 10420 | DSTEP | DC | 5,0 | |
| 10430* | | | FIFO DATA MARK REGISTER AND INDICATOR (FMARK, TMARK) | |
| 10440 | FMARK | DC | 5,0 | |
| 10450 | TMARK | DC | 2,0 | |
| 10460* | | | | |
| 10470* | | | | |
| 12000* | | | INSERT FCODE AND DROP FF STACK | |
| 12010 | | DS | 5 | |
| 12020 | FFLOAD | NOP | | |
| 12030 | | BTM | GFFPNT,*+12 | |
| 12040 | | CM | FFEND,FFMAX−2 | |
| 12050 | | BP | FFOVF | |
| 12060 | | BE | FFOVF | |
| 12070 | | SF | FFPNT,,6 | |
| 12080 | | TF | FFMAX,FFMAX−2 | |
| 12090 | | AM | FFEND,2,7 | |
| 12100 | | TF | *+30,FFPNT | |
| 12110 | | AM | *+18,2,7 | |
| 12120 | | CF | *,,2 | |
| 12130 | | TF | *+30,FFPNT | |

| LINE | LABEL | OP | OPERANDS AND REMARKS | PROGRAM SHEET 24 |
|---|---|---|---|---|
| 12140 | | AM | *+18,1,7 | |
| 12150 | | TF | *,FCODE,2 | |
| 12160 | | CF | FFPNT,,6 | |
| 12170 | | TDM | UPDN+1,1,,,, | ADD IMMEDIATE |
| 12180 | | BTM | FUPDN,*+12 | |
| 12190 | | B7 | FFLOAD−1,,6 | |
| 12200* | | | | |
| 12210* | | | OBTAIN FCODE AND RAISE FF STACK | |
| 12220 | | DS | 5 | |
| 12230 | FFUP | NOP | | |
| 12240 | | TFM | ASTEP,0 | |
| 12250 | | BTM | FFEXT,*+12 | |
| 12260 | | C | FFPNT,RNPNT,11 | |
| 12270 | | BL | FFUP2 | ,,,,BRANCH LOW |
| 12280 | | TFM | FCODE,99,10 | |
| 12290 | | TFM | ASTEP,0 | |
| 12300 | | B7 | FFUP−1,,6 | |
| 12310 | FFUP2 | TF | *+35,FFPNT | |
| 12320 | | AM | *+23,2,7 | |
| 12330 | | TRNM | FFPNT,*,6711 | ,,,,RAISE THE STACK |
| 12340 | | TDM | UPDN+1,2 | ,,,,SUBTRACT IMMEDIATE |
| 12350 | | BTM | FUPDN,*+12 | |
| 12360 | | SM | FFEND,2 | |
| 12370 | | B7 | FFUP−1,,6 | |
| 12380* | | | | |
| 12390* | | | | |
| 12400* | | | UPDATE FF STACK REGISTER POINTERS | |
| 12410 | | DS | 5 | |
| 12420 | FUPDN | NOP | | |
| 12430 | | TF | *+30,RGPNT | |
| 12440 | | AM | *+18,5,7 | |
| 12450 | UPDN | AM | *,2,2 | ,,,ADD OR SUBTRACT 2 |
| 12460 | | CM | *−6,FPOAD,7 | |
| 12470 | | BL | UPDN−12 | |
| 12480 | | B7 | FUPDN−1,,6 | |
| 12490* | | | | |
| 12500* | | | | |
| 12510* | | | GET FF REGISTER POINTER | |

PROGRAM SHEET 25

| LINE | LABEL | OP | OPERANDS AND REMARKS | |
|---|---|---|---|---|
| 12520 | | DS | 5 | |
| 12530 | GRGPNT | NOP | | |
| 12540 | | MM | ALIST,5 | |
| 12550 | | SF | 95 | |
| 12560 | | TF | RGPNT,99 | |
| 12570 | | AM | RGPNT,FS0AD,7 | |
| 12580 | | B7 | GRGPNT−1,,6 | |
| 12590* | | | | |
| 12600* | | | | |
| 12610* | GET FF STORAGE POINTER | | | |
| 12620 | | DS | 5 | |
| 12630 | GFFPNT | NOP | | |
| 12640 | | BTM | GRGPNT,*+12 | |
| 12650 | | TF | FFPNT,RGPNT,11 | |
| 12660 | | A | FFPNT,ASTEP | |
| 12670 | | TF | RNPNT,RGPNT | |
| 12680 | | AM | RNPNT,5 | |
| 12690 | | B7 | GFFPNT−1,,6 | |
| 12700* | | | | |
| 12710* | | | | |
| 12720* | OBTAIN FCODE FROM FF STACK | | | |
| 12730 | | DS | 5 | |
| 12740 | FFEXT | NOP | | |
| 12750 | | BTM | GFFPNT,*+12 | |
| 12760 | | C | FFPNT,RNPNT,11 | |
| 12770 | | BNL | FFEX9 | ....BRANCH NOT LOW |
| 12780 | | SF | FFPNT,,6 | |
| 12790 | | TF | *+35,FFPNT | |
| 12800 | | AM | *+23,1,7 | |
| 12810 | | TF | FCODE,*,7 | |
| 12820 | | CF | FFPNT,,6 | |
| 12830 | | B7 | FFEXT−1,,6 | |
| 12840 | FFEX9 | TFM | FCODE,99,10 | |
| 12850 | | B7 | FFEXT−1,,6 | |
| 12860* | | | | |
| 12870* | | | | |
| 12880* | GET PROGRAM CODE FROM STORAGE FOR EXECUTION | | | |
| 12890 | | DS | 5 | |

PROGRAM SHEET 26

| LINE | LABEL | OP | OPERANDS AND REMARKS | |
|---|---|---|---|---|
| 12900 | GPC | BC4 | MANUAL | |
| 12910 | | TFM | ALIST,1 | |
| 12920 | | TF | ASTEP,ESTEP | |
| 12930 | | BTM | FFEXT,*+12 | |
| 12940 | | C | FFPNT,RNPNT,11 | |
| 12950 | | BNL | GPC2 | ....BRANCH NOT LOW |
| 12960 | | TF | TEMPR+1,FCODE | |
| 12970 | | TFM | TEMPR+3,,10 | |
| 12980 | | TF | TEMPR+5,RM | |
| 12990 | | AM | ESTEP,2 | |
| 13000 | | B7 | GPC−1,,6 | |
| 13010 | GPC2 | TFM | ESTEP,0 | |
| 13020 | | C | FP1AD,FP2AD | |
| 13030 | | BE | FFUND | |
| 13040 | | B7 | GPC | |
| 13050* | | | | |
| 13060* | | | | |
| 13070* | | | | |

**EXECUTE SKIPEXECUTE SKIP**EXECUTE SKIP

| LINE | LABEL | OP | OPERANDS | REMARKS |
|---|---|---|---|---|
| 13080 | | DS | 5 | |
| 13090 | ESKIP | NOP | | |
| 13100 | | TD | MS29+16,HODD | ....HIGH ORDER DIGIT |
| 13110 | | TD | MS29+18,LODD | ....LOW ORDER DIGIT |
| 13120 | | TDM | XFLAG | |
| 13130 | FSKIP | BTM | GPC,*+12,,, | GET PROGRAM CODE |
| 13140 | | CM | FCODE,99,10 | ....TEST FOR END OF LIST |
| 13150 | | BNE | *+24 | ....BRANCH IF NOT END OF LIST |
| 13160 | | TDM | XFLAG,1,11 | ....SET END OF LIST FLAG |
| 13170 | | CM | FCODE,26,10 | ....TEST FOR DD INSTRUCTION |
| 13180 | | BNE | FSKIP | ....GET MORE CODE |
| 13190 | | BTM | GPC,*+12 | ....GET HIGH ORDER DIGIT |
| 13200 | | C | HODD,FCODE | ....TEST FOR HIGH ORDER DIGIT MATCH |
| 13210 | | BNE | FSKIP | ....CONTINUE THE SEARCH |
| 13220 | | BTM | GPC,*+12 | ....GET LOW ORDER DIGIT |
| 13230 | | C | LODD,FCODE | ....TEST FOR LOW ORDER DIGIT MATCH |
| 13240 | | BNE | FSKIP | ....CONTINUE THE SEARCH |
| 13250 | | BNC1 | REF | |
| 13260 | | WATY | MS29 | ....WRITE THE SKIP MESSAGE |
| 13270 | | RCTY | | |

PROGRAM SHEET 27

| LINE | LABEL | OP | OPERANDS AND REMARKS | |
|---|---|---|---|---|
| 13280 | | B7 | REF | |
| 13290* | | | | |
| 13300 | XFLAG | DC | 1,0 | ....END OF INSTRUCTION LIST FLAG |
| 13310* | | | | |
| 13320* | | | | |
| 14000* | ADD DATA TO BOTTOM OF FS0AD FROM S0 | | | |
| 14010 | | DS | 5 | |
| 14020 | SFIFO | NOP | | |
| 14030 | | AM | FFEND,L | |
| 14040 | | CM | FFEND,FFMAX−2 | |
| 14050 | | BP | OFIFO | |
| 14060 | | BE | OFIFO | |
| 14070 | | SF | FP1AD,,6 | |
| 14080 | | TF | FFMAX,FFMAX−L | |
| 14090 | | TFM | RGPNT,FS0AD | |
| 14100 | | TFM | UPDN+11,L,7 | |
| 14110 | | TDM | UPDN+1,1 | ....ADD IMMEDIATE |
| 14120 | | BTM | FUPDN,*+12 | |
| 14130 | | TFM | UPDN+11,2,7 | |
| 14140 | | AM | DSTEP,L | |
| 14150 | | CF | FP1AD,,6 | |
| 14160 | | IF | FFPNT,FP1AD | |
| 14170 | | SM | FFPNT,1,7 | |
| 14180 | | IF | FFPNT,S0,6 | |
| 14190 | | B7 | SFIFO−1,,6 | |
| 14200 | OFIFO | NOP | | |
| 14210 | | SM | FFEND,L | |
| 14220 | | B7 | FFOVF | |
| 14230* | | | | |
| 14240* | | | | |
| 14250* | TAKE DATA FROM TOP OF FS0AD AND PLACE IN S0 | | | |
| 14260 | | DS | 5 | |
| 14270 | RFIFO | NOP | | |
| 14280 | | TF | S0,ZC | |
| 14290 | | C | FS0AD,FP1AD | |
| 14300 | | BE | FFUND | |
| 14310 | | BNF | FFUND,FS0AD,11 | |
| 14320 | | TF | FFPNT,FS0AD | |

PROGRAM SHEET 28

| LINE | LABEL | OP | OPERANDS AND REMARKS | |
|---|---|---|---|---|
| 14330 | | AM | FFPNT,L−1 | |
| 14340 | | SM | DSTEP,L | |
| 14350 | | IF | S0,FFPNT,11 | |
| 14360 | | TFM | RGPNT,FS0AD | |
| 14370 | | SM | FFEND,L | |
| 14380 | | AM | FFPNT,1 | |
| 14390 | | TRNM | FS0AD,FFPNT,611 | |
| 14400 | | TFM | UPDN+11,L,7 | |
| 14410 | | TDM | UPDN+1,2 | |
| 14420 | | BTM | FUPDN,*+12 | |
| 14430 | | TFM | UPDN+11,2,7 | |
| 14440 | | CF | S0−L+1 | |
| 14450 | | TD | TMARK,S0−L+1 | |
| 14460 | | CM | TMARK,2,10 | |
| 14470 | | BE | UMARK0 | |
| 14480 | | CM | TMARK,3,10 | |
| 14490 | | BE | UMARK1 | |
| 14500 | | SF | S0−L+1 | |
| 14510 | | B7 | RFIFO−1,,6 | |
| 14520 | UMARK0 | TDM | S0−L+1,0,11 | |
| 14530 | | TDM | MK9,1,11 | |
| 14540 | | B7 | RFIFO−1,,6 | |
| 14550 | MARK1 | TDM | S0−L+1,1,11 | |
| 14560 | | TDM | MK9,1,11 | |
| 14570 | | B7 | RFIFO−1,,6 | |
| 14580* | | | | |
| 14590* | | | | |
| 14600* | LIST FIFO SUBROUTINE | | | |
| 14610 | | DS | 5 | |
| 14620 | FFLST | NOP | | |
| 14630 | | TD | MKK9,MK9 | |
| 14640 | | TDM | MK9 | |
| 14650 | | TF | FFCNT+11,FP1AD | |
| 14660 | FFCNT | CM | FS0AD,*,7 | |
| 14670 | | BE | FLST8 | |
| 14680 | | SM | FFCNT+11,L,7 | |
| 14690 | | BTM | RFIFO,*+12 | |
| 14700 | | BTM | SFIFO,*+12 | |

```
LINE LABEL   OP      OPERANDS AND            PROGRAM SHEET 29
                     REMARKS
14710        BNF     LSNM,MK9
14720        BTM     MARKF,*+12
14730        TFM     TEMPF-4,5400
14740        TDM     MK9
14750        B7      LSWM
14760LSNM    TFM     TEMPF-4,0000
14770LSWM    NOP
14780        TFM     TEMPF,0,8
14790        CF      TEMPF-3
14800        TF      AUX,S0
14810        BTM     OP1154,*+12,67
14820        B7      FFCNT
14830FLSTR   NOP
14840        TD      MK9,MKK9
14850        B7      FFLST-1,,6
14860*
14870MKK9    DSC     1,0
14880*
14890*
14900*   SUBROUTINE TO CLEAR LAST FIFO ENTRY
14910        DS      5
14920CLFIFO  NOP
14930        C       FS0AD,FP1AD         ....IS FIFO EMPTY
14940        BE      FFUND               ....IF SO SET ERROR
                                             INDICATOR
14950        SM      FFEND,L             ....UPDATE
                                             STORAGE COUNT
14960        TF      FFPNT,FP1AD
14970        SM      FFPNT,L
14980        TRNM    FFPNT,FP1AD,611     ....RAISE THE STACK
14990        TFM     *+30,FS0AD          ....UPDATE REGISTER
                                             POINTERS
14000        AM      *+18,5,7
15010CLFL    SM      *,L,2               ....SUBTRACT REGISTER
                                             LENGTH
15020        CM      *-6,FP0AD,7
15030        BL      CLFL-12
15040        B7      CLFIFO-1,,6         ....RETURN
15050*
15060*
15070*   CLEAR FIFO STACK
15080        DS      5

LINE LABEL   OP      OPERANDS AND            PROGRAM SHEET 30
                     REMARKS
15090CFIFO   NOP
15100        TDM     MK9                 ....RESET MARK REGISTER
15110        TRNM    FS0AD,FP1AD,611
15120        TF      99,FP1AD
15130        S       99,FS0AD
15140        SF      95
15150        S       FFEND,99
15160        TFM     FFX+6,FS0AD
15170        AM      FFX+6,5
15180FFX     S       *,99,2
15190        CM      FFX+6,FP0AD
15200        BE      CFIFO-1,,6
15210        B7      FFX-12
15220*
15230*
15240*   FF STACK OVERFLOW
15250        DS      5
15260FFOVF   NOP
15270        TDM     MK6,1,11
15280        TDM     ER2,1,11
15290        B7      REF
15300*
15310*   FIFO LIST EMPTY
15320        DS      5
15330FFUND   NOP
15340        TDM     MK6,1,11            ....SET ERROR INDICATOR
15350        TDM     ER10,1,11
15360        B7      REF
15370*
20000*
20010DEC     DC      2,9                 ....OPERATIONAL DECIMAL
                                             COUNT
20020REG1    DC      10,0
20030TKAD    DC      2,0                 ....MAGNETIC BELT
                                             TRACK ADDRESS
20040DKAD    DC      2,0                 ....CHAIN SECTOR ADDRESS
20050RACD    DAS     81                  ....I/O BUFFER
20060RACD1   DAS     50                  ....DISK I/O BUFFER
20070RACD2   DAS     50                  ....DISK I/O BUFFER
20080*

LINE LABEL   OP      OPERANDS AND            PROGRAM SHEET 31
                     REMARKS
20090*
20100MS1     DAC     49,FRIDEN MODEL 1154 SIMULATOR-SEPTEMBER 21, 1966
20110MS2     DAC     26,SWITCH 1 ON FOR DEBUGGING
20120MS3     DAC     31,SWITCH 2 ON FOR PRINTER OUTPUT
20130MS4     DAC     28,SWITCH 3 ON FOR AUDIT-TRAIL
20140MS5     DAC     34,SWITCH 4 ON FOR PROGRAM INTERRUPT

LINE LABEL   OP      OPERANDS AND            PROGRAM SHEET 31
                     REMARKS
20150MS7     DAC     17,ADDRESS REQUIRED
20160MS8     DAC     17,STORAGE OVERFLOW
20170MS9     DAC     17,DIVISION BY ZERO
20180MS10    DAC     18,DIVISION OVERFLOW
20190MS11    DAC     10,LOAD/EDIT
20200MS13    DAC     10,AUTOMATIC
20210MS14    DAC     7,MANUAL
20220MS15    DAC     24,SQUARE ROOT OF NEGATIVE
20230MS16    DAC     12,R1 OVERFLOW
20240MS17    DAC     15,STACK OVERFLOW
20250MS18    DAC     34,ILLEGAL KEY CODE-
                       RESET REQUIRED
20260MS19    DAC     3,XX
20270MS20    DAC     14,STORAGE EMPTY
20280MS21    DAC     6,RESET
20290MS22    DAC     24,MULTIPLICATION OVERFLOW
20300MS23    DAC     26,INPUT CARD SEQUENCE ERROR
20310MS29    DAC     11,SKIP TO 00
20320MS30    DAC     5,/XX/
20330MS31    DAC     22,DISK STORAGE OVERFLOW
20340*
20350*
20360ER1     DSC     1,0     ....STACK OVERFLOW
20370ER2     DSC     1,0     ....STORAGE OVERFLOW
20380ER3     DSC     1,0     ....R1 OVERFLOW
20390ER4     DSC     1,0     ....DIVISON BY ZERO
20400ER5     DSC     1,0     ....SQUARE ROOT OF NEGATIVE
20410ER6     DSC     1,0     ....ILLEGAL INSTRUCTION CODE
20420ER7     DSC     1,0     ....MULTIPLICATION OVERFLOW
20430ER8     DSC     1,0     ....DIVISION OVERFLOW
20440ER9     DSC     1,0     ....ADDRESS REQUIRED
20450ER10    DSC     1,0     ....EMPTY LIST
20460ER11    DSC     1,0     ....INPUT CARD SEQUENCE

LINE LABEL   OP              OPERANDS            PROGRAM SHEET 32
                             AND
                             REMARKS
20470ER12    DSC     1,0             ....DISK STORAGE
                                         OVERFLOW
20480*
20490*   SIGNAL AND CONTROL LIGHT CONSTANTS
20500*
20510ILM     DC      2,41            ....LOAD MODE
20520NLM     DC      2,42            ....NOT LOAD MODE
20530*
20540IAM     DC      2,43            ....AUTOMATIC MODE
20550NAM     DC      2,44            ....NOT AUTOMATIC
                                         MODE
20560*
20570IRM     DC      2,45            ....READY STATE
20580NRM     DC      2,46            ....NOT READY STATE
20590*
20600IER     DC      2,47            ....ERROR INDICATOR
20610NER     DC      2,48            ....NOT ERROR STATE
20620*
20630IKL     DC      2,49            ....LOCK KEYBOARD
20640NKL     DC      2,51            ....UNLOCK KEYBOARD
20650*
20660*
20670*   MACHINE STATUS CONDITIONS
20680*       MK1 = J         IF LAST KEY WAS 0-9 OR
                                 DECIMAL
20690*       MK1 = 0         IF NOT
20700MK1     DSC   1,0
20710*       MK2 = 0         IF R1 HAS NOT BEEN PRINTED
20720*       MK2 = J         IF R1 HAS BEEN PRINTED
20730MK2     DSC = 1,0
20740*       MK3 = J         IF MACHINE IS IN READY
                                 STATE
20750*       MK3 = 0         IF NOT
20760MK3     DSC = 1,0
20770*       MK4 = J         IF MACHINE IS IN LOAD MODE
20780*       MK4 = 0         IF NOT
20790        DSC   1,0
20800*       MK5 = J         IF MACHINE IS IN AUTOMATIC
                                 MODE
20810*       MK5 = 0         IF NOT
20820MK5     DSC   1,0
20830*       MK6 = 0         ERROR INDICATOR IS OFF
20840*       MK6 = J         ERROR INDICATOR IS ON

LINE LABEL   OP      OPERANDS AND            PROGRAM SHEET 33
                     REMARKS
20850MK6     DSC   1,0
20860*       MK7 = 0   IF NO DUMP
20870*       MK7 = J   IF DUMP OPERATION
20880MK7     DSC   1,0
```

| LINE | LABEL | OP | OPERANDS AND REMARKS | PROGRAM SHEET 33 —Continued |
|---|---|---|---|---|
| 20890* | | | MK8 = J LAST CODE WAS ONE REQUIRING AN ADDRESS | |
| 20900* | | | MK8 = 0 NOT | |
| 20910 | MK8 | DSC | 1,0 | |
| 20920* | | | MK9 = J IF MARK FLIP FLOP IS SET | |
| 20930* | | | MK9 = 0 IF MARK FLIP FLOP IS NOT SET | |
| 20940 | MK9 | DSC | 1,0 | |
| 20950* | | | MK10 = J PRINTER UNDER ANSWER DECIMAL CONTROL | |
| 20960* | | | MK10 = 0 PRINTER UNDER FREE FORMAT CONTROL | |
| 20970 | MK10 | DSC | 1,0 | |
| 20980* | | | MK11 = J DECIMAL POINT ADDRESS POSSIBLE | |
| 20990* | | | MK11 = 0 DECIMAL POINT ADDRESS NOT OK | |
| 20000 | MK11 | DSC | 1,0 | |
| 21010* | | | MK12 = J DELETE LOAD CODE MODE | |
| 21020* | | | MK12 = 0 NOT IN DELETE MODE | |
| 21039 | MK12 | DSC | 1,0 | |
| 21040* | | | | |
| 21050* | | | | |
| 21060* | | | SUBROUTINE TO CONTROL SIGNAL LIGHTS | |
| 21070 | | DS | 5 | |
| 21080 | LIGHT | NOP | | |
| 21090 | | CF | SIGNAL−1 | |
| 21100 | | W | APTSIGNAL | |
| 21110 | | TFM | NDELAY,0 | ....SET DELAY COUNT TO ZERO |
| 21120 | | | DELAY TIME = NUMBER OF ITERATIONS * 340 MICRO-SECONDS | |
| 21130 | | AM | NDELAY,1 | |
| 21140 | | CM | NDELAY,30 | ....10.2 MS DELAY |
| 21150 | | BNE | *−24 | |
| 21160 | | B71 | LIGHT−1,,6 | ....RETURN |
| 21170 | NDELAY | DC | 5,0 | ....SIGNAL LIGHT DELAY COUNTER |
| 21180 | SIGNAL | DAC | 2,A | |
| 21190 | | | | |
| 21200* | | | | |
| 21210* | | | VARIABLE DRIVE DISK IOCS | |
| 21220 | | DS | 5 | |

| LINE | LABEL | OP | OPERANDS AND REMARKS | PROGRAM SHEET 34 |
|---|---|---|---|---|
| 21230 | RDNX | TD | *−1,DRIVE,6 | |
| 21240 | | TF | RDN−1,*−13 | |
| 21250 | | B7 | RDN | |
| 21260 | | DS | 5 | |
| 21270 | WDNX | TD | *−1,DRIVE,6 | |
| 21280 | | TF | WDN−1,*−13 | |
| 21290 | | B7 | WDN | |
| 21300 | | H | | |
| 21310* | | | | |
| 21320* | | | | |
| 21330* | | | | |
| 21340 | EDDA | DDA | ,,05400,1,RACD−1 | |
| 21350 | FDDA | DDA | ,,05500,1,RACD−1 | |
| 21360 | CATA | DDA | ,,05400,1,RACD1−1 | |
| 21370 | CATB | DDA | ,,05500,1,RACD2−1 | |
| 21380 | CATC | DDA | ,,05400,1,RACD2−1 | |
| 21390* | | | | |
| 21400* | | | | |
| 21410* | | | SUBROUTINE TO WRITE EXTERNAL DATA | |
| 21420 | | DS | 5 | |
| 21430 | EOUT | NOP | | |
| 21440 | | CM | TKAD,0,10 | ....TEST FOR CARD OUTPUT |
| 21450 | | BNE | EDISK | |
| 21460 | | WNCD | RACD−1 | ....PUNCH A CARD |
| 21470 | | B7 | EOUT−1,,6 | ....RETURN |
| 21480 | EDISK | NOP | | ....WRITE A DISK SECTOR |
| 21490 | | CM | MAG1,0,10 | ....TEST FOR FIRST SECTOR |
| 21500 | | BNE | EDISK5 | |
| 21510* | | | CLEAR OLD CHAIN ADDRESSES ATTACHED TO TKAD | |
| 21520 | | TF | CATC+5,TKAD | ....LOAD TRACK ADDRESS |
| 21530 | | CF | CATC+4 | |
| 21540 | | BTM | RDNX,CATC | ....READ OLD DATA INTO RACD2 |
| 21550 | | SF | RACD2+80 | |
| 21560 | | CF | RACD2+81 | |
| 21570 | | TF | DKAD,RACD2+81 | |
| 21580 | | BTM | FCAS,*+12 | ....OBTAIN FIRST CHAIN ADDRESS ....FREE CHAIN ADDRESS SEQUENCE |
| 21590 | | BTM | NFCA,+12 | ....OBTAIN NEXT FREE CHAIN ADDRESS |
| 21600* | | | WRITE INITIAL DISK SECTOR | |

| LINE | LABEL | OP | OPERANDS AND REMARKS | PROGRAM SHEET 35 |
|---|---|---|---|---|
| 21610 | | TF | EDDA+5,TKDA | |
| 21620 | | CF | EDDA+4 | |
| 21630 | | BTM | WDNX,EDDA | ....WRITE INITIAL DISK SECTOR |
| 21640 | | B7 | EOUT−1,,6 | ....RETURN |

| LINE | LABEL | OP | OPERANDS AND REMARKS | PROGRAM SHEET 35 —Continued |
|---|---|---|---|---|
| 21650* | | | WRITE CHAIN SECTOR | |
| 21660 | EDISK5 | NOP | | |
| 21670 | | TF | FDDA+5,DKAD | |
| 21680 | | CF | FDDA+4 | |
| 21690 | | BTM | NFCA,*+12 | ....OBTAIN NEXT FREE CHAIN ADDRESS |
| 21700 | | BTM | WDNX,FDDA | ....WRITE CHAIN SECTOR |
| 21710 | | B7 | EOUT−1,,6 | ....RETURN |
| 21720* | | | | |
| 21730* | | | +SUBROUTINE TO FREE CHAIN ADDRESS SECTORS | |
| 21740 | | DS | 5 | |
| 21750 | FCAS | NOP | | |
| 21760 | | BTM | RDNX,CATA | ....READ AVAILABILITY SECTOR |
| 21770 | FCASS | CM | DKAD,0,10 | ....TEST FOR DKAD=0 |
| 21780 | | BE | FCAS9 | |
| 21790 | | TFM | FCASF+6,RACD1−1 | |
| 21800 | | A | FCASF+6,DKAD | |
| 21810 | FCASF | CF | *,,2 | ....FREE CHAIN SECTOR |
| 21820* | | | OBTAIN NEXT CHAIN ADDRESS | |
| 21830 | | TF | CATB+5,DKAD | ....LOAD TRACK ADDRESS |
| 21840 | | CF | CATB+4 | |
| 21850 | | BTM | RDNX,CATB | ....OBTAIN NEXT CHAIN SECTOR |
| 21860 | | SF | RACD2+80 | |
| 21870 | | CF | RACD2+81 | |
| 21880 | | TF | DKAD,RACD2+81 | |
| 21890 | | B7 | FCAS5 | |
| 21900* | | | WRITE NEW AVAILABILITY SECTOR | |
| 21910 | FCAS9 | BTM | WDNX,CATA | ....WRITE AVAILABILITY SECTOR |
| 21920 | | B7 | FCAS−1,,6 | ....RETURN |
| 21930* | | | | |
| 21940* | | | SUBROUTINE TO OBTAIN NEXT FREE CHAIN ADDRESS | |
| 21950 | | DS | 5 | |
| 21960 | NFCA | NOP | | |
| 21970 | | CM | MAG5,0 | ....IS THIS THE LAST RECORD |
| 21980 | | BNE | *+32 | |

| LINE | LABEL | OF | OPERANDS AND REMARKS | PROGRAM SHEET 36 |
|---|---|---|---|---|
| 21990 | | TFM | DKAD,0,10 | |
| 21000 | | B7 | NFCA−1,,6 | ....RETURN |
| 22010* | | | OBTAIN NEXT FREE CHAIN ADDRESS | |
| 22020 | | BTM | RDNX,CATA | ....READ AVAILABILITY SECTOR |
| 22030 | | TFM | DKAD,1,10 | |
| 22040 | | TFM | NXT11+11,RACD1−,7 | |
| 22050 | NXT11 | BNF | NXT44,*,7 | |
| 22060 | | AM | DKAD,1,10 | ....DKAD = DKAD + 1 |
| 22070 | | AM | NXT11+11,1,7 | |
| 22080 | | CM | DKAD,99,10 | ....TEST FOR DISK OVERFLOW |
| 22090 | | BE | NXT43 | |
| 22100 | | B7 | NXT11 | |
| 22110 | NXT43 | TDM | ER12,1,11 | ....DISK STORAGE OVERFLOW |
| 22120 | | TDM | MK6,1,11 | ....SET ERROR INDICATOR |
| 22130 | NXT44 | TF | NXT45+6,NXT11−+11 | |

| LINE | LABEL | OP | OPERANDS AND REMARKS | PROGRAM SHEET 36 –Continued |
|------|-------|-----|----------------------|------------------------------|
| 22140 | NXT45 | SF | *,,2 | ,,,,RESERVE CHAIN SECTOR |
| 22150 | | BTM | WDNX,CATA | ,,,,WRITE NEW AVAILABILITY SECTOR |
| 22160 | | TF | RACD+81,DKAD | |
| 22170 | | CF | RACD+80 | |
| 22180 | | B7 | NFCA-1,,6 | ,,,,RETURN |
| 22190* | | | | |
| 22200* | SUBROUTINE TO READ EXTERNAL DATA | | | |
| 22210 | | DS | 5 | |
| 22220 | ERIN | NOP | | |
| 22230 | | CM | TKAD,0,10 | ,,,,TEST FOR CARD INPUT |
| 22240 | | BNE | RDISK | |
| 22250 | | RNCD | RACD-1 | ,,,,READ A CARD |
| 22260 | | B7 | ERIN-1,,6 | |
| 22270 | RDISK | CM | MAGI,0,10 | ,,,,TEST FOR FIRST CARD |
| 22280 | | BNE | RDISK5 | |
| 22290 | | TF | EDDA+5,TKAD | |
| 22300 | | CF | EDDA+4 | |
| 22310 | | BTM | RDNX,EDDA | ,,,,READ FIRST DISK SECTOR |
| 22320 | RDISK3 | SF | RACD+80 | ,,,,SAVE CHAIN ADDRESS |
| 22330 | | CF | RACD+81 | |
| 22340 | | TF | DKAD,RACD+81 | |
| 22350 | | B7 | ERIN-1,,6 | ,,,,RETURN |
| 22360 | RDISK5 | NOP | | |

| LINE | LABEL | OP | OPERANDS AND REMARKS | PROGRAM SHEET 37 |
|------|-------|-----|----------------------|-------------------|
| 22370 | | TF | FDDA+5,-DKAD | ,,,,LOAD TRACK ADDRESS |
| 22380 | | CF | FDDA+4 | |
| 22390 | | BTM | RDNX,FDDA | ,,,,READ NEXT DISK SECTOR |
| 22400 | | B7 | RDISK3 | |
| 22410* | | | | |
| 22420* | | | | |
| 22430* | SUBROUTINE LINKAGE ADDRESSES | | | |
| 22440 | CGENIN | DS | 5 | |
| 22450 | FL1154 | DS | 5 | |
| 22460 | OP1154 | DS | 5 | |
| 22470 | CYTAPE | DS | 5 | |
| 22480 | BLTAPE | DS | 5 | |
| 22490* | | | | |
| 25000 | BEGIN | NOP | | |
| 25010* | | | | |
| 25020* | INITIALIZE DECODE TABLES | | | |
| 25030 | | TRNM | MATR-9,SETY,2 | |
| 25040 | | AM | *-6,10,10 | |
| 25050 | | SM | *+9,10001,710 | |
| 25060 | | BP | *-36 | |
| 25070* | | | | |
| 25080* | | | | |
| 25090* | CLEAR FF STACK | | | |
| 25100 | | TDM | FFMIN-1,1,11 | |
| 25110 | | TDM | FFMIN,0,2 | |
| 25120 | | AM | *-6,1 | |
| 25130 | | CM | *-18,FFMAX | |
| 25140 | | BNH | *-36 | |
| 25150* | | | | |
| 25160 | | CLEAR REGISTERS | | |
| 25170 | | TFM | NR,NRS,10 | |
| 25180 | | TDM | ZC-L+1,1,11 | |
| 25190 | | TF | ZC,ZC,2 | |
| 25200 | | AM | *-6,L | |
| 25210 | | CM | *-18,RN | |
| 25220 | | BNH | *-36 | |
| 25230 | | CF | RN-L+1 | |
| 25240 | | TRNM | STACK,STACK+L | |

| LINE | LABEL | OP | OPERANDS AND REMARKS | PROGRAM SHEET 38 |
|------|-------|-----|----------------------|-------------------|
| 25250 | | BNF | *+20,STACK | |
| 25260 | | B7 | *-24 | |
| 25270 | | SF | STACK | |
| 25280 | | TR | SCC,STACK | |
| 25290 | | TF | N1,ZER | |
| 25300 | | TF | N2,ZER | |
| 25310* | | | | |
| 25320 | | TRA | | |
| 25330 | SETY | DC | 1,0 | |
| 25340 | | DSC | 4,0 | |
| 25350 | | DSA | ERROR | |
| 25360 | RMK | DC | 1, | |
| 25370 | | TCD | BEGIN | |
| 25380* | | | | |
| 25390 | | DORG | BEGIN | |
| 25400* | | | | |
| 25410* | LOAD KONSTS MATERIAL | | | |
| 25420 | | TF | FILL1+11,FILL | |
| 25340 | | CALL | LOAD,KONSTS | |
| 25440 | FILL1 | TFM | FILL | |
| 25450* | | | | |

| LINE | LABEL | OP | OPERANDS AND REMARKS | PROGRAM SHEET 38 –Continued |
|------|-------|-----|----------------------|------------------------------|
| 25460* | | CLEAR CORE | | |
| 25470 | | CALL | LOAD,CLEARC | |
| 25480 | | TF | TEMPR+4,FILL | |
| 25490 | | TFM | TEMPR+9,CORE-1 | |
| 25500 | | BTM | ENTRY,*+12,67 | |
| 25510 | | TF | FILL,FILL1+11 | |
| 25520* | | | | |
| 25530* | LOAD CHARACTER GEN INPUT ROUTINE | | | |
| 25540 | | CALL | LOAD,CGENIN | |
| 25550 | | TF | CGENIN,ENTRY | |
| 25560 | | RTM | CGENIN,*+12,67 | |
| 25570* | | | | |
| 25580* | LOAD FLOATING ROUTINE | | | |
| 25590 | | CALL | LOAD,FL1154 | |
| 25600 | | TF | FL1154,ENTRY | |
| 25610 | | TFM | TEMPF ,DEC | |
| 25620 | | TFM | TEMPF-05,N1 | |

| LINE | LABEL | OP | OPERANDS AND REMARKS | PROGRAM SHEET 39 |
|------|-------|-----|----------------------|-------------------|
| 25630 | | TFM | TEMPF-10,L | |
| 25640 | | TFM | TEMPF-15,N | |
| 25650 | | BTM | FL1154,P,610 | |
| 25660* | | | | |
| 25670* | LOAD 175 ROUTINE | | | |
| 25680 | | CALL | LOAD,OP1154 | |
| 25690 | | TF | OP1154,ENTRY | |
| 25700 | | BTM | OP1154,P,610 | |
| 25710 | | TF | CYTAPE,TEMPF | |
| 25720 | | TF | BLTAPE,TEMPF-5 | |
| 25730* | | | | |
| 25740* | | | | |
| 25750 | SIMUL | NOP | | |
| 25760 | | RCTY | | |
| 25770 | | RCTY | | |
| 25780 | | WATY | MS1 | ,,,,FRIDEN MODEL 1154 SIMULATOR |
| 25790 | | RCTY | | |
| 25800 | | RCTY | | |
| 25810 | | WATY | MS2 | ,,,,SWITCH 1 ON FOR,,,, |
| 25820 | | RCTY | | |
| 25830 | | WATY | MS3 | ,,,,SWITCH 2 ON FOR,,,, |
| 25840 | | RCTY | | |
| 25850 | | WATY | MS4 | ,,,,SWITCH 3 ON FOR,,,, |
| 25860 | | RCTY | | |
| 25870 | | WATY | MS5 | ,,,,SWITCH 4 ON FOR,,,, |
| 25880 | | RCTY | | |
| 25890 | | RCTY | | |
| 25900 | | RCTY | | |
| 25910 | | TF | SIGNAL,NLM | ,,,,LOAD MODE INDICATOR OFF |
| 25920 | | BTM | LIGHT,*+12 | ,,,,EXECUTE THE SIGNAL |
| 25930 | | TF | SIGNAL,NAM | ,,,,TURN OFF AUTOMATIC LAMP |
| 25940 | | BTM | LIGHT,*+12 | ,,,,EXECUTE THE SIGNAL |
| 25950 | | TF | SIGNAL,IRM | ,,,,TURN ON READY LAMP |
| 25960 | | BTM | LIGHT,*+12 | ,,,,EXECUTE THE SIGNAL |
| 25970 | | TF | SIGNAL,NER | ,,,,TURN OFF ERROR LAMP |
| 25980 | | BTM | LIGHT,*+12 | ,,,,EXECUTE THE SIGNAL |
| 25990 | | TF | SIGNAL,NKL | ,,,,UNLOCK KEYBOARD |
| 25000 | | BTM | LIGHT,*+12 | |

| LINE | LABEL | OP | OPERANDS AND REMARKS | PROGRAM SHEET 40 |
|------|-------|-----|----------------------|-------------------|
| 26010 | | TDM | MK2,1,11 | |
| 26020 | | TDM | MK3,1,11 | |
| 26030 | | B7 | REF | |
| 26040* | | | | |
| 26050* | | | | |
| 30000* | ERROR RETURN | | | |
| 30010 | ERROR | NOP | | ,,,,NG CODE RETURN |
| 30020 | | TDM | MK6,1,11 | ,,,,SET ERROR FLAG |
| 30030 | | TDM | ER6,1,11 | ,,,,ILLEGAL KEY CODE |
| 30040* | | | | |
| 30050* | NORMAL RETURN | | | |
| 30060 | REF | NOP | | |
| 30070 | | BD | DUM5,MK7 | ,,,,BRANCH IF DUMP OPERATION |
| 30080 | | BNF | REQ2,MK6 | ,,,,TEST ERROR INDICATOR |
| 30090 | | BNC1 | REQ1 | |
| 30100 | | BNF | *+36,ER1 | ,,,,STACK OVERFLOW |
| 30110 | | WATY | MS17 | |
| 30120 | | RCTY | | |
| 30130 | | BNF | *+36,ER2 | ,,,,STORAGE OVERFLOW |
| 30140 | | WATY | MS8 | |
| 30150 | | RCTY | | |
| 30160 | | BNF | *+36,ER3 | ,,,,R1 OVERFLOW |
| 30170 | | WATY | MS16 | |
| 30180 | | RCTY | | |
| 30190 | | BNF | *+36,ER4 | ,,,,DIVISION BY ZERO |
| 30200 | | WATY | MS9 | |
| 30210 | | RCTY | | |

| LINE | LABEL | OP | OPERANDS AND REMARKS | PROGRAM SHEET 40 — Continued |
|---|---|---|---|---|
| 30220 | | BNF | *+36,ER5 | ....SQUARE ROOT OF NEGATIVE |
| 30230 | | WATY | MS15 | |
| 30240 | | RCTY | | |
| 30250 | | BNF | *+36,ER7 | ....MULTIPLICATION OVERFLOW |
| 30260 | | WATY | MS22 | |
| 30270 | | RCTY | | |
| 30280 | | BNF | *+36,ER8 | ....DIVISION OVERFLOW |
| 30290 | | WATY | MS10 | |
| 30300 | | RCTY | | |
| 30310 | | BNF | *+36,ER9 | ....ADDRESS REQUIRED |
| 30320 | | WATY | MS7 | |

| LINE | LABEL | OP | OPERANDS AND REMARKS | PROGRAM SHEET 41 |
|---|---|---|---|---|
| 30330 | | RCTY | | |
| 30340 | | BNF | *+36,ER10 | ....EMPTY LIST |
| 30350 | | WATY | MS20 | |
| 30360 | | RCTY | | |
| 30370 | | BNF | *+36,ER11 | ....INPUT CARD SEQUENCE |
| 30380 | | WATY | MS23 | |
| 30390 | | RCTY | | |
| 30400 | | BNF | *+36,ER12 | ....DISK STORAGE OVERFLOW |
| 30410 | | WATY | MS31 | |
| 30420 | | RCTY | | |
| 30430 | | BNF | *+36,ER6 | ....ILLEGAL KEY CODE |
| 30440 | | WATY | MS18 | |
| 30450 | | RCTY | | |
| 30460 | REQ1 | NOP | | |
| 30470 | | TF | SIGNAL,IER | ....TURN ON ERROR LAMP |
| 30480 | | BTM | LIGHT,*+12 | ....EXECUTE THE SIGNAL |
| 32000* | | | | |
| 32010* | | | | |
| 32020 | REQ2 | BD | XEQ,MK5 | ....BRANCH IF IN AUTOMATIC MODE |
| 32030 | | BTM | CGENN,*+12,67 | ....GET CODE FROM KEYBOARD |
| 32040 | | SF | STATE-1 | |
| 32050 | | TF | TKAD,STATE | ....LOAD TRACK ADDRESS |
| 32060 | REXQ | TD | KEYS,KEY | ....EXECUTE THE CODE |
| 32070 | | TFM | RE3+6,MATR,711 | |
| 32080 | | A | RE3+5,IN | |
| 32090 | | BD | RE5,MK6 | ....ERROR BRANCH |
| 32100 | | BD | REL2,MK4 | ....LOAD MODE BRANCH |
| 32110 | RE3 | B7 | | |
| 32120 | | DC | 1, | |
| 32130* | | | | |
| 32140* | | | | |
| 32150** | ERROR | | MODE CONTROL | |
| 32160 | | DS | 5 | |
| 32170 | RE5 | NOP | | |
| 32180 | | CM | KEY,24,10 | ....IS THIS THE RESET KEY |
| 32190 | | BNE | ERROR | ....IF NOT GET MORE CODE |
| 32200 | | B7 | RE3 | ....IF SO BRANCH TO RESET |
| 32210* | | | | |

| LINE | LABEL | OP | OPERANDS AND REMARKS | PROGRAM SHEET 42 |
|---|---|---|---|---|
| 32220* | | | | |
| 32230** | | | LOAD MODE CONTROL | |
| 32240 | REL2 | TFM | ALIST,1,10 | ....SET ALIST=1 |
| 32250 | | CM | KEY,24,10,... | RESET KEY |
| 32260 | | BE | LRESET | ....BRANCH TO RESET |
| 32270 | | CM | KEY,04,10,... | MANUAL KEY TEST |
| 32280 | | BE | MANUAL | |
| 32290 | | CM | KEY,13,10,... | LOAD KEY TEST |
| 32300 | | BE | ERROR | |
| 32310 | | CM | KEY,21,10,... | DELETE LAST STEP KEY TEST |
| 32320 | | BE | CSTEP | |
| 32330 | | CM | KEY,64,10,... | SINGLE STEP LOAD KEY TEST |
| 32340 | | BE | SSTEP | |
| 32341 | | CM | KEY,20,10 | ....CLEAR MEMORY KEY TEST |
| 32342 | | BE | CLEARM | |
| 32343 | | CM | KEY,63,10 | ....STORE MEMORY KEY TEST |
| 32344 | | BE | SMEMRY | |
| 32345 | | CM | KEY,62,10 | ....RECALL TO MEMORY KEY TEST |
| 32346 | | BE | RMEMRY | |
| 32350 | | TF | FCODE,-KEY | |
| 32360 | | BTM | FFLOAD,*+12,... | LOAD...LOAD... LOAD...LOAD |
| 32370 | | AM | ASTEP,2 | |
| 32380 | | B7 | RE3 | ....LOADABLE CHARACTER |

| LINE | LABEL | OP | OPERANDS AND REMARKS | PROGRAM SHEET 42 — Continued |
|---|---|---|---|---|
| 32390* | | | | |
| 32400* | | | | |
| 32410** | | | AUTOMATIC MODE CONTROL | |
| 32420 | XEQ | NOP | | |
| 32430 | | BD | MANUAL,MK6 | ....ERROR RETURN TO MANUAL MODE |
| 32440 | | BTM | GPC,*+12 | ....GET CODE FROM STORAGE |
| 32450 | | B7 | REXQ | |
| 32460* | | | | |
| 32470* | | | | |
| 32480* | | | DUMP MODE CONTROL | |
| 32490 | DUM5 | NOP | | |
| 32500 | | BTM | FFEXT,*+12 | |
| 32510 | | CM | FCODE,99,10 | |
| 32520 | | BE | DUM6 | |
| 32530 | | TF | TEMPR+1,FCODE | |

| LINE | LABEL | OP | OPERANDS AND REMARKS | PROGRAM SHEET 43 |
|---|---|---|---|---|
| 32540 | | TFM | TEMPR+3,,10 | |
| 32550 | | TF | TEMPR+5,RM | |
| 32560 | | AM | ASTEP,2 | |
| 32570 | | B7 | REXQ | |
| 32580 | DUM6 | TDM | MK7 | ....LEAVE DUMP CONTROL MODE |
| 32590 | | TDM | MK2,1,11 | ....R1 HAS BEEN PRINTED |
| 32600 | | B7 | REF | |
| 32610* | | | | |
| 32620* | | | | |
| 35000* | | | | |
| 35010* | | | CALCULATOR PRINTING SUBROUTINES | |
| 35020 | | DS | 5 | |
| 35030 | EPRINT | NOP | | |
| 35040 | | TDM | TEMPF-3,0 | |
| 35050 | | TDM | TEMPF-2,0 | |
| 35060 | | TDM | TEMPF-1,0 | |
| 35070 | | TDM | TEMPF,0 | |
| 35080 | | BTM | AETST,*+12 | |
| 35090 | | BD | LPRINT,MK7 | ....BRANCH IF IN DUMP MODE |
| 35100 | | BD | LPRINT,MK4 | ....BRANCH IF IN LOAD MODE |
| 35110 | | BC3 | MPRINT | ....AUDIT TRAIL TEST |
| 35120 | | BD | APRINT,MK5 | ....BRANCH IF IN AUTOMATIC MODE |
| 35130* | | | | |
| 35140 | MPRINT | NOP | | |
| 35150 | | BD | EPRINT-1,MK1,6 | ....RETURN IF 0-9 OR DECIMAL |
| 35160 | | BD | MPR2,MK2 | ....PRINT R1 WHEN REQUIRED |
| 35170 | | TDM | MK2,1,11 | |
| 35180 | | TF | AUX,R1 | |
| 35190 | | BTM | OP1154,*+12,67 | |
| 35200 | | B7 | EPRINT-1,,6 | |
| 35210 | MPR2 | NOP | | |
| 35220 | | TDM | MK2,1,11 | |
| 35230 | | BTM | CYTAPE,*+12,67 | |
| 35240 | | B7 | EPRINT-1,,6 | |
| 35250* | | | | |
| 35260 | LPRINT | NOP | | |
| 35270 | | SF | TEMPF-7 | |
| 35280 | | BD | LCPRT,MK12 | |

| LINE | LABEL | OP | OPERANDS AND REMARKS | PROGRAM SHEET 44 |
|---|---|---|---|---|
| 35290 | | TF | MS19+2,TEMPF-4 | |
| 35300 | | BC2 | PRNTR | ....TEST FOR PRINTER OUTPUT |
| 35310 | | WATY | MS19 | |
| 35320 | | RCTY | | |
| 35330 | | B7 | REF | |
| 35340 | PRNTR | PRA | MS19 | ....PRINTER OUTPUT |
| 35350 | | B7 | REF | |
| 35360 | LCPRT | NOP | | |
| 35370 | | TF | MS30+4,TEMPF-4 | |
| 35380 | | BC2 | PRNTLC | |
| 35390 | | WATY | MS30 | |
| 35400 | | RCTY | | |
| 35410 | | TDM | MK12 | |
| 35420 | | B7 | REF | |
| 35430 | PRNTLC | PRA | MS30 | |
| 35440 | | TDM | MK12 | |
| 35450 | | B7 | REF | |
| 35460* | | | | |
| 35470 | APRINT | NOP | | |
| 35480 | | CM | KEY,33,10,... | PRINT KEY TEST |
| 35490 | | BNE | EPRINT-1,,6 | |

| LINE | LABEL | OP | OPERANDS AND REMARKS | PROGRAM SHEET 44 —Continued |
|---|---|---|---|---|
| 35500 | | TDM | MK2,0 | |
| 35510 | | TFM | TEMPF-4,0000 | |
| 35520 | | B7 | MPRINT | |
| 35530* | | | | |
| 35540* | | | | |
| 35550* | PRINT | | A BLANK LINE | |
| 35560 | | DS | 5 | |
| 35570 | BLANK | NOP | | |
| 35580 | | BT | BLTAPE,BLANK-1,6 | |
| 35590* | | | | |
| 35600* | | | ADDRESS ERROR TEST | |
| 35610 | | DS | 5 | |
| 35620 | AETST | NOP | | |
| 35630 | | BNF | AETST-1,MK8,6 | |
| 35640 | | TDM | ER9,1,11 | |
| 35650 | | TDM | MK6,1,11 | |
| 35660 | | B7 | REF | |

| LINE | LABEL | OP | OPERANDS AND REMARKS | PROGRAM SHEET 45 |
|---|---|---|---|---|
| 35670* | | | | |
| 40000* | | | | |
| 40010* | | | | |
| 40020* | | | **CONTROL FUNCTIONS** | |
| | | | **NOT PROGRAMMABLE** | |
| 40030 | | DVLCMATR+04*10,5,MANUAL | | |
| 40040 | | DVLCMATR+24*10,5,LRESET | | |
| 40050 | | DVLCMATR+55*10,5,STRT | | |
| 40060* | | | | |
| 40070* | | | | |
| 40080* | | | ***MANUAL CONTROL KEY | |
| 40090 | MANUAL | TFM | ESTEP,0 | ...SET INSTRUCTION COUNTER=0 |
| 40100 | | TFM | ASTEP,0 | ....RESET ASTEP=0 |
| 40110 | | BNC1 | *+36 | |
| 40120 | | WATY | MS14 | |
| 40130 | | RCTY | | |
| 40140 | | TDM | MK1 | |
| 40150 | | TF | SIGNAL,NAM | ....TURN OFF AUTOMATIC LAMP |
| 40160 | | BTM | LIGHT,*+12 | ....EXECUTE THE SIGNAL |
| 40170 | | TF | SIGNAL,IRM | ....TURN ON READY LAMP |
| 40180 | | BTM | LIGHT,*+12 | ....EXECUTE THE SIGNAL |
| 40190 | | TF | SIGNAL,NKL | ....UNLOCK KEYBOARD |
| 40200 | | BTM | LIGHT,*+12 | ....EXECUTE THE SIGNAL |
| 40210 | | TF | SIGNAL,NLM | ....LOAD MODE INDICATOR OFF |
| 40220 | | BTM | LIGHT,*+12 | ....EXECUTE THE SIGNAL |
| 40230 | | TDM | MK2,1,11 | ....R1 HAS BEEN PRINTED |
| 40240 | | TDM | MK3,1,11 | ....SET READY STATE |
| 40250 | | TDM | MK4 | ....CLEAR LOAD STATE |
| 40260 | | TDM | MK5 | ....CLEAR AUTOMATIC STATE |
| 40270 | | B7 | REF | |
| 40280* | | | | |
| 40290* | | | | |
| 40300* | | | ***CHECK RESET CONTROL KEY | |
| 40310 | LRESET | NOP | | |
| 40320 | | BNC1 | LREA2 | |
| 40330 | | WATY | MS21 | ....RESET MESSAGE |
| 40340 | | RCTY | | |
| 40350 | LREA2 | TDM | ER1 | |
| 40360 | | TDM | ER2 | |

| LINE | LABEL | OP | OPERANDS AND REMARKS | PROGRAM SHEET 46 |
|---|---|---|---|---|
| 40370 | | TDM | ER3 | |
| 40380 | | TDM | ER4 | |
| 40390 | | TDM | ER5 | |
| 40400 | | TDM | ER6 | |
| 40410 | | TDM | ER7 | |
| 40420 | | TDM | ER8 | |
| 40430 | | TDM | ER9 | |
| 40440 | | TDM | ER10 | |
| 40450 | | TDM | ER11 | |
| 40460 | | TDM | ER12 | |
| 40470 | | TF | SIGNAL,NER | ....ERROR LAMP OFF |
| 40480 | | BTM | LIGHT,*+12 | ....EXECUTE THE SIGNAL |
| 40490 | | TF | SIGNAL,NKL | ....UNLOCK KEYBOARD |
| 40500 | | BTM | LIGHT,*+12 | ....EXECUTE THE SIGNAL |
| 40510 | | TDM | MK6 | |
| 40520 | | TDM | MK8 | ....ADDRESS NOT REQUIRED |
| 40530 | | TDM | MK9 | |
| 40540 | | TDM | MK11 | |
| 40550 | | TDM | MK12 | |
| 40560 | | B7 | REF | |
| 40570* | | | | |
| 40580* | | | | |
| 40590* | | | | |
| 40600* | | | ****AUTOMATIC MODE | |
| 40610 | STRT | NOP | | |
| 40620 | | TFM | TEMPF-4,6758 | ....XO |
| 40630 | | TDM | MK1 | |
| 40640 | | BTM | EPRINT,*+12 | ....TEST FOR PRINTED OUTPUT |
| 40650 | | BNC1 | *+36 | |

| LINE | LABEL | OP | OPERANDS AND REMARKS | PROGRAM SHEET 46 —Continued |
|---|---|---|---|---|
| 40660 | | WATY | MS13 | |
| 40670 | | RCTY | | |
| 40680 | | TDM | MK3 | ....LEAVE MANUAL MODE |
| 40690 | | TDM | MK5,1,11 | ....SET AUTOMATIC STATE |
| 40700 | | TF | SIGNAL,NRM | ....TURN OFF READY LAMP |
| 40710 | | BTM | LIGHT,*+12 | ....EXECUTE THE SIGNAL |
| 40720 | | TF | SIGNAL,IAM | ....TURN ON AUTOMATIC LAMP |
| 40730 | | BTM | LIGHT,*+12 | ....EXECUTE THE SIGNAL |
| 40740 | | TF | SIGNAL,IKL | ....LOCK KEYBOARD |

| LINE | LABEL | OP | OPERANDS AND REMARKS | PROGRAM SHEET 47 |
|---|---|---|---|---|
| 40750 | | BTM | LIGHT,*+12 | ....EXECUTE THE SIGNAL |
| 40760 | | B7 | XEQ | |
| 40770* | | | | |
| 40780* | | | | |
| 40790* | | | | |
| 50000* | | | | |
| 50010* | | | **LOAD/EDIT FUNCTIONS** | |
| | | | **NOT PROGRAMMABLE** | |
| 50020 | | DVLCMATR+13*10,5,LOADM | | |
| 50030 | | DVLCMATR+21*10,5,CSTEP | | |
| 50040 | | DVLCMATR+64*10,5,SSTEP | | |
| 50050 | | DVLCMATR+20*10,5,CLEARM | | |
| 50060 | | DVLCMATR+63*10,5,SMEMRY | | |
| 50070 | | DVLCMATR+62*10,5,RMEMRY | | |
| 50080* | | | | |
| 50090* | | | | |
| 50100* | | | LOAD/EDIT MODE*****LOAD/EDIT MODE | |
| 50110 | LOADM | NOP | | |
| 50120 | | TFM | TEMPF-4,5453 | ....ML |
| 50130 | | TDM | MK1 | |
| 50140 | | NOP | | |
| 50150 | | TF | SIGNAL,ILM | ....LOAD MODE INDICATOR |
| 50160 | | BTM | LIGHT,*+12 | ....EXECUTE THE SIGNAL |
| 50170 | | TF | SIGNAL,NRM | ....TURN OFF READY LAMP |
| 50180 | | BTM | LIGHT,*+12 | ....EXECUTE THE SIGNAL |
| 50190 | | TDM | MK3 | |
| 50200 | | TDM | MK4,1,11 | |
| 50210 | | TDM | MK5 | |
| 50220 | | BNC1 | REF | |
| 50230 | | WATY | MS11 | |
| 50240 | | RCTY | | |
| 50250 | | B7 | REF | |
| 50260* | | | | |
| 50270* | | | | |
| 50280* | | | DELETE LOAD CODE CONTROL | |
| 50290 | CSTEP | NOP | | |
| 50300 | | BNF | ERROR,MK4 | ....ERROR IF NOT LOAD/EXIT MODE |
| 50310 | | CM | ASTEP,0 | |
| 50320 | | BNE | *+32 | |

| LINE | LABEL | OP | OPERANDS AND REMARKS | PROGRAM SHEET 48 |
|---|---|---|---|---|
| 50330 | | TDM | MK12 | |
| 50340 | | B7 | REF | |
| 50350 | | SM | ASTEP,2 | |
| 50360 | | BTM | FFEXT,*+12 | |
| 50370 | | TF | *+35,FFPNT | |
| 50380 | | AM | *+23,2,7 | |
| 50390 | | TRNM | FFPNT,*,6711 | |
| 50400 | | TDM | UPDN+1,2 | ....SUBTRACT IMMEDIATE |
| 50410 | | BTM | FUPDN,*+12 | |
| 50420 | | TF | TEMPR+1,-FCODE | |
| 50430 | | TFM | TEMPR+3,,10 | |
| 50440 | | TF | TEMPR+5,RM | |
| 50450 | | TDM | MK12,1,11 | ....DELETE CODE MODE |
| 50460 | CLE2 | TFM | CLE3+6-,MATR,711 | ....ESTABLISH BRANCH BASE |
| 50470 | | A | CLE3+5,IN | |
| 50480 | CLE3 | B7 | | |
| 50490 | | DC | 1, | |
| 50500* | | | | |
| 50510* | | | | |
| 50520* | | | ***SINGLE STEP EDIT CONTROL KEY | |
| 50530 | SSTEP | NOP | | |
| 50540 | | BNF | ERROR,MK4 | ...ERROR IF NOT LOAD/EXIT MODE |
| 50550 | | BTM | FFEXT,*+12 | |
| 50560 | | AM | ASTEP,2 | |
| 50570 | | CM | FCODE,99,10 | |
| 50580 | | BNE | PSTEP | |
| 50590 | | SM | ASTEP,2 | |
| 50600 | | B7 | REF | |
| 50610 | PSTEP | NOP | | |
| 50620 | | TF | EMPR+1,-FCODE | |
| 50630 | | TFM | TEMPR+3,,10 | |

| LINE | LABEL | OP | OPERANDS AND REMARKS | PROGRAM SHEET 48 — Continued |
|---|---|---|---|---|
| 50640 | | TF | TEMPR+5,RM | |
| 50650 | | B7 | CLE2 | |
| 50660* | | | | |
| 50670* | | | ***STORE FROM MEMORY INSTRUCTION | |
| 50680* | | | | |
| 50690 | SMEMRY | NOP | | |
| 50700 | | BNF | ERROR,MK4 | ....ERROR IF NOT LOAD/EDIT MODE |

| LINE | LABEL | OP | OPERANDS AND REMARKS | PROGRAM SHEET 49 |
|---|---|---|---|---|
| 50710 | | TFM | TEMPF-4,5462 | ....MS |
| 50720 | | TDM | MK1 | |
| 50730 | | NOP | | |
| 50740 | | TFM | ALIST,1 | |
| 50750 | HHHH | TFM | ASTEP,0 | |
| 50760 | | TFM | MAG1,0,10 | |
| 50770 | | BTM | GFFPNT,*+12 | |
| 50780 | | TF | MBLD+11,FFPNT | |
| 50790 | | TF | MAG5,RNPNT,11 | |
| 50800 | | S | MAG5,RGPNT,11 | |
| 50810 | | TF | MAG4,MAG5 | |
| 50820 | MBNC | TR | RACD-1,ZERO-1 | ....CLEAR BUFFER |
| 50830 | | TD | RACD+79,RM | ....SET RECORD MARK |
| 50840 | | TF | RACD,MAG1 | ....LOAD THE CARD COUNT |
| 50850 | | TD | RACD+1,ALIST | ....LOAD LIST DIGIT |
| 50860 | | TF | RACD+3,TKAD | ....LOAD TRACK ADDRESS DIGITS |
| 50870 | | TF | RACD+8,MAG4 | ....LOAD TOTAL CHARACTER COUNT |
| 50880 | | TFM | MAG6,0 | ....ZERO CARD CHARACTER COUNTER |
| 50890 | | CM | MAG5,0 | ....DOES TOTAL COUNT=0 |
| 50900 | | BE | MBLC | ....IF SO PUNCH CARD |
| 50910 | | TFM | MBLD+6,RACD+9 | ....LOAD FIRST ADDRESS |
| 50920 | MBLD | TD | *,*,27 | ....TRANSFER DIGIT TO BUFFER |
| 50930 | | AM | MAG6,1 | ....ADVANCE CARD CHARACTER CNT |
| 50940 | | SM | MAG5,1 | ....SUBTRACT FROM TOTAL CHARACTER |
| 50950 | | CM | MAG5,0 | ....FINISHED |
| 50960 | | BE | MBLC | ....PUNCH LAST CARD |
| 50970 | | AM | MBLD+6,1 | ....ADD ONE |
| 50980 | | AM | MBLD+11,1 | ....ADD ONE |
| 50990 | | CM | MAG6,70 | ....70 CHARACTERS |
| 50000 | | BE | MBPC | ....PUNCH A CARD |
| 51010 | | B7 | MBLD | ....GET NEXT CHARACTER |
| 51020 | MBPC | BTM | EOUT,*+12 | ....WRITE OUT DATA |
| 51030 | | BNC1 | *+36 | ....TYPE CARD TEST |
| 51040 | | WNTY | RACD-1 | |
| 51050 | | RCTY | | |
| 51060 | | AM | MAG1,1,10 | ....ADD ONE TO CARD COUNT |
| 51070 | | B7 | MBNC | ....GET NEXT CARD |
| 51080 | MBLC | BTM | EOUT,*+12 | ....WRITE OUT DATA |

| LINE | LABEL | OP | OPERANDS AND REMARKS | PROGRAM SHEET 50 |
|---|---|---|---|---|
| 51090 | | BNC1 | *+36 | ....TYPE CARD TEST |
| 51100 | | WNTY | RACD-1 | |
| 51110 | | RCTY | | |
| 51120 | | B7 | REF | |
| 51130* | | | | |
| 51140* | | | ***RECALL TO MEMORY INSTRUCTION | |
| 51150* | | | | |
| 51160 | RMEMRY | NOP | | |
| 51170 | | BNF | ERROR,MK4 | ....ERROR IF NOT LOAD/EDIT MODE |
| 51180 | | TFM | TEMPF-4,5459 | ....MR |
| 51190 | | TDM | MK1 | |
| 51200 | | NOP | | |
| 51210 | | TFM | ALIST,1,10 | ....SET EXECUTION LIST = 1 |
| 51220* | | | | |
| 51230 | MAFC | TFM | MAG1,0,10 | ....SET CARD COUNT TO 0 |
| 51240 | | TFM | ASTEP,0 | |
| 51250 | | BTM | MARC,*+12 | ....GET FIRST CARD |
| 51260 | | TF | MAG1,RACD | ....CARD NUMBER |
| 51270 | | TF | MAG4,RACD+8 | ....TOTAL DATA COUNT |
| 51280 | | TF | MAG5,MAG4 | ....LOAD TRANSFER COUNTER |
| 51290 | | CM | MAG4,0 | ....TEST FOR ZERO DATA |
| 51300 | | BE | REF | |
| 51310 | | B7 | MALX | |
| 51320 | MANC | AM | MAG1,1,10 | ....ADD 1 TO CARD COUNT |
| 51330 | | BTM | MARC,*+12 | ....GET NEXT CARD |
| 51340 | | C | MAG4,RACD+8 | ....VARIFY TOTAL DATA COUNT |
| 51350 | | BNE | MASE | ....ERROR IN COUNT VARIFICATION |
| 51360 | | B7 | MALX | |
| 51370* | | | | |
| 51380* | | | | |
| 51390 | MALX | NOP | | |

| LINE | LABEL | OP | OPERANDS AND REMARKS | PROGRAM SHEET 50 — Continued |
|---|---|---|---|---|
| 51400 | | C | MAG2,ALIST | ....COMPARE STORAGE ADDRESS |
| 51410 | | BE | *+60 | ....PROCEED IF EQUAL |
| 51420 | | CM | MAG2,0 | ....TEST INPUT FOR LIST=0 |
| 51430 | | BE | MASE | |
| 51440 | | CM | ALIST,0 | ....TEST LOAD LIST=0 |
| 51450 | | BE | MASE | |
| 51460 | | CM | MAG5,70 | ....TEST FOR LAST INPUT |

| LINE | LABEL | OP | OPERANDS AND REMARKS | PROGRAM SHEET 51 |
|---|---|---|---|---|
| 51470 | | BNH | MALL | ....LOAD LAST CARD |
| 51480 | | TFM | MACC,70 | |
| 51490 | | BTM | MALC,*-12 | |
| 51500 | | SM | MAG5,70 | |
| 51510 | | B7 | MANC | |
| 51520 | MALL | NOP | | |
| 51530 | | TF | MACC,MAG5 | |
| 51540 | | TFM | MARM,RACD+9 | |
| 51550 | | A | MARM,MAG5 | |
| 51560 | | TD | MARM,RM,6 | |
| 51570 | | BTM | MALC,REF | |

| 51580* | | | | |
| 51590* | | | | |
| 51600* | | | TRANSFER CARD TO STORAGE | |
| 51610 | MACC | DC | 5,0 | ....DATA COUNT=70 OR MAG5 |
| 51620 | MADP | DC | 5,0 | ....FFMAX-MACC |
| 51630 | MARM | DC | 5,0 | ....LOCATION OF RECORD MARK |
| 51640* | | | | |
| 51650 | | DS | 5 | |
| 51660 | MALC | NOP | | |
| 51670 | | BTM | GFFPNT,*+12 | |
| 51680 | | TFM | MADP,FFMAX | |
| 51690 | | S | MADP,MACC | |
| 51700 | | C | FFEND,MADP | |
| 51710 | | BP | FFOVF | |
| 51720 | | BE | FFOVF | |
| 151730 | | SF | FFPNT,,6 | |
| 51740 | | TF | FFMAX,MADP,11 | |
| 51750 | | CF | FFPNT,,6 | |
| 51760 | | A | FFEND,MACC | |
| 51770 | | TDM | UPDN+1,1 | |
| 51780 | | TF | UPDN+11,MACC | |
| 51790 | | BTM | FUPDN,*+12 | |
| 51800 | | TFM | UPDN+11,2 | |
| 51810 | | A | ASTEP,MACC | |
| 51820 | | TRNM | FFPNT,RACD+9,6 | |
| 51830 | | BTM | GFFPNT,*+12 | |
| 51840 | | CF | FFPNT,,6 | |

| LINE | LABEL | OP | OPERANDS AND REMARKS | PROGRAM SHEET 52 |
|---|---|---|---|---|
| 51850 | | B7 | MALC-1,,6 | |
| 51860* | | | | |
| 51870* | | | | |
| 51880* | | | READ A CARD INTO CARD BUFFER | |
| 51890 | | DS | 5 | |
| 51900 | MARC | NOP | | |
| 51910 | | TR | RACD-1,ZERO-1 | ....CLEAR THE INPUT BUFFER |
| 51920 | | BTM | ERIN,*+12 | ....READ IN DATA |

| LINE | LABEL | OP | OPERANDS AND REMARKS | PROGRAM SHEET 52 —Continued |
|---|---|---|---|---|
| 51930 | | TD | RACD+79,RM | ....SET A RECORD MARK AT END |
| 51940 | | SF | RACD−1 | ....SET FLAGS |
| 51950 | | SF | RACD+4 | |
| 51960 | | TD | MAG2,RACD+1 | ....LOAD LIST ADDRESS |
| 51970 | | BNC1 | *+36 | ....TEST FOR TYPED OUTPUT |
| 51980 | | WNTY | RACD−1 | ....TYPE CARD |
| 51990 | | RCTY | | |
| 51000 | | C | MAG1,RACD | ....CHECK CARD NUMBER |
| 52010 | | BE | MARC−1,,6 | ....RETURN IF OK |
| 52020 | MASE | TDM | MK6,1,11 | ....SET ERROR INDICATOR |
| 52030 | | TDM | ER11,1,11 | ....CARD COUNT ERROR |
| 52040 | | B7 | REF | |
| 52050* | | | | |
| 52060* | | . | | |
| 52070 | MAG1 | DC | 2,0 | ....CARD NUMBER |
| 52100 | MAG5 | DC | 5,0 | ....DATA CHARACTER COUNT |
| 52080 | MAG2 | DC | 5,0 | ....LIST POINTER |
| 52090 | MAG4 | DC | 5,0 | ....TOTAL BUFFER |
| 52110 | MAG6 | DC | 5,0 | ....CARD CHARACTER COUNT |
| 52120* | | | | |
| 52130* | | | ***CLEAR MEMORY INSTRUCTION | |
| 52140 | CLEARM | NOP | | |
| 52150 | | BNF | ERROR,MK4 | ....ERROR IF NOT LOAD/EDIT MODE |
| 52160 | | TFM | TEMPF−4,5414 | ....M* |
| 52170 | | TDM | MK1 | |
| 52180 | | NOP | | |
| 52190 | | BTM | FFUP,*+12 | |
| 52200 | | CM | FCODE,99,10 | |
| 52210 | | BNE | *−24 | |
| 52220 | | TFM | ESTEP,0 | ....RESET STEP POINTER TO 0 |

| LINE | LABEL | OP | OPERANDS AND REMARKS | PROGRAM SHEET 53 |
|---|---|---|---|---|
| 52230 | | B7 | REF | |
| 52240* | | | | |
| 60000* | | | | |
| 60010* | | | | |
| 60020* | | | | |
| 60030* | | | **PROGRAMMABLE FUNCTIONS** | |
| 60040 | | | DVLC MATR+70*10,5,NUMBER | |
| 60050 | | | DVLC MATR+71*10,5,NUMBER | |
| 60060 | | | DVLC MATR+72*10,5,NUMBER | |
| 60070 | | | DVLC MATR+73*10,5,NUMBER | |
| 60080 | | | DVLC MATR+74*10,5,NUMBER | |
| 60090 | | | DVLC MATR+75*10,5,NUMBER | |
| 60100 | | | DVLC MATR+76*10,5,NUMBER | |
| 60110 | | | DVLC MATR+77*10,5,NUMBER | |
| 60120 | | | DVLC MATR+78*10,5,NUMBER | |
| 60130 | | | DVLC MATR+79*10,5,NUMBER | |
| 60140 | | | DVLC MATR+68*10,5,DECMAL | |
| 60150 | | | DVLC MATR+51*10,5,ENTER | |
| 60160 | | | DVLC MATR+49*10,5,CHGS | |
| 60170 | | | DVLC MATR+41*10,5,INTCHG | |
| 60180 | | | DVLCMATR+57*10,5,CENTRY | |
| 60190 | | | DVLC MATR+33*10,5,PRINT | |
| 60200 | | | DVLCMATR+00*10,5,STOP | |
| 60210 | | | DVLCMATR+48*10,5,ANSDEC | |
| 60220 | | | DVLC MATR+54*10,5,PLUS | |
| 60230 | | | DVLC MATR+52*10,5,MINUS | |
| 60240 | | | DVLC MATR+59*10,5,MULT | |
| 60250 | | | DVLC MATR+58*10,5,DIVIDE | |
| 60260 | | | DVLC MATR+53*10,5,SQRT | |
| 60270 | | | DVLC MATR+14*10,5,ASTORE | |
| 60280 | | | DVLC MATR+43*10,5,STORE | |
| 60290 | | | DVLC MATR+44*10,5,RECALL | |
| 60300 | | | DVLC MATR+46*10,5,CSTORE | |
| 60310* | | | | |
| 60320 | | | DVLCMATR+66*10,5,SKIPZE | |
| 60330 | | | DVLCMATR+67*10,5,SKIPMI | |
| 60340 | | | DVLCMATR+45*10,5,SKIPMK | |
| 60350 | | | DVLCMATR+65*10,5,GOTODD | |

| LINE | LABEL | OP | OPERANDS AND REMARKS | PROGRAM SHEET 54 |
|---|---|---|---|---|
| 60360* | | | | |
| 60370 | | | DVLCMATR+26*10,5,DD | |
| 60380 | | | DVLCMATR+03*10,5,MARK | |
| 60390* | | | | |
| 60400 | | | DVLCMATR+23*10,5,WFIFOZ | |
| 60410 | | | DVLCMATR+69*10,5,RFIFOZ | |
| 60420* | | | | |
| 60430* | | | | |
| 60440* | | | ****NUMERIC ENTRY AND DECIMAL ADDRESS INSTRUCTIONS | |
| 60450 | NUMBER | NOP | | |
| 60460 | | TFM | TEMPF−4,7000 | ....0 |
| 60470 | | TD | TEMPF−6,KEY | ....N |
| 60480 | NUM2 | BD | CORE,MK8,... | BRANCH IF ADDRESSABLE FUNCTION |
| 60490 | | BD | LPRINT,MK4 | ....LOAD MODE PRINT |
| 60500 | | BD | LPRINT,MK7 | ....DUMP MODE PRINT |
| 60510 | | BD | NUM1,MK1,... | BRANCH IF CONTINUATION OF NUMERIC |
| 60520* | | | | |
| 60530* | THIS IS THE BEGINNING OF A NUMERIC ENTRY | | | |
| 60540 | | TDM | MK1,1,11,... | LAST KEY WAS NOT-FUNCTION |
| 60550 | | TDM | MK2 | ....THIS ENTRY HAS NOT BEEN PRINTED |
| 60560 | | TDM | DECMK,... | MARK NO DECIMAL KEY YET |
| 60570 | | BT | UPSHFT,UPSHFT−1 | ....UPSHIFT STACK ONE REGISTER |
| 60580 | | TF | R1,ZC | ....CLEAR REGISTER R1 |
| 60590 | | TFM | NUMCT,P,10,... | LOAD OVERFLOW COUNTER |
| 60600* | | | | |
| 60610* | THIS IS A CONTINUATION OF A NUMERIC ENTRY | | | |
| 60620 | NUM1 | NOP | | |
| 60630 | | CM | KEY,68,10,... | IS THIS THE DECIMAL KEY |
| 60640 | | BNE | *+32 | ....SKIP TWO INSTRUCTIONS IF NOT |
| 60650 | | TDM | DECMK,1,11,... | MARK NOW DECIMAL KEY WAS USED |
| 60660 | | B7 | REF | |
| 60670 | | SM | NUMCT,1,10 | ....SUBTRACT 1 FROM COUNTER |
| 60680 | | BNN | *+36 | ....BRANCH NO OVERFLOW |
| 60690 | | TDM | ER3,1,11 | ....R1 OVERFLOW |
| 60700 | | BTM | OVRFLO,REF | ....ERROR RETURN |
| 60710 | | BNF | *+48,DECMK | ....TEST FOR DECIMAL COUNT |
| 60720* | | | | |
| 60730 | COUNT DECIMAL POSITION | | | |

| LINE | LABEL | OP | OPERANDS AND REMARKS | PROGRAM SHEET 55 |
|---|---|---|---|---|
| 60740 | | SF | R1−1 | ....SET FLAG |
| 60750 | | AM | R1,1,10 | ....ADD ONE TO COUNT |
| 60760 | | CF | R1−1 | ....CLEAR FLAG |
| 60770* | | | | |
| 60780* | SHIFT R1 LEFT AND ENTER NEW DIGIT | | | |
| 60790 | | TF | 99,R1−2 | |
| 60800 | | TDM | 99−P+1,1,11 | |
| 60810 | | TF | R1−3,99 | |
| 60820 | | TD | R1−2,KEY | |
| 60830 | | B7 | REF | |
| 60840* | | | | |
| 60850 | NUMCT | DC | 2,0 | ....DECIMAL DIGIT COUNTER |
| 60860 | DECMK | DSC | 1,0 | ....DECIMAL KEY INDICATOR |
| 60870* | | | | |

47

| LINE | LABEL | OP | OPERANDS AND REMARKS | PROGRAM SHEET 55 — Continued |
|---|---|---|---|---|
| 60880* | | | ****DECIMAL POINT ENTRY AND ADDRESS INSTRUCTIONS | |
| 60890 | DECMAL | NOP | | |
| 60900 | | TFM | TEMPF-4,0300 | |
| 60910 | | BD | DEC2,MK11 | ....TEST FOR DECIMAL ADDRESS |
| 60920 | | BTM | AETST,*+12 | ....TEST FOR ADDRESS ERROR |
| 60930 | | B7 | NUM2 | ....CONTINUE NUMERIC ENTRY |
| 60940* | | | | |
| 60950* | | | THIS IS A DECIMAL ADDRESS (USED TO CLEAR REG 1-9) | |
| 60960 | DEC2 | TFM | TEMPF-4,0300 | |
| 60970 | | TDM | MK1 | ....NOT A NUMERIC ENTRY |
| 60980 | | TDM | MK8 | ....LEAVE ADDRESS MODE |
| 60990 | | TDM | MK11 | ....LEAVE DECIMAL ADDRESS MODE |
| 61000 | | BTM | EPRINT,*+12 | ....TEST FOR PRINTED OUTPUT |
| 61010 | DEC3 | B7 | CORE | |
| 61020* | | | | |
| 61030* | | | | |
| 61040* | | | ****FIRST NUMBER INSTRUCTION (ENTER AND DUPLICATE) | |
| 61050 | ENTER | BNF | DUPL,MK1 | ....DUPLICATE IF NON NUMERIC |
| 61060 | | TFM | TEMPF-4,4510 | ....E+ |
| 61070 | | TDM | MK1 | |
| 61080 | | BTM | EPRINT,*+12 | ....TEST FOR PRINTED OUTPUT |
| 61090 | | B7 | REF | |
| 61100* | | | | |
| 61110* | | | ****DUPLICATE FUNCTION (ASSOCIATED WITH FIRST NO) | |

| LINE | LABEL | OP | OPERANDS AND REMARKS | PROGRAM SHEET 56 |
|---|---|---|---|---|
| 61120 | DUPL | NOP | | |
| 61130 | | TFM | TEMPF-4,4545 | ....EE |
| 61140 | | TDM | MK1 | |
| 61150 | | BTM | EPRINT,*+12 | ....TEST FOR PRINTED OUTPUT |
| 61160 | | BT | UPSHFT,UPSHFT-1 | ....UPSHIFT STACK |
| 61170 | | B7 | REF | |
| 61180* | | | | |
| 61190* | | | ****ENTER MINUS INSTRUCTION (CHANGE SIGN) | |
| 61200 | CHGS | NOP | | |
| 61210 | | TFM | TEMPF-4,4520 | ....E- |
| 61220 | | TDM | MK1 | |
| 61230 | | BTM | EPRINT,*+12 | |
| 61240 | | BD | CHGS1,STACK | |
| 61250 | | TDM | STACK,1,11 | |
| 61260 | | B7 | CHGS2 | |
| 61270 | CHGS1 | NOP | | |
| 61280 | | TDM | STACK,,11 | |
| 61290 | CHGS2 | NOP | | |
| 61300 | | B7 | REF | |
| 61310* | | | | |
| 61320* | | | ****INTERCHANGE INSTRUCTION | |
| 61330 | INTCHG | NOP | | |
| 61340 | | TFM | TEMPF-4,4549 | ....EI |
| 61350 | | TDM | MK1 | |
| 61360 | | BTM | EPRINT,*+12 | |
| 61370 | | SF | R1+1 | |
| 61380 | | TF | AUX,R2 | |
| 61390 | | TF | R2,R1 | |
| 61400 | | CF | R1+1 | |
| 61410 | | TF | R1,AUX | |
| 61420 | | B7 | REF | |
| 61430* | | | | |
| 61440* | | | ****CLEAR ENTRY INSTRUCTION | |
| 61450 | CENTRY | NOP | | |
| 61460 | | TFM | TEMPF-4,4514 | ....E* |
| 61470 | | TDM | MK1 | |
| 61480 | | BTM | EPRINT,*+12 | ....TEST FOR PRINTED OUTPUT |
| 61490 | | BT | DNSHFT,DNSHFT-1 | |

| LINE | LABEL | OP | OPERANDS AND REMARKS | PROGRAM SHEET 57 |
|---|---|---|---|---|
| 61500 | | B7 | REF | |
| 61510* | | | | |
| 61520* | | | ****PRINT INSTRUCTION | |
| 61530 | PRINT | NOP | | |
| 61540 | | TFM | TEMPF-4,4533 | ....E= |
| 61550 | | TDM | MK1 | |
| 61560 | | TDM | MK2 | |
| 61570 | | BTM | EPRINT,*+12 | ....TEST FOR PRINTED OUTPUT |
| 61580 | | B7 | REF | |
| 61590* | | | | |

48

| LINE | LABEL | OP | OPERANDS AND REMARKS | PROGRAM SHEET 57 — Continued |
|---|---|---|---|---|
| 1600* | | | ****STOP CODE INSTRUCTION | |
| 1610 | STOP | NOP | | |
| 1620 | | TFM | TEMPF-4,4800 | ....H |
| 1630 | | TDM | MK1 | |
| 1640 | | BTM | EPRINT,*+12 | |
| 1650 | | BD | MANUAL+12,MK5 | |
| 1660 | | B7 | REF | |
| 61670* | | | | |
| 61680* | | | | |
| 61690* | | | ****ANSWER DECIMAL INSTRUCTION ---ADDRESSABLE | |
| 61700 | ANSDEC | NOP | | |
| 61710 | | TFM | TEMPF-4,4103 | ....A. |
| 61720 | | TDM | MK1 | |
| 61730 | | BTM | EPRINT,*+12 | |
| 61740 | | TFM | NUM2+6,FORA | ....SET RETURN ADDRESS |
| 61750 | | TFM | DEC3+6, FORF | ....SET DECIMAL RETURN |
| 61760 | | TDM | MK8,1,11 | |
| 61770 | | TDM | MK11,1,11 | ....DECIMAL ADDRESS POSSIBLE |
| 61780 | | B7 | REF | |
| 61790 | FORA | TDM | MK10,1,11 | ....LEAVE FREE FORMAT MODE |
| 61800 | | TD | DEC,KEY | |
| 61810 | | B7 | FORM | |
| 61820 | FORF | TDM | MK10 | ....ENTER FREE FORMAT MODE |
| 61821 | FORM | TDM | MK8 | |
| 61822 | | TDM | MK11 | ....CLEAR DEC ADDRESS FLAG |
| 61825 | | TDM | MK1 | |
| 61830 | | BTM | EPRINT,*+12 | |
| 61840 | | TD | DEC,KEY | |

| LINE | LABEL | OP | OPERANDS AND REMARKS | PROGRAM SHEET 58 |
|---|---|---|---|---|
| 61850 | | TDM | MK10,1,11 | ....LEAVE FREE FORMAT MODE |
| 61860 | | B7 | REF | |
| 61870* | | | | |
| 61880* | | | ****ADD INSTRUCTION | |
| 61890 | PLUS | NOP | | |
| 61900 | | TFM | TEMPF-4,1000 | ....+ |
| 61910 | | TDM | MK1 | |
| 61920 | | BTM | EPRINT,*+12 | ....TEST FOR PRINTED OUTPUT |
| 61930 | | BTM | ADD,*+12 | |
| 61940 | | B7 | REF | |
| 61950* | | | | |
| 61960* | | | ****SUBTRACT INSTRUCTION | |
| 61970 | MINUS | NOP | | |
| 61980 | | TFM | TEMPF-4,2000 | ....- |
| 61990 | | TDM | MK1 | |
| 61000 | | BTM | EPRINT,*+12 | ....TEST FOR PRINTED OUTPUT |
| 62010 | | BTM | SUB,*+12 | |
| 62020 | | B7 | REF | |
| 62030* | | | | |
| 62040* | | | ****MULTIPLY INSTRUCTION | |
| 62050 | MULT | NOP | | |
| 62060 | | TFM | TEMPF-4,6700 | ....X |
| 62070 | | TDM | MK1 | |
| 62080 | | BTM | EPRINT,*+12 | ....TEST FOR PRINTED OUTPUT |
| 62090 | | BTM | NIN2,*+12 | ....FIX R1 and R2 in N1 and N2 |
| 62100 | | TF | 79,Z1 | |
| 62110 | | M | N1,N2 | ....MULTIPLY N1 BY N2 |
| 62120 | | SF | 99-N-P | |
| 62130 | | TF | N1,99-P-1 | |
| 62140 | | MF | N1,99 | |
| 62150 | | CM | 98-N-P,,10 | |
| 62160 | | BZ | *+36 | |
| 62170 | | TDM | ER7,1,11 | ....MULTIPLICATION OVERFLOW |
| 62180 | | BTM | OVRFLO,REF | ....OVERFLOW EXIT |
| 62190 | | BTM | RN1,*+12 | |
| 62200 | | BTM | FL1154,*+12,67 | ....FLOAT THE PRODUCT |
| 62210 | | BZ | *+36 | ....TEST OVERFLOW |
| 62220 | | TDM | ER7,1,11 | ....MULTIPLICATION OVERFLOW |

| LINE | LABEL | OP | OPERANDS AND REMARKS | PROGRAM SHEET 59 |
|---|---|---|---|---|
| 62230 | | BTM | OVRFLO,REF | ....OVERFLOW EXIT |
| 62240 | | TF | R1,AUX | ....TRANSFER TO R1 |
| 62250 | | B7 | REFQ | |
| 62260* | | | | |
| 62270* | | | ****DIVIDE INSTRUCTION | |
| 62280 | DIVIDE | NOP | | |
| 62290 | | TFM | TEMPF-4,2100 | ..../ |

| LINE | LABEL | OP | OPERANDS AND REMARKS | |
|---|---|---|---|---|
| | | | | PROGRAM SHEET 59 —Continued |
| 62300 | | TDM | MK1 | |
| 62310 | | BTM | EPRINT,*+12 | ....TEST FOR PRINTED OUTPUT |
| 62320 | | BTM | N1N2,*+12 | ....FIX R1 AND R2 IN N1 AND N2 |
| 62330 | | TF | 99,Z1 | |
| 62340 | | CM | N1,,10 | |
| 62350 | | BNZ | *+36 | |
| 62360 | | TDM | ER4,1,11 | ....DIVISION BY ZERO |
| 62370 | | BTM | OVRFLO,REF | ....DIVISION BY ZERO EXIT |
| 62380 | | LD | 98-P,N2 | |
| 62390 | | D | 99-N-P,N1 | |
| 62400 | | SF | 98-2*P-N | |
| 62410 | | CM | 97-2*L-N,,10 | |
| 62420 | | BZ | *+36 | |
| 62430 | | TDM | ER8,1,11 | ....DIVISION OVERFLOW |
| 62440 | | BTM | OVRFLO,REF | ....OVERFLOW RETURN |
| 62450 | | TF | N1,99-N | |
| 62460 | | BTM | RN1,*+12 | |
| 62470 | | BTM | FL1154,*+12,67 | ....FLOAT THE QUOTIENT |
| 62480 | | BZ | *+36 | |
| 62490 | | TDM | ER8,1,11 | ....DIVISION OVERFLOW |
| 62500 | | BTM | OVRFLO,REF | ....OVERFLOW EXIT |
| 62510 | | TF | R1,AUX | ....TRANSFER QUOTIENT TO R1 |
| 62520 | | B7 | REFQ | |
| 62530* | | | | |
| 62540* | | | ****SQUARE ROOT INSTRUCTION | |
| 62550 | SQRT | NOP | | |
| 62560 | | TFM | TEMPF-4,6259 | ....SR |
| 62570 | | TDM | MK1 | |
| 62580 | | BTM | EPRINT,*+12 | ....TEST FOR PRINTED OUTPUT |
| 62590 | | TF | AUX,R1 | |
| 62600 | | BTM | PNNTA,N2 | ....FIX R1 IN N2 |

| LINE | LABEL | OP | OPERANDS AND REMARKS | PROGRAM SHEET 60 |
|---|---|---|---|---|
| 62610 | | TF | N1,ZER | ....CLEAR N1 |
| 62620 | | TDM | N1-P-1,1 | |
| 62630 | | CM | N2,,10 | |
| 62640 | | BZ | REF | ....ZERO RETURN |
| 62650 | | BP | *+36 | |
| 62660 | | TDM | ER5,1,11 | ....SQUARE ROOT OF NEGATIVE |
| 62670 | | BTM | OVRFLO,REF | ....ERROR RETURN |
| 62680 | SQ1 | NOP | | ....SQUARE ROOT LOOP START |
| 62690 | | TF | 79,ZER | |
| 62700 | | TF | 80-N,ZER | |
| 62710 | | LD | 98-P,N2 | |
| 62740 | | TF | TEMPF,99-N | |
| 62720 | | D | 100-N,N1 | |
| 62730 | | A | 99-N,N1 | |
| 62750 | | TF | 97,ZER | |
| 62760 | | MM | TEMPF,50,10 | |
| 62770 | | AM | 98,5,10 | |
| 62780 | | C | N1,97 | |
| 62790 | | TF | N1,97 | |
| 62800 | | BNE | SQ1 | ....LOOP BACK |
| 62810 | | BTM | RN1,*+12 | |
| 62820 | | BTM | FL1154,*+12,67 | |
| 62830 | | BZ | *+24 | |
| 62840 | | H | | |
| 62850 | | TF | R1,AUX | |
| 62860 | | B7 | REFQ | |
| 62870* | | | | |
| 62880* | | | ****PRINT ANSWER IN MANUAL MODE ONLY | |
| 62890 | REFQ | NOP | | |
| 62900 | | BNF | REF,MK3 | ....RETURN IF NOT IN MANUAL MODE |
| 62910 | | TFM | TEMPF-4,3300 | ....= |
| 62920 | | TDM | MK2 | |
| 62930 | | BTM | EPRINT,REF | |
| 62940* | | | | |
| 62950* | | | ****ACCUMULATIVE STORE INSTRUCTION ----ADDRESSABLE | |
| 62960 | ASTORE | NOP | | |
| 62970 | | TFM | TEMPF-4,1062 | ....+S |
| 62980 | | TDM | MK1 | |

| LINE | LABEL | OP | OPERANDS AND REMARKS | PROGRAM SHEET 61 |
|---|---|---|---|---|
| 62990 | | BTM | EPRINT,*+12 | ....TEST FOR PRINTED OUTPUT |
| 62000 | | TFM | NUM2+6,TRAA | |
| 63010 | | TDM | MK8,1,11 | |
| 63020 | | B7 | REF | |
| 63030 | TRAA | NOP | | |
| 63040 | | TDM | MK8 | |
| 63050 | | BTM | EPRINT,*+12 | ....TEST FOR PRINTED OUTPUT |

| LINE | LABEL | OP | OPERANDS AND REMARKS | |
|---|---|---|---|---|
| | | | | PROGRAM SHEET 61 —Continued |
| 63060 | | CM | KEYS,0,10 | |
| 63070 | | BE | ERROR | |
| 63080 | | BT | UPSHFT,UPSHFT-1 | |
| 63090 | | BTM | GAOSN,*+12 | |
| 63100 | | TF | R1,99,11 | |
| 63110 | | BTM | ADD,*+12 | |
| 63120 | | TF | 99,R1,6 | |
| 63130 | | BT | DNSHFT,DNSHFT- | |
| 63140 | | B7 | REF | |
| 63150* | | | ***STORE INSTRUCTION | |
| 63160 | STORE | NOP | | |
| 63170 | | TFM | TEMPF-4,6200 | ....S |
| 63180 | | TDM | MK1 | |
| 63190 | | BTM | EPRINT,*+12 | ....TEST FOR PRINTED OUTPUT |
| 63200 | | TFM | NUM2+6,STOREA | |
| 63210 | | TDM | MK8,1,11 | |
| 63220 | | B7 | REF | |
| 63230 | STOREA | NOP | | |
| 63240 | | TDM | MK8 | |
| 63250 | | TDM | MK1 | |
| 63260 | | BTM | EPRINT,*+12 | |
| 63270 | | BTM | GAOSN,*+12 | |
| 63280 | | TF | 99,R1,6 | |
| 63290 | | BT | DNSHFT,DNSHFT-1 | |
| 63300 | | CM | KEY,70,10 | ....IS THIS THE ZERO DIGIT |
| 63310 | | BE | STOREF | |
| 63320 | | B7 | REF | |
| 63330 | STOREF | BTM | SFIFO,REF | |
| 63340* | | | | |
| 63350* | | | ***RECALL INSTRUCTION | |
| 63360 | RECALL | NOP | | |

| LINE | LABEL | OP | OPERANDS AND REMARKS | PROGRAM SHEET 62 |
|---|---|---|---|---|
| 63370 | | TFM | TEMPF-4,5900 | ....R |
| 63380 | | TDM | MK1 | |
| 63390 | | BTM | EPRINT,*+12 | ....TEST FOR PRINTED OUTPUT |
| 63400 | | TFM | NUM+6,RECALA | |
| 63410 | | TDM | MK8,1,11 | |
| 63420 | | B7 | REF | |
| 63430 | RECALA | NOP | | |
| 63440 | | TDM | MK8 | |
| 63450 | | TDM | MK1 | |
| 63460 | | BTM | EPRINT,*+12 | |
| 63470 | | CM | KEY,70,10 | ....IS THIS THE ZERO DIGIT |
| 63480 | | BNE | *+24 | |
| 63490 | | BTM | RFIFO,*+12 | |
| 63500 | | BT | UPSHFT,UPSHFT-1 | |
| 63510 | | BTM | GAOSN,*+12 | |
| 63520 | | TF | R1,99,11 | |
| 63530 | | B7 | REF | |
| 63540* | | | | |
| 63550* | | | CLEAR ADDRESSABLE STORAGE INSTRUCTION | |
| 63560 | CSTORE | NOP | | |
| 63570 | | TFM | TEMPF-4,1400 | ....* |
| 63580 | | TDM | MK1 | |
| 63590 | | BTM | EPRINT,*+12 | ....TEST FOR PRINTED OUTPUT |
| 63600 | | TFM | NUM2+6,CLRSTA | |
| 63610 | | TFM | DEC3+6,CRG19 | ....SET DECIMAL RETURN |
| 63620 | | TDM | MK8,1,11 | |
| 63630 | | TDM | MK11,1,11 | ....DECIMAL ADDRESS POSSIBLE |
| 63640 | | B7 | REF | |
| 63650 | CLRSTA | NOP | | |
| 63660 | | TDM | MK8 | |
| 63670 | | TDM | MK1 | |
| 63680 | | TDM | MK11 | ....RESET DECIMAL ADDRESS FLAG |
| 63690 | | BTM | EPRINT,*+12 | |
| 63700 | | CM | KEY,70,10 | ....TEST FOR ZERO DIGIT |
| 63710 | | BNE | *+24 | |
| 63720 | | BTM | CLFIFO,REF | |
| 63730 | | BTM | GAOSN,*+12 | |
| 63740 | | TF | 99,ZC,6 | |

| LINE | LABEL | OP | OPERANDS AND REMARKS | PROGRAM SHEET 63 |
|---|---|---|---|---|
| 63750 | | B7 | REF | |
| 63760* | | | ****CLEAR ALL ADDRESSABLE REGISTERS | |
| 63770 | CRG19 | TDM | KEYS,0 | |
| 63780 | XX5 | AM | KEYS,1 | |
| 63790 | | BTM | GAOSN,*+12 | |
| 63800 | | TF | 99,ZC,6 | |
| 63810 | | CM | KEYS,9,10 | |
| 63820 | | BL | XX5 | |
| 63830 | | BTM | GAOSN,*+12 | |

| LINE | LABEL | OP | OPERANDS AND REMARKS | PROGRAM SHEET 63 — Continued |
|---|---|---|---|---|
| 63840 | | TF | 99,ZC,6 | |
| 63850 | | B7 | REF | |
| 63860* | | | | |
| 3870* | | | | |
| 3880* | | | | |
| 63890* | | | **** SKIP ON ZERO INSTRUCTION | |
| 63900 | SKIPZE | NOP | | |
| 63910 | | TFM | TEMPF–4,6270 | ....SO |
| 63920 | | TDM | MKI | |
| 63930 | | BTM | EPRINT,*+12 | ....TEST FOR PRINTED OUTPUT |
| 63940 | | TFM | NUM2+6,SZEA | |
| 63950 | | TDM | MK8,1,11 | |
| 63960 | | B7 | REF | |
| 63970 | SZEA | NOP | | |
| 63980 | | TDM | MK8 | |
| 63990 | | TDM | MKI | |
| 63000 | | BTM | EPRINT,*+12 | |
| 64010 | | TD | HODD,KEY | ....SAVE HIGH ORDER DIGIT |
| 64020 | | TFM | NUM2+6,SZEB | ....SET UP RETURN ADDRESS |
| 64030 | | TDM | MK8,1,11 | |
| 64040 | | B7 | REF | |
| 64050 | SZEB | NOP | | |
| 64060 | | TDM | MK8 | |
| 64070 | | TDM | MKI | |
| 64080 | | BTM | EPRINT,*+12 | ....TEST FOR PRINTED OUTPUT |
| 64090 | | TD | LODD,KEY | ....SAVE LOW ORDER DIGIT |
| 64100* | | | **TEST FOR ZEROTEST FOR ZERO **TEST FOR ZERO | |
| 64110 | | TF | 99,R1 | |
| 64120 | | TDM | 99 | |

| LINE | LABEL | OP | OPERANDS AND REMARKS | PROGRAM SHEET 64 |
|---|---|---|---|---|
| 64130 | | TDM | 98 | |
| 64140 | | TDM | 100–L,1,11 | |
| 64150 | | C | 99,ZC | |
| 64160 | | BNE | REF | |
| 64170 | | BTM | ESKIP,REF | ....EXECUTE THE SKIP |
| 64180* | | | | |
| 64190* | | | | |
| 64200* | | | ***SKIP ON MINUS INSTRUCTION | |
| 64210 | SKIPMI | NOP | | |
| 64220 | | TFM | TEMPF–4,6220 | ....S– |
| 64230 | | TDM | –MKI | |
| 64240 | | BTM | EPRINT,*+12 | ....TEST FOR PRINTED OUTPUT |
| 64250 | | TFM | NUM2+6,SMIA | |
| 64260 | | TDM | MK8,1,11 | |
| 64270 | | B7 | REF | |
| 64280 | SMIA | NOP | | |
| 64290 | | TDM | MK8 | |
| 64300 | | TDM | MKI | |
| 64310 | | BTM | EPRINT,*+12 | |
| 64320 | | TD | HODD,KEY | ....SAVE HIGH ORDER DIGIT |
| 64330 | | TFM | NUM2+6,SMIB | |
| 64340 | | TDM | MK8,1,11 | |
| 64350 | | B7 | REF | |
| 64360 | SMIB | NOP | | |
| 64370 | | TDM | MK8 | |
| 64380 | | TDM | MKI | |
| 64390 | | BTM | EPRINT,*+12 | |
| 64400 | | TD | LODD,KEY | ....SAVE LOW ORDER DIGIT |
| 64410* | | | CHECK FOR ZERO | |
| 64420 | | TF | 99,R1 | |
| 64430 | | TDM | 98 | |
| 64440 | | TDM | 99 | |
| 64450 | | TDM | 100–L,1,11 | |
| 64460 | | C | 99,ZC | |
| 64470 | | BE | REF | |
| 64480 | | BD | REF,STACK | |
| 64490 | | BTM | ESKIP,REF | ....EXECUTE THE SKIP |
| 4500* | | | | |

| LINE | LABEL | OP | OPERANDS AND REMARKS | PROGRAM SHEET 65 |
|---|---|---|---|---|
| 64510* | | | | |
| 64520* | | | ***SKIP ON MARK INSTRUCTION | |
| 64530 | SKIPMK | NOP | | |
| 64540 | | TFM | TEMPF–4,6254 | ....SM |
| 64550 | | TDM | MKI | |
| 64560 | | BTM | EPRINT,*+12 | ....TEST FOR PRINTED OUTPUT |
| 64570 | | TFM | NUM2+6,SMAA | |
| 64580 | | TDM | MK8,1,11 | |

| LINE | LABEL | OP | OPERANDS AND REMARKS | PROGRAM SHEET 65 — Continued |
|---|---|---|---|---|
| 64590 | | B7 | REF | |
| 64600 | SMAA | NOP | | |
| 64610 | | TDM | MK8 | |
| 64620 | | TDM | MKI | |
| 64630 | | BTM | EPRINT,*+12 | ....TEST FOR PRINTED OUTPUT |
| 64640 | | TD | HODD,KEY | ....SAVE HIGH ORDER DIGIT |
| 64650 | | TFM | NUM2+6,–SMAB | |
| 64660 | | TDM | MK8,1,11 | |
| 64670 | | B7 | REF | |
| 64680 | SMAB | NOP | | |
| 64690 | | TDM | MK8 | |
| 64700 | | TDM | MKI | |
| 64710 | | BTM | EPRINT,*+12 | |
| 64720 | | TD | LODD,KEY | ....SAVE LOW ORDER DIGIT |
| 64730* | | | CHECK FOR MARK | |
| 64740 | | BNF | REF,MK9 | |
| 64750 | | TDM | MK9 | ....RESET MARK INDICATOR |
| 64760 | | BTM | ESKIP,REF | |
| 4770* | | | | |
| 4780* | | | | |
| 64790* | | | ****GO TO DD INSTRUCTION | |
| 64800 | GOTODD | NOP | | |
| 64810 | | TFM | TEMPF–4,6244 | ....SD |
| 64820 | | TDM | MKI | |
| 64830 | | BTM | EPRINT,*+12 | ....TEST FOR PRINTED OUTPUT |
| 64840 | | TFM | NUM2+6,ABRA | |
| 64850 | | TDM | MK8,1,11 | |
| 64860 | | B7 | REF | |
| 64870 | HODD | DC | 2,70,,,, | HIGH ORDER DD DIGIT |
| 64880 | ABRA | NOP | | |

| LINE | LABEL | OP | OPERANDS AND REMAKRS | PROGRAM SHEET 66 |
|---|---|---|---|---|
| 64890 | | TDM | MK8 | |
| 64900 | | TDM | MKI | |
| 64910 | | BTM | EPRINT,*+12 | |
| 64920 | | TD | HODD,KEY | ....SAVE HIGH ORDER DIGIT |
| 64930 | | TFM | NUM2+6,BBRA,,,, | SET UP RETURN ADDRESS |
| 64940 | | TDM | MK8,1,11 | ....ENTER DIGIT ADDRESS MODE |
| 64950 | | B7 | REF | |
| 64960 | LODD | DC | 2,70,,,, | LOW ORDER DD DIGIT |
| 64970 | BBRA | NOP | | |
| 64980 | | TDM | MK8 | |
| 64990 | | TDM | MKI | |
| 64000 | | BTM | EPRINT,*+12,,,, | TEST FOR PRINTED OUTPUT |
| 65010 | | TD | LODD,KEY | ....SAVE LOW ORDER DIGIT |
| 65020 | | BTM | ESKIP,REF | THE SKIP |
| 5030********** | | | | |
| 5040********** | | | | |
| 65050* | | | ****DD INSTRUCTION | |
| 65060 | DD | NOP | | |
| 65070 | | TFM | TEMPF–4,4444 | ....DD |
| 65080 | | TDM | MKI | |
| 65090 | | BTM | EPRINT,*+12 | ..... TEST FOR PRINTED OUTPUT |
| 65100 | | TFM | NUM2+6–,RESUA | |
| 65110 | | TDM | MK8,1,11 | |
| 65120 | | B7 | REF | |
| 65130 | RESUA | NOP | | |
| 65140 | | TDM | MK8 | |
| 65150 | | TDM | MKI | |
| 65160 | | BTM | EPRINT,*+12 | ....TEST FOR PRINTED OUTPUT |
| 65170 | | TFM | NUM2+6–,RESUB | |
| 65180 | | TDM | MK8,1,11 | |
| 65190 | | B7 | REF | |
| 65200 | RESUB | NOP | | |
| 65210 | | TDM | MK8 | |
| 65220 | | TDM | MKI | |
| 65230 | | BTM | EPRINT,*+12 | |
| 65240 | | B7 | REF | |
| 5250********** | | | | |
| 65260* | | | ***MARK LIST INSTRUCTION | |

| LINE | LABEL | OP | OPERANDS AND REMARKS | PROGRAM SHEET 67 |
|---|---|---|---|---|
| 65270 | MARK | NOP | | |
| 65280 | | TFM | TEMPF–4,5400 | ....M |

| LINE | LABEL | OP | OPERANDS AND REMARKS | PROGRAM SHEET 67 —Continued |
|---|---|---|---|---|
| 65290 | | TDM | MK1 | |
| 65300 | | BTM | EPRINT,*+12 | ....TEST FOR PRINTED OUTPUT |
| 65310 | | C | FS0AD,FP1AD | |
| 65320 | | BE | REF | |
| 65330 | | BTM | MARKF,REF | |
| 65340 | | DS | 5 | |
| 65350 | MARKF | NOP | | |
| 65360 | | TF | FMARK,FP1AD | |
| 65370 | | SM | FMARK,L | |
| 65380 | | CF | FMARK,,6 | |
| 65390 | | TD | TMARK,FMARK,11 | |
| 65400 | | CM | TMARK,0,10 | |
| 65410 | | BE | MARK0 | |
| 65420 | | CM | TMARK,1,10 | |
| 65430 | | BE | MARK1 | |
| 65440 | | SF | FMARK,,6 | |
| 65450 | | B7 | MARKF−1,,6 | |
| 65460 | MARK0 | TDM | FMARK,2,611 | |
| 65470 | | B7 | MARKF−1,,6 | |
| 65480 | MARK1 | TDM | FMARK,3,611 | |
| 65490 | | B7 | MARKF−1,,6 | |
| 5500********* | | | | |
| 5510********* | | | | |
| 65520* | | *****WRITE FIFO INSTRUCTION*** | | |
| 65530 | WFIFOZ | NOP | | |
| 65540 | | TFM | TEMPF−4,4462 | ....DS |
| 65550 | | TDM | MK1 | |
| 65560 | | BTM | EPRINT,*+12 | |
| 65570 | | TFM | ALIST,0 | |
| 65580 | | B7 | HHHH | |
| 5590********* | | | | |
| 5600* | | ****RECALL FIFO LIST INSTRUCTION* ** | | |
| 65610 | IFOZ | NOP | | |
| 65620 | | TFM | TEMPF−4,4459 | .. ,,DR |
| 65630 | | TDM | MK1 | |
| 65640 | | BTM | EPRINT,*+12 | |

| LINE | LABEL | OP | OPERANDS AND REMARKS | PROGRAM SHEET 68 |
|---|---|---|---|---|
| 65650 | | TFM | ALIST,0 | |
| 65660 | | B7 | MAFC | |
| 5670********* | | | | |
| 5680********* | | | | |
| 65690 | | DEND | START | |

What is claimed is:

1. In a calculator, the combination comprising: an arithmetic portion; keyboard means coupled to said arithmetic portion for manually entering data into said arithmetic portion; a nonaddressable storage coupled to said arithmetic portion having more than one register; said storage including means to enter data therein and retrieve data therefrom in a first-in, first-out arrangement; and said keyboard having means for enabling access to said storage to store data therein and to recall such data therefrom as desired.

2. The calculator according to claim 1 further including display means coupled to said arithmetic portion for visually displaying at least results of arithmetic operations.

3. The calculator according to claim 1 wherein said keyboard means includes interface means to enable the entry of data into said storage from said arithmetic portion.

4. The calculator according to claim 3 wherein said keyboard means includes interface means to enable the retrieval of data from said storage and entry of said data into said arithmetic portion.

5. The calculator according to claim 1 wherein said keyboard means includes a first key to enable access to said storage to store data therein and a second key to enable access to said storage to retrieve data therefrom.

6. The calculator according to claim 5 wherein said first key enables access to said storage to store data therein from said keyboard or said arithmetic portion.

7. In a calculator as in claim 1, wherein said arithmetic portion includes a memory having a plurality of registers; and said keyboard includes means for enabling the entering of data into said memory in a given sequence and means for enabling the recalling of such data from said memory in a sequence that is reverse to that of the given sequence.

8. In a calculator as in claim 7, further including an addressable storage coupled to said keyboard and having more than one random access register; and said keyboard including means for enabling the transferring of data from said memory selectively to any of said random access registers and means for enabling the recalling of such transferred data from selective ones of said random access registers.

9. A calculator comprising: a first memory including means for storing data on a last-in, first-out basis; a second memory including means for storing data on a first-in, first-out basis; storage means for storing data in a random sequence in a multiplicity of registers; and keyboard means coupled to said first and second memories and said storage means for enabling the transferring of data from said first memory to said second memory and said storage means as desired and for recalling such data from second memory and said storage means to said first memory as desired.

10. A calculator as in claim 9, including means coupled to at least one of said first and said second memories for performing arithmetic calculations on said stored data.

11. A calculator as in claim 10 wherein said keyboard includes a plurality of digit keys and store key means for enabling the entering of arithmetic numbers into said first and said second memories and said storage means.

12. A calculator as in claim 11, wherein said keyboard includes a recall key for enabling the retrieving of data stored in said second memory and said storage means upon depression of said recall key and one of said digit keys.

13. A calculator comprising: an arithmetic unit; a first group of storage registers including means to store and recall data on a last-in, first-out basis; a second group of storage registers including means to store and recall data on a first-in, first-out basis, coupled to said first group; a third group of storage registers coupled to said first and second groups, individual registers of said third group being selectively addressable for storage and for recall of data in a random sequence; and keyboard means coupled to said arithmetic unit and to said first, second and third groups for enabling the transferring of data between said groups so that stored information may be modified arithmetically by said arithmetic unit and yet retained for further arithmetic modification as desired.

14. A calculator as in claim 13, wherein said first group includes an operating register for the performance of arithmetic functions.

15. A calculator as in claim 14 wherein said operating register is an entry register for data entered from said keyboard means.

* * * * *